US011272385B2

(12) United States Patent
Nakamura et al.

(10) Patent No.: US 11,272,385 B2
(45) Date of Patent: Mar. 8, 2022

(54) COMMUNICATION TERMINAL MEASUREMENT APPARATUS AND MEASUREMENT-RELATED INFORMATION DISPLAY METHOD

(71) Applicant: ANRITSU CORPORATION, Kanagawa (JP)

(72) Inventors: Shoichi Nakamura, Kanagawa (JP); Shinji Ogawa, Kanagawa (JP); Atsushi Motoyama, Kanagawa (JP); Anri Muto, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 8 days.

(21) Appl. No.: 16/924,372

(22) Filed: Jul. 9, 2020

(65) Prior Publication Data

US 2021/0099900 A1 Apr. 1, 2021

(30) Foreign Application Priority Data

Sep. 30, 2019 (JP) .............................. JP2019-180363

(51) Int. Cl.
*H04B 7/024* (2017.01)
*H04B 7/0413* (2017.01)
(Continued)

(52) U.S. Cl.
CPC ............ *H04W 24/06* (2013.01); *H04B 7/024* (2013.01); *H04B 7/0413* (2013.01);
(Continued)

(58) Field of Classification Search
CPC ......... H04B 7/02–0495; H04B 17/0082–3913; H04L 43/02–50; H04W 16/18–225;
(Continued)

(56) References Cited

U.S. PATENT DOCUMENTS

2006/0003810 A1* 1/2006 Saikyo .................. H04W 24/06
2011/0124295 A1* 5/2011 Mahjoubi Amine .......................
H04B 17/3911
(Continued)

FOREIGN PATENT DOCUMENTS

JP 2013-009254 A 1/2013

OTHER PUBLICATIONS

Uchino, et al., Advanced carrier aggregation and Dual Connectivity technology to achieve higher speed and larger capacity (as translated from Japanese), NTT Docomo Technical Journal, vol. 23, No. 2, pp. 35-45, Jul. 2015.
(Continued)

*Primary Examiner* — Timothy J Weidner
(74) *Attorney, Agent, or Firm* — Pearne & Gordon LLP

(57) ABSTRACT

In a control device 22 constituting a communication terminal measurement apparatus 10, a display control unit 30*d* displays an NR connection confirmation/support screen 36*a* indicating a connection mode for connection between an NR measurement device 20 and a communication terminal 11*a*, and an LTE connection confirmation/support screen 36*b* indicating a connection mode for connection between a LTE measurement device 21 and the communication terminal 11*a*. Further, information on the signal of the NR communication standard is attached as a text to the image of the port through which the signal of the NR communication standard is input and output, and information on the signal of the LTE communication standard is attached as a text to an image of the port through which the signal of the LTE communication standard is input and output.

10 Claims, 29 Drawing Sheets

(51) Int. Cl.

| | |
|---|---|
| *H04B 17/00* | (2015.01) |
| *H04B 17/10* | (2015.01) |
| *H04B 17/20* | (2015.01) |
| *H04B 17/391* | (2015.01) |
| *H04L 43/045* | (2022.01) |
| *H04L 43/50* | (2022.01) |
| *H04W 24/06* | (2009.01) |
| *H04W 24/10* | (2009.01) |
| *H04W 88/06* | (2009.01) |
| *H04W 88/08* | (2009.01) |
| *H04W 88/18* | (2009.01) |

(52) U.S. Cl.
CPC ....... *H04B 17/0087* (2013.01); *H04B 17/101* (2015.01); *H04B 17/20* (2015.01); *H04B 17/3912* (2015.01); *H04L 43/045* (2013.01); *H04L 43/50* (2013.01); *H04W 24/10* (2013.01); *H04W 88/06* (2013.01); *H04W 88/08* (2013.01); *H04W 88/18* (2013.01)

(58) Field of Classification Search
CPC ..... H04W 24/02–10; H04W 80/02–12; H04W 84/005–22; H04W 88/005–188; H04W 92/02–24
See application file for complete search history.

(56) References Cited

U.S. PATENT DOCUMENTS

| | | | |
|---|---|---|---|
| 2012/0327782 A1 | 12/2012 | Tanaka et al. | |
| 2012/0327796 A1* | 12/2012 | Ozaki | H04W 24/06 |
| 2018/0343574 A1* | 11/2018 | Basedahl | H04W 24/06 |

OTHER PUBLICATIONS

Minoguchi, et al., 5G standardization tends in 3GPP (as translated from Japanese), NTT Docomo Technical Journal, vol. 25, No. 3, pp. 6-12, Oct. 2017.

* cited by examiner

COMMUNICATION TERMINAL MEASUREMENT APPARATUS AND MEASUREMENT-RELATED INFORMATION DISPLAY METHOD

TECHNICAL FIELD

The present invention relates to a communication terminal measurement apparatus having a measurement function of a communication terminal and a display control function of information relating to measurement, and a measurement-related information display method, for performing a test of a communication terminal by simulating a base transceiver station in an operation mode in which new and old communication standards are mixed.

BACKGROUND ART

For example, in a mobile phone system, a speed of wireless communication with a wireless base transceiver station (hereinafter, a base transceiver station) is increased in accordance with the increase in the number of functions of a mobile terminal. In recent years, for example, a technology development for shifting from fourth generation (4G) services employing the LTE-Advanced system to fifth generation (5G) services is in progress.

In realizing a new wireless communication system (NR) for 5G, a non-standalone NR operated by a combination of LTE and NR disclosed in Non-Patent Document 1 is studied. Further, as disclosed in Non-Patent Document 2, non-standalone NR operation is based on use in combination of the carrier aggregation (hereinafter referred to as CA) technology and the dual connectivity (hereinafter referred to as DC) technology. In the CA technology, communication is performed by bundling component carriers (hereinafter, referred to as CCs) used before the LTE-Advanced standard in the same base transceiver station. In the DC technology, simultaneous communication is performed by bundling a plurality of LTE carriers between different base transceiver stations in an NR area.

First, the non-standalone NR operation will be described. The non-standalone NR operation is being considered to be employed in the transition stage to a standalone system that can be operated only with NR, and is an operation mode for providing the 5G wireless service using the existing LTE/LTE-Advanced area and the NR area in combination.

In the non-standalone NR operation, for example, as shown in FIG. 24, an evolved packet core (EPC) is employed as a core network, and an LTE area and an NR area are mixed in the core network. In the LTE area and the NR area, a plurality of base transceiver stations LTE1 (1st base transceiver station supporting LTE)
to LTEn (nth base transceiver station supporting LTE) and NR1 (1st base transceiver station supporting NR) to NRn (nth base transceiver station supporting NR) may exist, respectively.

In the existing LTE/LTE-Advanced, there is a technology that employs a CA technology that bundles CCs of the same base transceiver station (BTS). However, in non-standalone NR operation, in addition to the CA technology, NR and LTE are combined with a DC technique that bundles carriers between different BTSs in each area.

In the network configuration of the non-standalone NR, the above-described DC performs data communication using radio resources of two BTSs called a master node and a secondary node. In this case, for example, as shown in FIG. 25, the following technology is employed. A master node MNB (Master Node BTS) serves as a branch point for user data transmission, and downlink data transmitted from an S-GW (Serving Gate Way) through an S1 interface is transferred to the carrier of the secondary node SNB (Secondary Node BTS) through the carrier of the master node MNB or the X2 interface, thereby performing transmission to the carrier of the secondary node SNB.

In the DC in non-standalone NR operation, radio resource control (RRC) for connecting to a network is established only with the master node MNB, and controls the secondary node SNB through the master node MNB. This type of control includes control of addition of a secondary node for setting a carrier provided by the secondary node SNB to a user equipment (UE), which is a terminal, and control of deletion of a secondary node for deleting the carrier.

As an example, FIG. 26 shows a procedure for deleting a secondary node. In this deletion procedure, first, the user equipment UE transmits a measurement report to the MNB which is a base transceiver station operating as a master node to connect to the MNB, and then the DC setting procedure is executed in a case where it is notified through the user equipment UE that the quality of the cell subordinate to the SNB serving as the base transceiver station, in which the MNB is set as a secondary node, is favorable.

In the DC setting procedure, the base transceiver station MNB transmits a DC setting request (SN AdditionRequest) to the SNB (Step S01). The SNB stores the radio parameter information of the subordinate cell in a response signal (SN Addition Request Acknowledgement) to the DC setting request, and transmits the signal to the SNB (step S02). Subsequently, in a case of receiving the response signal from the SNB, the MNB transmits a radio resource setting signal (RRC connection reconfiguration) to the user equipment UE (step S03). The user equipment UE transmits a completion notification (RRC connection reconfiguration complete) corresponding to the setting signal to the MNB (step S04), starts a synchronization establishment procedure for the SNB, and reaches a state where connection with the SNB is established upon completion of the procedure.

Upon receiving the completion notification from the user equipment UE, the MNB transfers a completion notification (SN reconfiguration complete) to the SNB (Step S05), and completes the DC setting procedure. Thereafter, the base transceiver station MNB executes processing of distributing downlink user data sent from the S-GW to the base transceiver station SNB.

Further, a protocol stack as shown in FIG. 27 is employed in the DC in the non-standalone NR operation. In a configuration of the existing LTE, between the base transceiver station and UE, a packet data convergence protocol (PDCP) layer, a radio link control (RLC) layer, a medium access control (MAC) layer, and a physical (physical) layer from the top are set. On the other hand, as shown in FIG. 27, in the DC, a plurality of base transceiver stations communicate with the user equipment UE. Thus, the protocol stack is separated on the base transceiver station side under the PDCP layer in the MNB, and the protocol stack similar to the conventional one is prepared for each of the MNB and the SNB on the RLC layer and the following layers. On the other hand, on the user equipment UE side, a protocol layer corresponding to each is prepared.

In the DC, a primary cell (PCell) and a secondary cell (SCell) used for transmission of control signals also have different functions from CA. In the CA, only a part of the functions of PCell is supported in the SCell. Specifically, the SCell does not support the physical uplink control channel (PUCCH), the contention based random access (CBRA), and the like, and the PCell basically performs transmission of hybrid automatic retransmission (HARQ) response signal and the uplink control information (UCI) as quality information of downlink (DL), an uplink scheduling request to the base transceiver station, and the like.

On the other hand, in the DC, the delay between the base transceiver stations MNB/SNB that bundle the carriers is large. Thus, the UCI and the scheduling request received by the PCell of the MNB are notified to the SNB in real time through the backhaul, and it is difficult to reflect the UCI and the scheduling request on the scheduling of the subordinate SCell.

Therefore, in DC, for example, as shown in FIG. 28, one carrier subordinate to the SNB is used as a primary SCell (PSCell) to support PUCCH transmission and CBRA in addition to the PCell, and the UCI and the scheduling request for each carrier subordinate to the SNB are transmitted directly from the user equipment UE to the SNB. Thereby, communication with a plurality of base transceiver stations can be realized without being affected by the delay between the MNB and the SNB. It should be noted that the PSCell also has a function that was previously supported only by the PCell, such as a downlink radio quality monitoring function. Therefore, the user equipment UE is able to perform stable transmission and reception with the SNB.

In the non-standalone NR operation equipped with the DC technology described with reference to FIGS. 24 to 28, in addition to "high speed and large capacity" in LTE/LTE-Advanced, advantages of "low delay and high reliability" can also be achieved.

In a measurement device for measuring a terminal performing communication according to the NR communication standard through non-standalone NR operation in which NR and LTE are combined, there is a known operation mode. In the operation mode, connection to an NR simulation device for simulating a communication operation of a base transceiver station in an NR area is performed at the time of communicating with a terminal and an LTE simulation device for simulating a communication operation of a base transceiver station in the LTE area, and information relating to terminal measurement is collected on the basis of signals which are output by the NR simulation device and the LTE simulation device during the simulative communication operation. In this operation mode, it is indispensable to correctly connect the NR simulation device and the LTE simulation device to the connection destination when measuring the terminal.

For a device for testing a communication operation of a mobile communication terminal by simulating a base transceiver station that transmits and receives signals based on various communication standards including LTE in the related art, for example, Patent Document 1 proposes a technology of performing display for detecting the setting contents of multiplex communication and the status of the multiplex communication under test including information indicating a subordinate relationship of multiplex communication (paragraph 0024 and the like).

For example, the display control unit 5 described in Patent Document 1 controls the display unit 6 to perform, for example, a desired display in the display form shown in FIG. 29 in accordance with a control signal from the pseudo base transceiver station control unit 4 based on the setting information.

The display unit 6 is configured as a display such as a liquid crystal panel, and has a multiplex-communication-related display unit 6d in addition to the sequence display unit 6a, the connection status display unit 6b, and the connection destination display unit 6c.

For packet data communication for each service between the terminal 11 (for example, a mobile communication terminal such as a 4G terminal) and the virtual connection destination through the measurement device 1, the sequence display unit 6a displays a plurality of sequences indicating a communication procedure and a transition status of communication between the terminal 11 and the virtual connection destination 12.

Specifically, as shown in FIG. 29, the sequence display unit 6a displays, as a plurality of sequences, a "Power Off" sequence indicating the power-off status of the terminal 11, a "Detach (position registration release)" sequence indicating a position registration release status of the port, a "Registration (position registration)" sequence indicating a position registration status of the terminal 11, an "Idle (standby status)" sequence indicating a standby status of the terminal 11, an "Origination (outgoing)" sequence indicating an outgoing status of the terminal 11, a "Termination (incoming)" sequence indicating an incoming status of the terminal 11, a "Communication (communication status)" sequence indicating a communication status of the terminal 11, a "UE (user equipment) Release (terminal disconnection)" sequence indicating a disconnection status from the terminal 11, and a "NW (network) Release (connection destination disconnection)" sequence indicating a disconnection status from virtual connection destination 12.

Under the control of the display control unit 5, these series of sequences are displayed in a flowchart form with arrows indicating each communication procedure and the transition direction of the communication status between the sequences. At that time, the display status changes in accordance with the transition status. That is, when the corresponding sequence is in the transition status, the corresponding sequence is displayed in a display status different from the previous display status, for example, by changing the display color or the display luminance.

In FIG. 29, the arrows between the sequences in the sequence display unit 6a indicate the communication procedures and the transition directions of the communication status.

The connection status display unit 6b displays the connection status between the terminal 11 and the virtual connection destination 12 (a virtual call destination 12a, a virtual server 12b, or a virtual videophone 12c) through the measurement device 1.

More specifically, the connection status display unit 6b displays, as graphic icons, the terminal 11, the pseudo base transceiver station control unit 4, and the virtual connection destination 12 (the virtual call destination 12a, the virtual server 12b, or the virtual videophone 12c) under the control of the display control unit 5, changes the display status in accordance with the presence or absence of connection, and graphically displays a plurality of connection lines between the terminal 11 for the pseudo base transceiver station control unit 4 and each of the virtual connection destination 12 (the virtual call destination 12a, the virtual server 12b, or the virtual videophone 12c). That is, the display color of the corresponding connection line is changed or the display luminance is changed in accordance with the presence or absence of the connection.

The connection destination display unit 6c graphically displays one virtual connection destination 12 (any of the virtual call destination 12a, the virtual server 12b, or the virtual videophone 12c) to which the terminal 11 is connected through the pseudo base transceiver station control unit 4.

When the terminal 11 performs the multiplex communication, under the control of the display control unit 5 through the pseudo base transceiver station control unit 4, the multiplex-communication-related display unit 6d displays the above-mentioned Priority, Status, PDN/PDP-Type, IP-version, QCI, EBI/NSAPI, Linked-EBI/Linked-NSAPI, UE Address, DNS-Address, and Access-Point-Name as the multiplex-communication-related information, for example in a list format as shown in FIG. 29. The multiplex-communication-related information is determined by the display information determination unit 13 in order to detect the setting contents of the multiplex communication and the status of the multiplex communication under test.

RELATED ART DOCUMENT

Non-Patent Literature

[Non-Patent Document 1] Uchino, Teshima, Takeda {NTT DOCOMO Technical Journal} Vol. 23 No. 2 pp. 35-45 (July 2015)
[Non-patent Document 2] Minoguchi, Isobe, Takahashi, Nagata {NTT DOCOMO Technical Journal} Vol. 25 No. 3 pp. 6-12 (October 2017)

Patent Document

[Patent Document 1] U.S. Pat. No. 5,290,359 (Japanese Patent Application Laid-Open No. 2013-9254)

The conventional device described in Patent Document 1 has a function of showing a connection mode as an image of a connection diagram to a user. The connection mode is a mode for connection between a single simulation device (corresponding to the virtual connection destination 12 in FIG. 6), which simulates a communication operation of a base transceiver station in LTE, and a connection destination such as an antenna of a 4G terminal.

Conventionally, regarding this type of connection diagram, for example, as shown in FIG. 30, connection ports (connection diagrams) of the LTE measurement device and connection paths (wiring diagrams) between each driver and UE are displayed as an image on a connection confirmation screen 333 for each setting.

As shown in FIG. 30, the LTE measurement device, the UE, and the driver device arranged between the LTE measurement device and the UE are displayed as images respectively corresponding thereto on the connection confirmation screen 333. The LTE measurement device has a plurality of connection ports for connecting antennas, and is displayed in a form (wiring diagram) in which the connection paths between the connection ports and, for example, four antennas (downlink antenna×3, uplink/downlink combined antenna×1) of the UE through each driver device are connected by dotted lines of the corresponding line types.

In the conventional device, the display control unit 5 receives a parameter setting including the number of LTE base transceiver stations and a measurement type at the time of measurement of UE, generates a connection confirmation screen 333 reflecting the parameter setting contents each time, and displays the screen on the display unit 6.

Since the measurement parameters for LTE measurement have an extremely large number of setting (combination) patterns, in the above-described conventional device, it is necessary to generate the number of connection confirmation screens 333 corresponding to the wiring diagrams corresponding to the number of setting patterns. In addition, in the measurement in the non-standalone NR operation which is realized in recent years, an NR measurement device is newly attached. Therefore, in addition to the wiring diagram between the LTE measurement device and the UE (refer to FIG. 30), it is required to create more connection confirmation screens 333 including wiring diagrams between the NR measurement device and the UE.

For this reason, in the communication terminal measurement apparatus for non-standalone NR, the connection mode for connection between the UE and the measurement device for LTE which is the old communication standard and the measurement device for NR which is the new communication standard is represented by the wiring diagram of the conventional method. In this case, it is necessary to create an enormous number of screens corresponding to all wiring diagrams, and there is a concern that the processing load will increase significantly.

DISCLOSURE OF THE INVENTION

Problem that the Invention is to Solve

The present invention is made to solve such a conventional problem, and its object is to provide a communication terminal measurement apparatus and a measurement-related information display method capable of reducing processing load associated with screen generation by reducing the number of screens for displaying the connection mode for connection destination between each transmitting/receiving unit that simulates an operation of the base transceiver station each compliant with the old communication standard and the new communication standard when performing communication in the operation mode where the old and new communication standards are mixed.

Means for Solving the Problem

In order to solve the above problems, a communication terminal measurement apparatus according to a first aspect of the present invention tests a communication terminal (11a) by simulating a plurality of base transceiver stations including a base transceiver station compliant with a first communication standard and a base transceiver station compliant with a second communication standard. The communication terminal measurement apparatus comprises: a first transmitting/receiving unit (3a, 20) that simulates an operation of the base transceiver station compliant with the first communication standard and transmits and receives a signal of the first communication standard to and from the communication terminal; a second transmitting/receiving unit (3b, 21) that simulates an operation of the base transceiver station compliant with the second communication standard and transmits and receives a signal of the second communication standard to and from the communication terminal; a control unit (4, 22) that controls the first transmitting/receiving unit and the second transmitting/receiving unit so as to execute a simulative communication operation for simulating communication between the plurality of base transceiver stations and the communication terminal; a display unit (33); and display control means (30d) for causing the display unit (33) to display a connection confirmation support screen (33d, 33da, 33db) as a connection diagram. The connection confirmation support screen (33d, 33da, 33db) includes a first connection confirmation support image (33d1, 36a) indicating a connection mode for connection between the first transmitting/receiving unit and the communication terminal and a second connection confirmation support image (33*d*2, 36*b*) indicating a connection mode for connection between the second transmitting/receiving unit and the communication terminal. The first connection confirmation support image includes an image of a port through which the signal of the first communication standard is input and output. The second connection confirmation support image includes an image of a port through which the signal of the second communication standard is input and output. In addition, the display control means further causes information on the signal of the first communication standard to be attached to the image of the port through which the signal of the first communication standard is input and output, and information on the signal of the second communication standard to be attached to the image of the port through which the signal of the second communication standard is input and output.

With this configuration, in the communication terminal measurement apparatus according to the first aspect of the present invention, information pieces of the signals, which are input to and output from the ports, are attached as a text to the first connection confirmation support image and the second connection confirmation support image. Thereby, it is not necessary to generate a huge number of screens corresponding to all wiring diagrams that fluctuate greatly every time simulation parameters are changed. Thus, it is possible to save screens and reduce processing load compared with conventional systems.

The communication terminal measurement apparatus according to a second aspect of the present invention may be configured such that the first connection confirmation support image further includes a panel image of the first transmitting/receiving unit having a port through which the signal of the first communication standard is input and output, and the second connection confirmation support image further includes a panel image of the second transmitting/receiving unit having a port through which the signal of the second communication standard is input and output.

With this configuration, the communication terminal measurement apparatus according to the second aspect of the present invention is able to correctly and easily connect the first transmitting/receiving unit and the second transmitting/receiving unit to the connection destination by viewing the connection destination name attached to the port in the image indicating the front panel and the back panel. Thus, the test efficiency can be improved.

The communication terminal measurement apparatus according to a third aspect of the present invention further comprises setting means (32, 33*b*) for setting simulation parameters, and may be configured such that the display control means displays the first connection confirmation support image and the second connection confirmation support image in accordance with the simulation parameters which are set by the setting means.

With this configuration, in the communication terminal measurement apparatus according to the third aspect of the present invention, even in a case where the setting contents of the simulation parameters changes, the port, to which the connection destination name is attached, can be easily connected to a correct connection destination on the basis of the connection destination name changed in accordance with the setting contents.

The communication terminal measurement apparatus according to a fourth aspect of the present invention may be configured such that the setting means includes a first tool (34*a*) for selecting an RF converter or an RF sub-module, a second tool (34*b*) for setting the number of base transceiver stations compliant with the first communication standard, and a third tool (34*c*) for setting the number of antennas relating to MIMO. In addition, when the RF converter is selected and the number of antennas relating to MIMO greater than a predetermined value is set, the display control means displays the first connection confirmation support image further including RF converter images (27*a*, 27*b*, 27*c*, 27*d*), each of which indicates the RF converter and of which the number corresponds to the number of antennas and a third connection confirmation support image (33*d*3) which indicates a connection path between each of the RF converter images and the port of the first transmitting/receiving unit through which the signal of the first communication standard is input and output.

With this configuration, the communication terminal measurement apparatus according to the fourth aspect of the present invention is able to accurately and quickly perform connection between that the first transmitting/receiving unit and the RF converters respectively corresponding to the plurality of antennas in a busy connection state while also referring to the third connection confirmation support image. As a result, the test efficiency of the communication terminal based on the MIMO system can be improved.

The communication terminal measurement apparatus according to a fifth aspect of the present invention may be configured such that, when the RF sub-module is selected, the display control means cause a port, which is different from the port to which the information on the signal of the first communication standard is attached when the RF converter is selected and which is to be connected to the RF sub-module in a panel image of the first transmitting/receiving unit, to display the first connection confirmation support image to which the information on the signal of the first communication standard is attached without the third connection confirmation support image.

With this configuration, the communication terminal measurement apparatus according to the fifth aspect of the present invention is able to connect the first transmitting/receiving unit and the communication terminal through a wired path including an RF sub-module, and is able to accurately and quickly perform a connection operation in a case of performing a test.

The communication terminal measurement apparatus according to a sixth aspect of the present invention may be configured such that, when the RF sub-module is selected, the display control means cause a port, which is different from the port to which the information on the signal of the first communication standard is attached when the RF converter is selected and which is to be connected to the RF sub-module in a panel image of the first transmitting/receiving unit, to display the first connection confirmation support image to which the information on the signal of the first communication standard is attached without the third connection confirmation support image.

The communication terminal measurement apparatus according to a seventh aspect of the present invention may be configured such that the first communication standard is NR and the second communication standard is LTE.

With this configuration, the communication terminal measurement apparatus according to the sixth aspect of the present invention is able to show the connection modes between the NR measurement device and the LTE measurement device and the respective connection destinations thereof to a user by using a single connection confirmation support image when testing a communication terminal in non-standalone NR operation in which LTE and NR are combined. Thus, compared with the conventional system that requires a huge number of screens corresponding to all wiring diagrams indicating the connection modes between the NR measurement device and the LTE measurement device and the respective connection destinations thereof, the screen can be greatly saved.

The communication terminal measurement apparatus according to an eighth aspect of the present invention may be configured such that the first communication standard is NR and the second communication standard is LTE.

The communication terminal measurement apparatus according to a ninth aspect of the present invention may be configured such that the first communication standard is NR and the second communication standard is LTE.

The communication terminal measurement apparatus according to a tenth aspect of the present invention may be configured such that the first communication standard is NR and the second communication standard is LTE.

The communication terminal measurement apparatus according to an eleventh aspect of the present invention may be configured such that the first communication standard is NR and the second communication standard is LTE.

The measurement-related information display method according to a twelfth aspect of the present invention is a measurement-related information display method of causing a display unit (33) to display a connection diagram indicating connection modes of a first transmitting/receiving unit and a second transmitting/receiving unit capable of performing simulative communication operations of the first transmitting/receiving unit (3a, 20) that simulates an operation of a base transceiver station compliant with a first communication standard and transmits and receives a signal of the first communication standard to and from the communication terminal, and the second transmitting/receiving unit (3b, 21) that simulates an operation of a base transceiver station compliant with a second communication standard and transmits and receives a signal of the second communication standard to and from the communication terminal, when testing a communication terminal (11a) by simulating a plurality of base transceiver stations including the base transceiver station compliant with the first communication standard and the base transceiver station compliant with the second communication standard. The method comprises: a step (S52) of separately generating a first connection confirmation support image (33d1, 36a) indicating a connection mode for connection between the first transmitting/receiving unit and the communication terminal and a second connection confirmation support image (33d2, 36b) indicating a connection mode for connection between the second transmitting/receiving unit and the communication terminal; a step (S53) of generating a connection confirmation support screen (33d, 33da, 33db) by synthesizing the first connection confirmation support image and the second connection confirmation support image; and a step (S53) of causing the display unit (33) to display the connection confirmation support screen as the connection diagram.

With this configuration, the measurement-related information display method according to the twelfth aspect of the present invention separately generates the first connection confirmation support image and the second connection confirmation support image, synthesizes the images, and displays the images as a connection diagram. As a result, it is not necessary to generate an enormous number of screens corresponding to all wiring diagrams, which fluctuate greatly each time a simulation parameters is changed. Thereby, it is possible to save screens and reducing the processing load as compared with the conventional system.

Advantage of the Invention

The present invention is able to provide a communication terminal measurement apparatus and a measurement-related information display method capable of reducing processing load associated with screen generation by reducing the number of screens for displaying the connection mode for connection between the base transceiver station compliant with the old communication standard and each simulation device and connection destination compliant with the new communication standard when performing communication in the operation mode where the old and new communication standards are mixed.

BEST MODE FOR CARRYING OUT THE INVENTION

Hereinafter, an embodiment of a communication terminal measurement apparatus and a measurement-related information display method according to the present invention will be described with reference to the drawings.

A communication terminal measurement apparatus according to the present invention transmit and receive a signal (radio frequency (RF) signal) based on a predetermined communication standard (for example, LTE or NR) with a newly developed mobile communication terminal such as a mobile phone. Thereby, the communication operation of the mobile communication terminal is tested by simulating a base transceiver station.

In particular, the communication terminal measurement apparatus according to the present invention can also support the measurement of a communication terminal performing communication according to the above-mentioned NR communication standard, and has a function of simulating NR base transceiver stations and LTE base transceiver stations arranged in each area of NR and LTE in a non-standalone NR network. The NR communication standard and the LTE communication standard correspond to the first communication standard and the second communication standard of the present invention, respectively.

Figure 1:
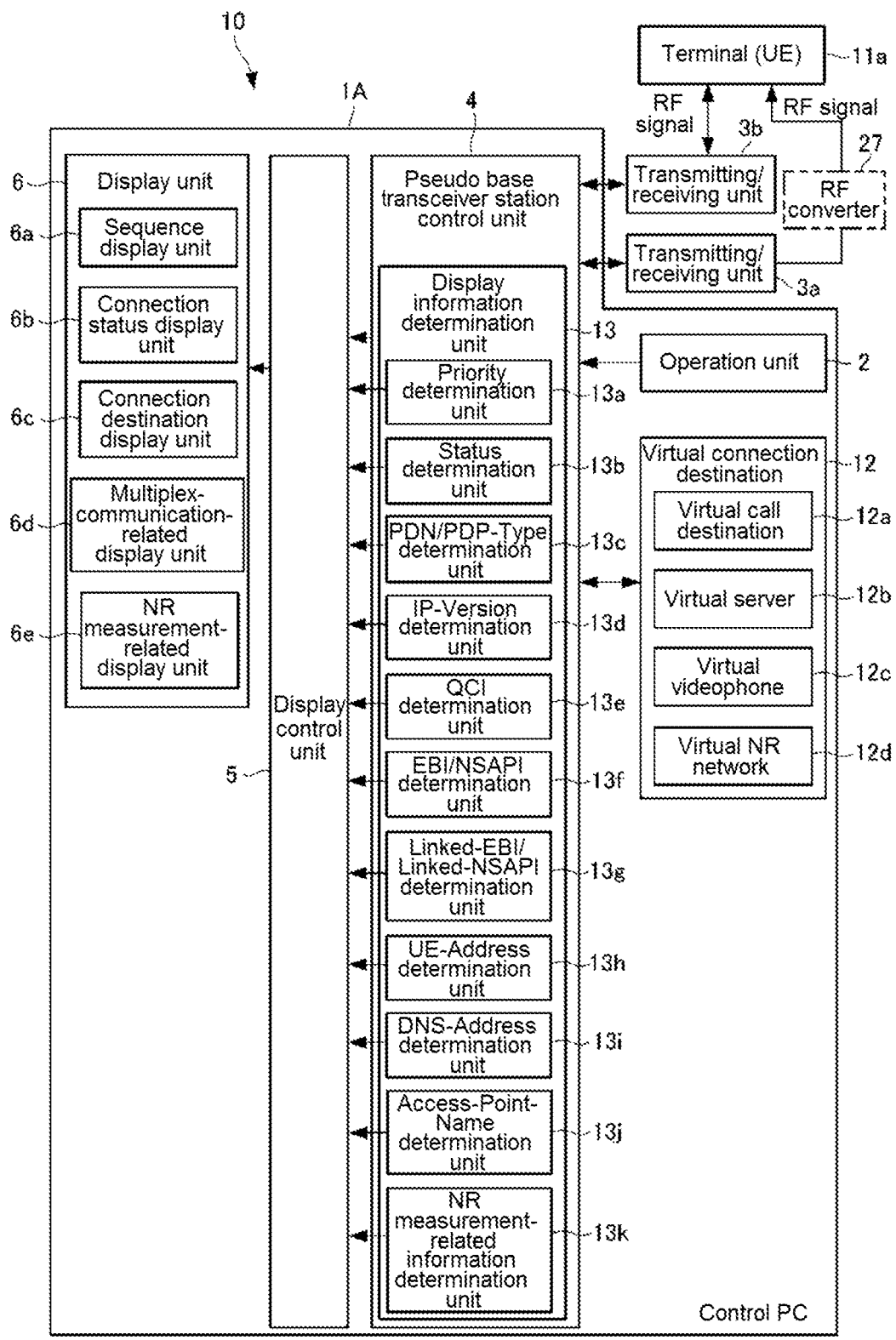
FIG. 1 is a block diagram showing a configuration of a communication terminal measurement apparatus according to an embodiment of the present invention.

As shown in FIG. 1, a communication terminal measurement apparatus 10 according to an embodiment of the present invention includes a control personal computer (PC) 1A, a transmitting/receiving unit 3a, and a transmitting/receiving unit 3b as components for realizing the measurement function and the display function. The control PC 1A, the transmitting/receiving unit 3a, and the transmitting/receiving unit 3b respectively correspond to a control device 22, a NR measurement device 20, and an LTE measurement device 21, in a case where the communication terminal measurement apparatus 10 is operated in the connection configuration shown in FIG. 4 or 5.

As shown in FIG. 1, the control PC 1A is schematically configured to include an operation unit 2, a transmitting/receiving unit 3a, a transmitting/receiving unit 3b, a pseudo base transceiver station control unit 4, a display control unit 5, and a display unit 6. Hereinafter, each component will be described.

The operation unit 2 includes an operation panel such as switches and buttons provided on the front surface of the housing of the control PC 1A, for example. The operation unit selectively performs an instruction to start or stop a communication operation test of a mobile communication terminal (hereinafter, abbreviated as a terminal) 11a to be tested, and various settings necessary for a communication operation test of the communication terminal 11a including various kinds of information settings necessary for performing a desired display on a display unit 6 (a sequence display unit 6a, a connection status display unit 6b, a connection destination display unit 6c, and a multiplex-communicationrelated display unit 6d to be described later). The communication terminal 11a described in the present embodiment is a 5G communication terminal, and is compliant with SGNR, LTE, and pre-LTE communication standards.

The transmitting/receiving unit 3a transmits a signal (RF signal) of the NR communication standard from the virtual connection destination 12 to the communication terminal 11a as a test target under the control of the pseudo base transceiver station control unit 4, and inputs the signal (RF signal) received from the communication terminal 11a to the virtual connection destination 12. The transmitting/receiving unit 3a has a function of appropriately transmitting and receiving signals conforming to the NR communication standard between the pseudo base transceiver station and the communication terminal 11a.

The transmitting/receiving unit 3b transmits a signal (RF signal) of the LTE communication standard or the pre-LTE communication standard from the virtual connection destination 12 to the communication terminal 11a as a test target under the control of the pseudo base transceiver station control unit 4, and inputs the signal (RF signal) received from the communication terminal 11a to the virtual connection destination 12. The transmitting/receiving unit 3b has a function of appropriately transmitting and receiving signals conforming to the LTE communication standard and the pre-LTE communication standard between the pseudo base transceiver station and the communication terminal 11a.

The virtual connection destination 12 is a destination that is incorporated in the control PC 1A and can be connected to the communication terminal 11a under the control of the pseudo base transceiver station control unit 4, and corresponds to a virtual call destination 12a, a virtual server 12b, a virtual videophone 12c, a virtual NR network 12d, and the like as shown in FIG. 1.

The pseudo base transceiver station control unit 4 collectively controls each unit of the transmitting/receiving unit 3, the display control unit 5, and the display unit 6 based on the operation information of the operation unit 2 so as to execute a predetermined scenario and perform a communication operation test of the communication terminal 11a.

It should be noted that the scenario describes a test procedure of a series of operations for simulating a communication sequence based on a predetermined communication standard (for example, LTE standard, NR standard, or the like) in the communication terminal measurement apparatus 10 that simulates a base transceiver station. In the communication terminal measurement apparatus 10 according to the present embodiment, a description is also given of, as the above-described scenario, a test procedure of a series of operations for simulating a communication sequence based on the NR communication standard between each base transceiver station in the LTE and NR areas in the network relating to the non-standalone NR operation and the communication terminal 11a that is the measurement target communication terminal. That is, the virtual NR network 12d, which is one of the virtual connection destinations 12, has a functional configuration for simulating communication with the communication terminal 11a based on the NR communication standard.

In addition, when the communication terminal 11a performs multiplex communication, the pseudo base transceiver station control unit 4 has a display information determination unit 13 that determines various types of display information to be displayed on the multiplex-communication-related display unit 6d to be described later on the basis of operation information (including setting information) from the operation unit 2 and notification information from the communication terminal 11a.

More specifically, as shown in FIG. 1, the display information determination unit 13 includes a Priority determination unit 13a, a Status determination unit 13b, a PDN/PDP-Type determination unit 13c, an internet protocol (IP)-version determination unit 13d, a QCI determination unit 13e, an EPS bearer identifier (EBI)/network service access point identifier (NSAPI) determination unit 13f, a Linked-EBI/Linked-NSAPI determination unit 13g, a UE-Address determination unit 13h, a domain name system (DNS)-Address determination unit 13i, an Access-Point-Name determination unit 13j, and an NR measurement-related information determination unit 13k.

The pre-LTE, LTE, and NR systems share the Priority determination unit 13a, the Status determination unit 13b, the PDN/PDP-Type determination unit 13c, the internet protocol (IP)-version determination unit 13d, the QCI determination unit 13e, the EPS bearer identifier (EBI)/network service access point identifier (NSAPI) determination unit 13f, the Linked-EBI/Linked-NSAPI determination unit 13g, the UE-Address determination unit 13h, the domain name system (DNS)-Address determination unit 13i, and the Access-Point-Name determination unit 13j. The NR measurement-related information determination unit 13k processes only NR information.

The Priority determination unit 13a determines Priority, which is a number for distinguishing a packet data network (PDN) or a packet data protocol (PDP), inside the communication terminal measurement apparatus 10. When the communication terminal 11a performs transmission, the communication terminal measurement apparatus 10 automatically adds the Priority in response to the call from the communication terminal 11a. In addition, in a case where the communication terminal measurement apparatus 10 performs transmission, a tester operates the operation unit 2 to perform the setting in advance.

The PDN or PDP is a logical connection through packet data communication for each service between the terminal (hereinafter, also referred to as UE) 11 and the virtual connection destination 12 through a packet data communication network, and the logical connection is referred to as PDN in LTE and referred to as PDP in GSM (registered trademark)/W-CDMA.

The multi-PDP (multi-PDN) means a plurality of PDPs (PDNs), that is, multiple connections, and is roughly classified into two types of (A) and (B) shown below, and the two types may be mixed.

(A) PDPs based on completely different services are multiplexed. In this case, each communication destination has a different IP address, and the UE has multiple connections with communication destinations having different IP addresses. Each PDP-Type is Primary (default in LTE). In addition, one UE may perform a plurality of communications using a plurality of IP addresses in addition to a communication destination. Also in this case, the UE becomes multi-PDPs.

(B) PDPs based on mutually related services are multiplexed. For example, in a case where voice data is communicated using voice over internet protocol (VoIP), the UE exchanges control information (login, incoming call notification, and the like) with a session initiation protocol (SIP) server, and also exchanges voice data. In this case, the control information and the voice data are different PDPs, and are multi-PDPs. Here, in each PDP-Type, the control information is Primary (Default in LTE), and the voice data is Secondary (Dedicated in LTE).

It should be noted that the VoIP is a technology for compressing voice by various encoding methods, converting the voice into packets, and transmitting the packets in real time through an IP network. Since LTE is a packet-switched communication system, a telephone call is performed by the VoIP.

The SIP is a session control protocol for performing operations such as starting, changing, and ending a session in two-way real-time communication such as a telephone or a videophone. The SIP server used for VoIP performs relay of communication between UEs.

Figure 29:
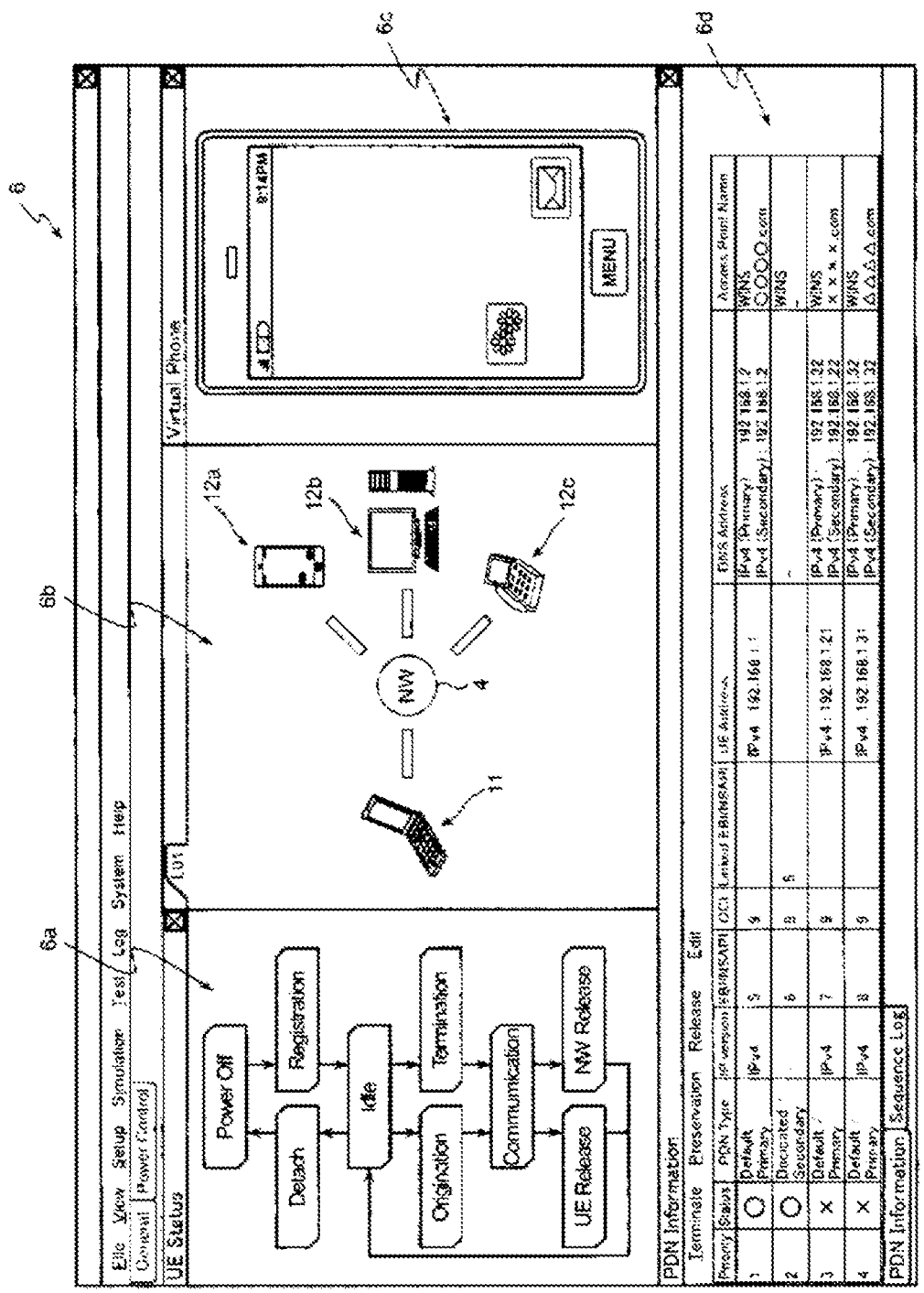
FIG. 29 is a prior art diagram showing a display example of measurement-related information of the communication terminal measurement apparatus according to an embodiment of the present invention.
Figure 30:
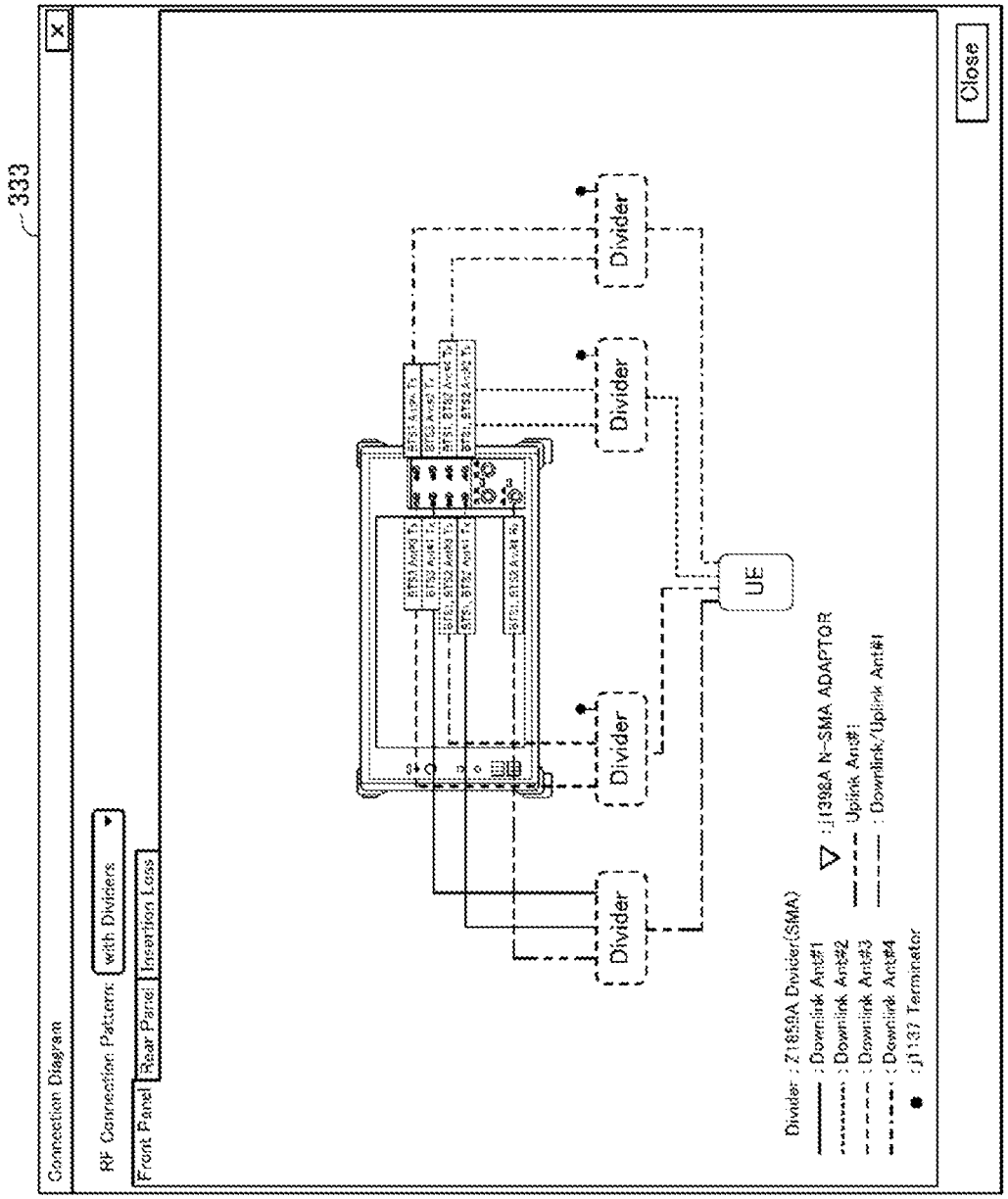
FIG. 30 is a diagram showing a display example of a connection confirmation/support screen in a conventional measurement device.

The Status determination unit 13b determines Status indicating a connection status. In the connection destination display unit 6d to be described later, the connection status (the status where PDN or PDP is registered) and the disconnection status (the status of PDN or PDP) are controlled by the display control unit 5 based on the Status determined by the Status determination unit 13b. As shown in FIG. 29, the two statuses (unregistered status) are distinguished and displayed by corresponding icons. The display is automatically switched by the communication terminal measurement apparatus 10 determining the status.

Here, the connection status is a status where an IP address is assigned, and the disconnection status is a status where an IP address is not assigned. Simply not communicating is not defined as a disconnection status. In the actual operation, even in a case where the wireless communication is cut off momentarily after entering the tunnel during the communication, the PDP registration is maintained, and the communication is resumed in a case where the wireless communication is restored. The disconnection status may occur due to spontaneous disconnection processing or a long timeout.

The PDN/PDP-Type determination unit 13c determines a PDN-Type indicating the type of PDN and a PDP-Type indicating the type of PDP.

There are two types of PDN-Type: Default and Dedicated, and two types of PDP-Type: Primary and Secondary.

Further, taking PDP-Type as an example, Primary is a PDP having an IP address, that is, a parent PDP. A plurality of Primary PDPs can exist.

The Secondary is a PDP having no IP address, that is, a child PDP. The Primary PDP can exist alone, whereas the Secondary PDP is subordinate to the Primary PDP. A plurality of Secondary PDPs can be subordinate to one Primary PDP. In PDN-Type, Default corresponds to Primary and Dedicated corresponds to Secondary.

The PDN/PDP-Type determination unit 13c differs in the method of determining the value of PDN-Type or PDP-Type depending on whether the communication standard is LTE or GSM/W-CDMA.

That is, in a case where the communication standard is LTE and the communication terminal 11a performs transmission, the communication terminal 11a determines and notifies the PDN-Type, and the PDN/PDP-Type determination unit 13c outputs the information to the display control unit 5. In a case where the communication standard is LTE and the communication terminal measurement apparatus 10 performs transmission, the tester operates the operation unit 2 to set the PDN/Type in advance through the PDN/PDP-Type determination unit 13c. It should be noted that the PDN-Type can also be automatically set by the communication terminal measurement apparatus 10.

In a case where the communication standard is GSM/W-CDMA and the communication terminal 11a performs transmission, the communication terminal 11a determines and notifies the PDP-Type, and the PDN/PDP-Type determination unit 13c outputs the information to the display control unit 5. Further, in a case where the communication standard is GSM/W-CDMA and the communication terminal measurement apparatus 10 performs transmission, the PDN/PDP-Type determination unit 13c responds to the notification of the Access-Point-Name from the communication terminal measurement apparatus 10, the communication terminal 11a notifies the PDP-Type and the NSAPI, and makes the determination on the basis of the information.

Then, in the multiplex-communication-related display unit 6d, which will be described later, under the control of the display control unit 5 based on the PDN-Type or PDP-Type determined by the PDN/PDP-Type determination unit 13c, for example, Default (Primary) or Dedicated (Secondary) is displayed in a display form shown in FIG. 29, for example.

The IP-version determination unit 13d determines an IP-version indicating the type of the IP. More specifically, in a case where the communication terminal 11a performs transmission, the communication terminal 11a determines and notifies the IP-version, and the IP-version determination unit 13d outputs the information to the display control unit 5. On the other hand, in a case where the communication terminal measurement apparatus 10 performs transmission, the tester operates the operation unit 2 to set the IP-version in advance. It should be noted that the communication terminal measurement apparatus 10 can automatically set the IP-version.

Then, in the multiplex-communication-related display unit 6d, which will be described later, under the control of the display control unit 5 based on the IP-version determined by the IP-version determination unit 13d, for example, any one of IPv4, IPv6, and IPv4v6 in the display form shown in FIG. 29 is displayed.

It should be noted that IPv4v6 means dual stack. The dual stack is a technology that uses IPv4 and IPv6 coexistently, and one communication terminal measurement apparatus 10 can have both IPv4 and IPv6 addresses and mix both protocols.

The QCI determination unit 13e determines a QCI that is an identification code indicating a class of a service associated with the service contents. This QCI is determined by the pseudo base transceiver station control unit 4 of the communication terminal measurement apparatus 10. Therefore, the tester operates the operation unit 2 to perform the setting in advance in both a case where the communication terminal 11a performs transmission and a case where the communication terminal measurement apparatus 10 performs transmission. It should be noted that the communication terminal measurement apparatus 10 can automatically set the QCI.

The EBI/NSAPI determination unit 13f determines NSAPI, which is basic information for identifying the PDN and EBI, which is basic information for identifying the PDP, on the basis of the ID allocated to the PDN or PDP. EBI/NSAPI is referred to as EBI in LTE and NSAPI in GSM/W-CDMA.

The EBI/NSAPI determination unit 13f has a different method of determining a value depending on whether the communication standard is LTE or GSM/W-CDMA.

That is, in a case where the communication standard is LTE and the communication terminal 11a performs transmission, the communication terminal 11a determines and notifies the EBI, the EBI/NSAPI determination unit 13f outputs the information to the display control unit 5. In the example in which the communication terminal 11a transmits using LTE, in the communication standard LTE, the communication terminal 11a notifies EBI "5" of PDN1 (Default)

and EBI "6" of PDN2 (Dedicated), and therefore the communication terminal 11a outputs the information to the display control unit 5. In addition, in a case where the communication standard is LTE and the communication terminal measurement apparatus 10 performs transmission, the tester operates the operation unit to set the EBI in advance through the EBI/NSAPI determination unit 13f. It should be noted that the communication terminal measurement apparatus 10 can automatically set the EBI.

On the other hand, in a case where the communication standard is GSM/W-CDMA and the communication terminal 11a performs transmission, the communication terminal 11a determines and notifies the NSAPI, and the EBI/NSAPI determination unit 13f outputs the information to the display control unit 5. In the example in which the communication terminal 11a transmits using GSM/W-CDMA, in the communication standard GSM/W-CDMA, the communication terminal 11a notifies the NSAPI "5" of PDN1 (Primary) and the NSAPI "6" of PDN2 (Secondary), and therefore the information is output to the display control unit 5. In addition, in a case where the communication standard is GSM/W-CDMA and the communication terminal measurement apparatus 10 performs transmission, the tester operates the operation unit 2 to set the NSAPI in advance through the EBI/NSAPI determination unit 13f. It should be noted that the communication terminal measurement apparatus 10 can automatically set NSAPI.

The Linked-EBI/Linked-NSAPI determination unit 13g determines Linked-EBI/Linked-NSAPI on the basis of setting information obtained by operating the operation unit 2 or information (notification information) included in a packet for each service from the communication terminal 11a. The Linked-EBI/Linked-NSAPI is subordinate relationship identification information that is allocated only to the Secondary PDP (Dedicated PDN) and indicates the subordinate relationship to which Primary PDP (Default PDN).

The method of determining the value of Linked-EBI/Linked-NSAPI by the Linked-EBI/Linked-NSAPI determination unit 13g differs depending on whether the communication standard is LTE or GSM/W-CDMA.

More specifically, in a case where the communication standard is LTE and the communication terminal 11a performs transmission, the communication terminal 11a determines and notifies Linked-EBI, and the Linked-EBI/Linked-NSAPI determination unit 13g outputs the information to the display control unit 5. In the example in which the communication terminal 11a performs transmission by LTE, in the communication standard LTE, the communication terminal 11a notifies of Linked-EBI "5" of PDN2 (Dedicated), and therefore the Linked-EBI "5" is output to the display control unit 5. In a case where the communication standard is LTE and the communication terminal measurement apparatus 10 performs transmission, the tester operates the operation unit 2 to set Linked-EBI in advance. It should be noted that the communication terminal measurement apparatus 10 can automatically set Linked-EBI.

On the other hand, in a case where the communication standard is GSM/W-CDMA and the communication terminal 11a performs transmission, first, there is a notification for setting the Primary PDP, which includes values of NSAPI and a transaction identifier (TI: an identifier for identifying the processing (processing group)). Next, there is a notification for setting the Secondary PDP, which includes the value of Linked-TI. Here, in a case where the value of the TI of the Primary PDP 1 and the value of the Linked-TI of the Secondary PDP 2 are the same, the Primary PDP 1 and the Secondary PDP 2 are in a parent-child relationship. Utilizing this, the Linked-EBI/Linked-NSAPI determination unit 13g determines which Primary PDP the Secondary PDP notified from the communication terminal 11a is subordinate to, and determines the NSAPI value of the master Primary PDP is determined as the value of the Linked-TI of the slave Secondary PDP. In the example in which the communication terminal 11a transmits using GSM/W-CDMA, in the communication standard GSM/W-CDMA, since the value of the TI of the Primary PDP1 and the value of the Linked-TI of the Secondary PDP2 are both "0" and the same value, it is determined that the Primary PDP1 and the Secondary PDP2 have a parent-child relationship. Thus, the NSAPI value "5" of the master Primary PDP1 is determined as the Linked-NSAPI value "5" of the slave Secondary PDP2.

In a case where the communication standard is GSM/W-CDMA and the communication terminal measurement apparatus 10 performs transmission, the tester operates the operation unit 2 to set Linked-NSAPI in advance. It should be noted that the communication terminal measurement apparatus 10 can automatically set Linked-NSAPI.

In this example, in the communication standard GSM/W-CDMA, the one corresponding to the Linked-EBI of the communication standard LTE is called Linked-NSAPI.

Then, in the multiplex-communication-related display unit 6d to be described later, under the control of the display control unit 5 based on the Linked-EBI or the Linked-NSAPI determined by the Linked-EBI/Linked-NSAPI determination unit 13g, the values of the master EBI and NSAPI are displayed in, for example, a display form shown in FIG. 29.

The UE-Address determination unit 13h determines the UE-Address that is the IP address of the communication terminal 11a as a test target. The pseudo base transceiver station control unit 4 of the communication terminal measurement apparatus 10 determines the IP address of the communication terminal 11a. Therefore, the tester operates the operation unit 2 to perform the setting in advance in both a case where the communication terminal 11a performs transmission and a case where the communication terminal measurement apparatus 10 performs transmission. It should be noted that the communication terminal measurement apparatus 10 can automatically set the IP address of the communication terminal 11a.

The DNS-Address determination unit 13i determines a DNS-Address, which is the address of a DNS server. The DNS-Address is set in advance by the tester operating the operation unit 2. It should be noted that the DNS-Address can be automatically set by the communication terminal measurement apparatus 10.

The DNS server is a server that manages the association between a domain name and an IP address. The communication terminal measurement apparatus 10 has a pseudo network function inside, and also simulates the DNS server. The "Primary/Secondary" of DNS-Address means a main system and a sub system (two or more DNS servers are usually provided).

Then, in the multiplex-communication-related display unit 6d to be described later, under the control of the display control unit 5 based on the DNS-Address determined by the DNS-Address determination unit 13i, the DNS server address is displayed in, for example, a display form shown in FIG. 29.

The Access-Point-Name determination unit 13j determines Access-Point-Name, which is the domain name of the communication carrier. The communication terminal 11a such as a mobile phone, which performs communication under contract with a specific communication carrier, performs communication through the Access-Point of the communication carrier. The communication terminal measurement apparatus 10 has a pseudo network function inside, and also simulates the domain of the communication carrier.

In a case where the communication terminal 11a performs transmission, the communication terminal 11a determines and notifies the Access-Point-Name, and the Access-Point-Name determination unit 13j outputs the information to the display control unit 5. In a case where the communication terminal measurement apparatus 10 performs transmission, the tester operates the operation unit 2 to set the Access-Point-Name in advance through the Access-Point-Name determination unit 13j.

It should be noted that the communication terminal measurement apparatus 10 is able to automatically set Access-Point-Name. Actually, the tester who is a communication terminal developer knows what Access-Point-Name the communication terminal 11a notifies, and sets the Access-Point-Name in the communication terminal measurement apparatus 10.

In a case of measuring the communication terminal 11a, the NR measurement-related information determination unit 13k monitors a simulative communication operation in which the virtual NR network 12d simulates base transceiver stations in the NR area and the LTE area with the communication terminal 11a under the control of the pseudo base transceiver station control unit 4, and outputs various kinds of information, which are transmitted to and received from the communication terminal 11a in the simulative communication operation, as NR measurement-related information to the display control unit 5.

Further, in the present embodiment, the display unit 6 has an NR measurement-related display unit 6e having a screen configuration different from the screen configuration shown in FIG. 29. The NR measurement-related display unit 6e is a functional unit that displays NR measurement-related information which is input from the NR measurement-related information determination unit 13k, and displays a main screen 33a (refer to FIG. 10) relating to measurement of the communication terminal 11a, which will be described later, and various screens of the lower hierarchy thereof, that is, a simulation model setting screen 33b (refer to FIGS. 11, 12, and 13), a connection confirmation/support screen (refer to FIGS. 14, 15, and 16), a DC operation confirmation screen (refer to FIGS. 17 and 18), and a test case view screen (refer to FIG. 19), a component confirmation screen (refer to FIGS. 20 and 21), a power characteristic confirmation screen 33j (refer to FIG. 22), and a throughput confirmation screen 33k (refer to FIG. 23). In the present embodiment, the display control unit 5 also controls the display of the NR measurement-related information to the NR measurement-related information determination unit 13k.

Figure 2:
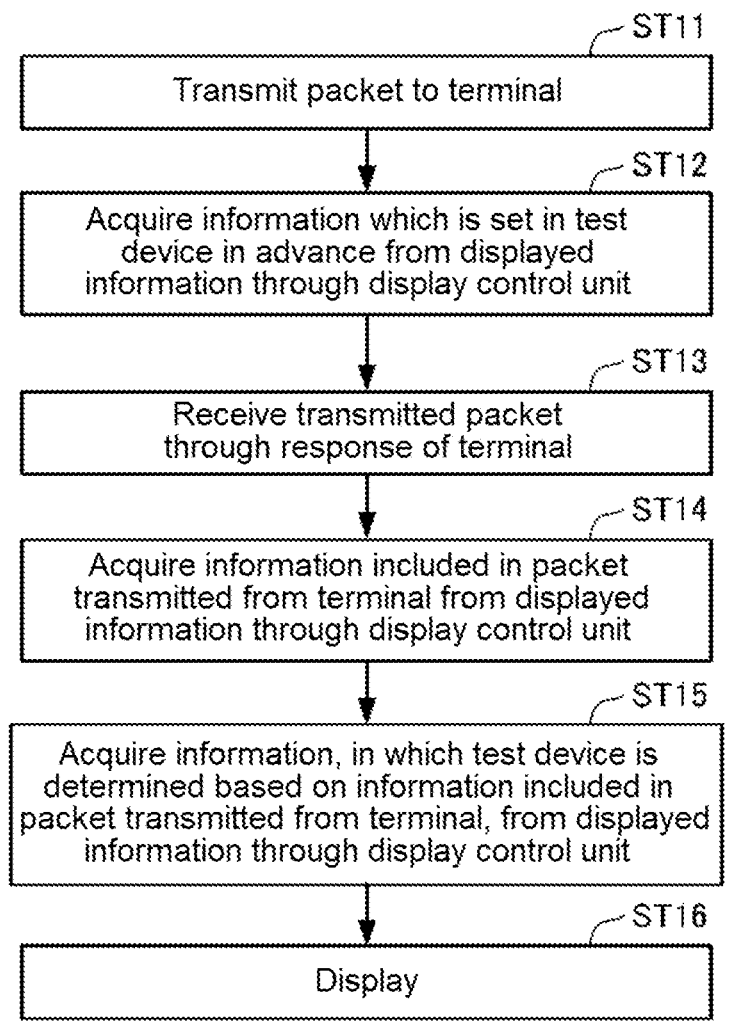
FIG. 2 is a flowchart showing an example of a display processing procedure in a case where a communication terminal measurement apparatus according to an embodiment of the present invention performs transmission.
Figure 3:
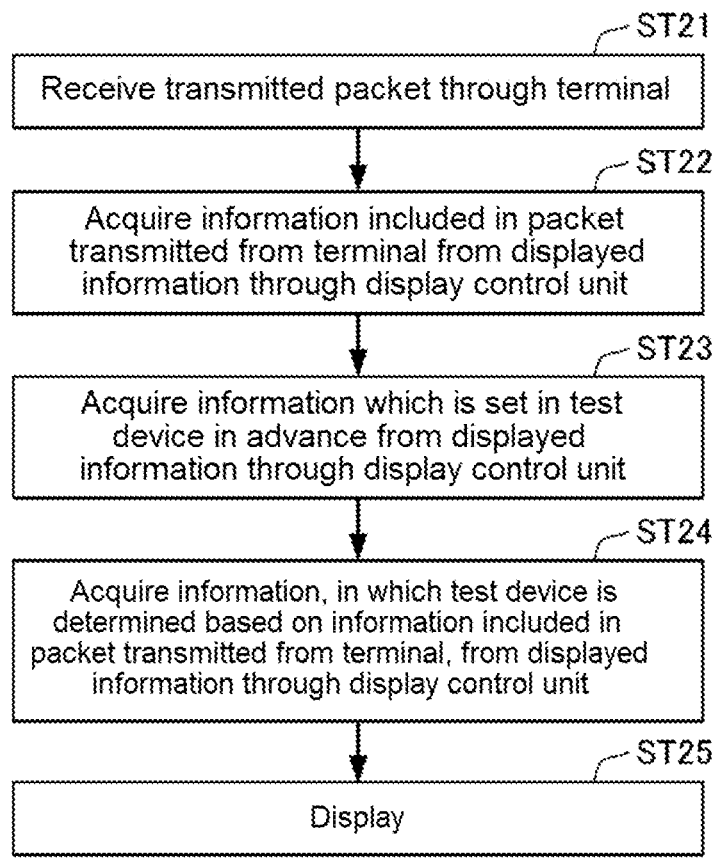
FIG. 3 is a flowchart showing an example of a display processing procedure in a case where a mobile communication terminal as a measurement target by the communication terminal measurement apparatus according to an embodiment of the present invention performs transmission.

Next, the display processing operation of the multiplex-communication-related information in the communication terminal measurement apparatus 10 configured as described above will be described with reference to the flowcharts of FIGS. 2 and 3. First, a display processing procedure in a case where the communication terminal measurement apparatus 10 performs transmission will be described with reference to a flowchart of FIG. 2.

Under the control of the pseudo base transceiver station control unit 4, the communication terminal measurement apparatus 10 transmits a packet from the transmitting/receiving unit 3 to the communication terminal 11a (ST11). Then, the display control unit 5 acquires information, which is set in advance in the communication terminal measurement apparatus 10 through the operation input of the operation unit 2, from the information displayed on the display unit 6 through the pseudo base transceiver station control unit 4 (ST12). Subsequently, the communication terminal measurement apparatus 10 receives the packet transmitted by the communication terminal 11a in response to the transmitting/receiving unit 3 (ST13). After that, in the communication terminal measurement apparatus 10, the display control unit 5 acquires information, which is included in the packet from the communication terminal 11a, from the information displayed on the display unit 6 through the pseudo base transceiver station control unit 4 (ST14). Next, in the communication terminal measurement apparatus 10, the display control unit 5 acquires the information, which is determined by the display information determination unit 13 on the basis of the information included in the packet from the communication terminal 11a, from the information displayed on the display unit 6 through the pseudo base transceiver station control unit 4. (ST15). Then, the display unit 6 displays the information acquired by the display control unit 5 in, for example, a display form shown in FIG. 29 (ST16).

Next, a display processing procedure in a case where the communication terminal 11a performs transmission will be described with reference to a flowchart of FIG. 3.

In the communication terminal measurement apparatus 10, in a case where the transmitting/receiving unit 3 receives the packet transmitted by the communication terminal 11a under the control of the pseudo base transceiver station control unit 4 (ST21), the display control unit 5 acquires the information, which is included in the packet from the communication terminal 11a, from the information displayed on the display unit 6 through the pseudo base transceiver station control unit 4 (ST22). Subsequently, the display control unit 5 of the communication terminal measurement apparatus 10 acquires information preset in the communication terminal measurement apparatus 10 from the information displayed on the display unit 6 through the pseudo base transceiver station control unit 4 (ST23). Next, in the communication terminal measurement apparatus 10, the display control unit 5 acquires the information, which is determined by the display information determination unit 13 on the basis of the information included in the packet from the communication terminal 11a, from the information displayed on the display unit 6 through the pseudo base transceiver station control unit 4. (ST24). Then, the display unit 6 displays the information acquired by the display control unit 5 in, for example, a display form shown in FIG. 29 (ST25).

Next, a measurement operation of the communication terminal 11a in the communication terminal measurement apparatus 10 according to the present embodiment and a display processing procedure for displaying the NR measurement-related information relating to the measurement will be described. First, the measurement operation of the communication terminal 11a will be described. The communication terminal measurement apparatus 10 according to the present embodiment is able to measure the communication terminal 11a, for example, with a connection configuration as shown in FIG. 4.

Figure 4:
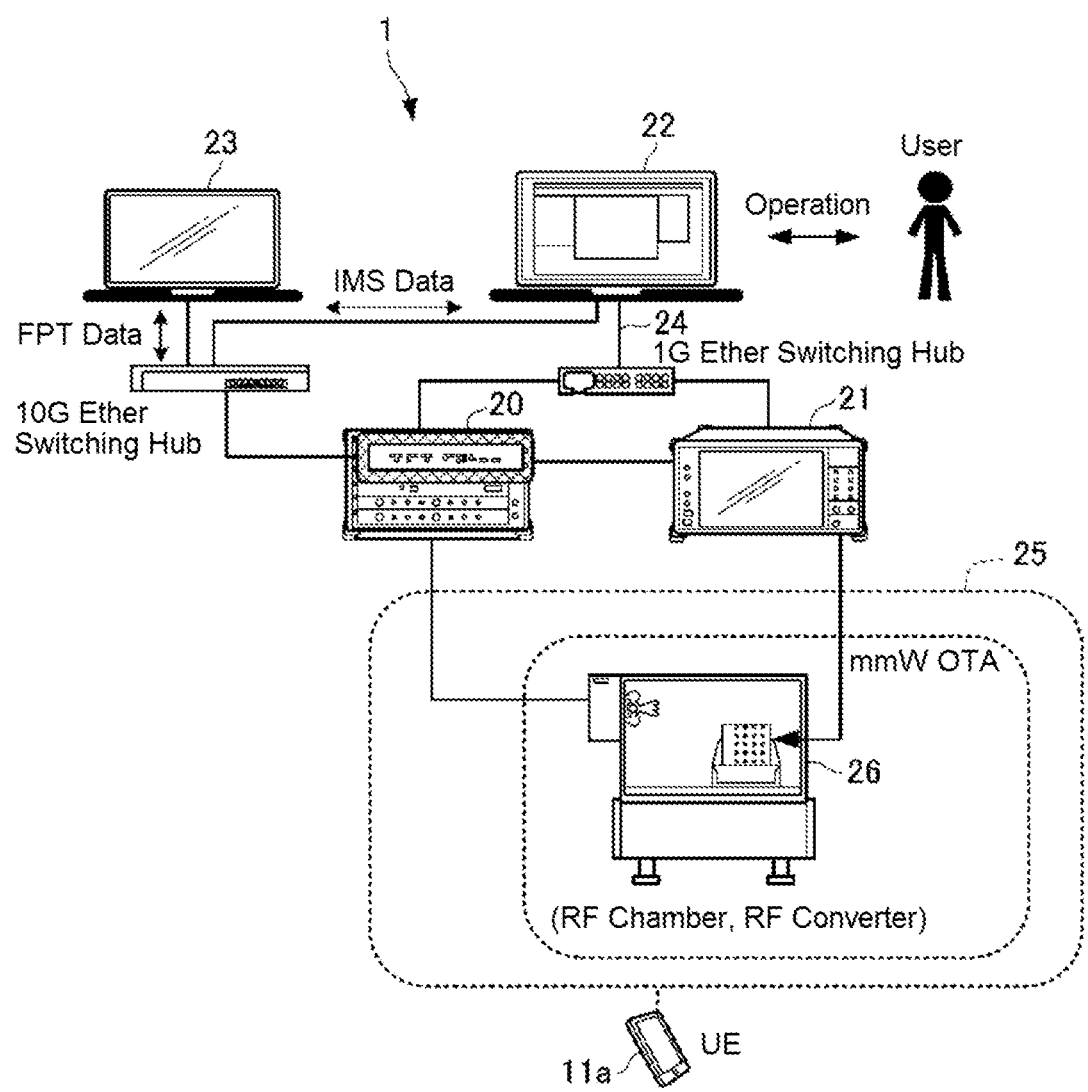
FIG. 4 is a block diagram showing a connection configuration for measurement of the communication terminal measurement apparatus according to an embodiment of the present invention.

FIG. 4 particularly shows an example of the following configuration. An NR measurement device 20 that simulates the communication function of the base transceiver station in the NR area of the non-standalone NR network, an LTE measurement device 21 that are configured separately from the NR measurement device 20 and that simulates a communication function of the base transceiver station in the LTE area of the non-standalone NR network, and a control device 22 that collectively controls the NR measurement device 20 and the LTE measurement device 21 are connected through the network 24. The control device 22 is also connected through a network 24 to an application server 23 which is an external server.

The NR measurement device 20 and the LTE measurement device 21 are connected to a measurement mechanism unit 25 including a holding mechanism that holds the communication terminal 11a as a measurement target (corresponding to the user equipment UE in FIG. 4). The measurement mechanism unit 25 is configured as follows. For example, the communication terminal 11a as a measurement target and a measurement antenna (a transmission-only antenna, a reception-only antenna, and a transmitting/receiving antenna), which is capable of communicating with a not-shown antenna built in the communication terminal 11a by a predetermined radio frequency signal, are accommodated in, for example, an over-the-air (OTA) chamber 25a.

In the connection configuration of the communication terminal measurement apparatus 10 shown in FIG. 4, in a case of performing a test in a wide frequency band usable by the communication terminal 11a, in some cases, RF converters (refer to the RF converter 27 shown in FIG. 1 and the RF converter images 27a, 27b, 27c, and 27d shown in FIG. 15) covering different frequency bands in the above-described frequency band may be disposed between the NR measurement device 20 and the antenna of the communication terminal 11a.

Figure 5:
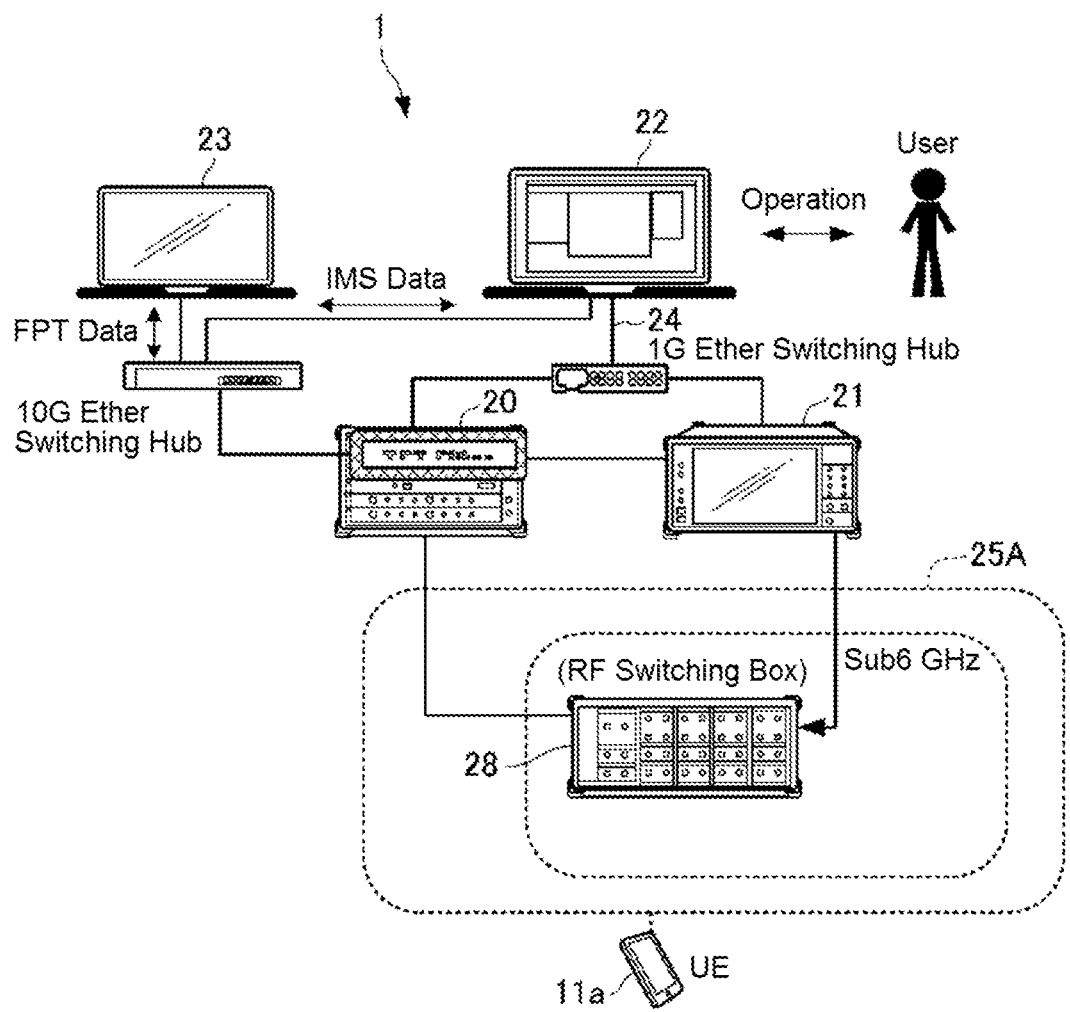
FIG. 5 is a block diagram showing another connection configuration for measurement of the communication terminal measurement apparatus according to an embodiment of the present invention.

Further, the communication terminal measurement apparatus 10 according to the present embodiment can be operated in the connection configuration shown in FIG. 5 instead of the connection configuration shown in FIG. 4. In the connection configuration shown in FIG. 5, a switching box 28 is disposed between the NR measurement device 20 and the antenna of the communication terminal 11a, and serves as a wired connection section in which the NR measurement device and the antenna of the communication terminal 11a are connected by a cable. The switching box 28 is a module having a path switching function capable of realizing all connection paths, which can be simulated by the NR measurement device 20, to an antenna used by the communication terminal 11a.

Figure 6:
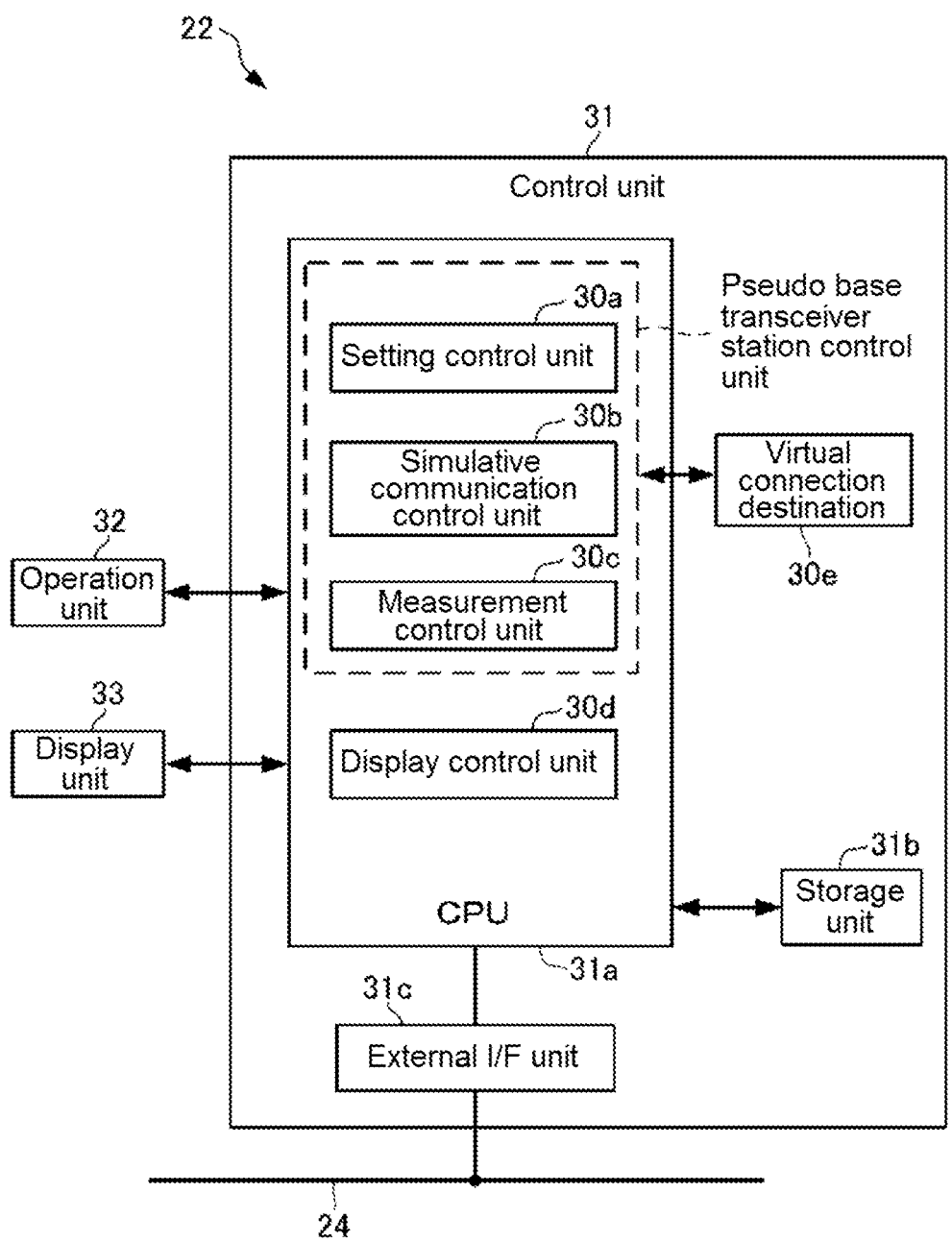
FIG. 6 is a block diagram showing a functional configuration of a control device in FIG. 4.

The control device 22 functions as a control PC (corresponding to the control PC 1A in FIG. 1) that controls the NR measurement device 20 and the LTE measurement device 21 with a computer device such as a personal computer (PC). The control device 22 includes, for example, a control unit 31, an operation unit 32, and a display unit 33, as shown in FIG. 6. The control unit 31 has a CPU 31a, a storage unit 31b, and an external interface (I/F) unit 31c. The CPU 31a realizes, for example, a setting control unit 30a, a simulative communication control unit 30b, a measurement control unit 30c, and a display control unit 30d to be described later by executing a program stored in the storage unit 31b. The operation unit 32 and the display unit 33 have the same configuration as the operation unit 2 and the display unit 6 described above. The external interface (I/F) unit 31c performs an interface function for connecting the control device 22 to the NR measurement device 20 and the LTE measurement device 21 through the network 24.

In the control device 22, the CPU 31a has a setting control unit 30a, a simulative communication control unit 30b, a measurement control unit 30c, a display control unit 30d, and a virtual connection destination 30e.

The setting control unit 30a performs setting of a scenario (including a base transceiver station as a simulative communication target) for measurement of the communication terminal 11a and various kinds of setting processing of simulation parameters and the like. The simulative communication control unit 30b performs a simulative communication operation. In the simulative communication operation, communication between the NR base transceiver station and the LTE base transceiver station and the communication terminal 11a as a measurement target, for which a combination for performing simulative communication is set in advance, is simulated using the simulation parameters in accordance with the above-described scenario.

The measurement control unit 30c acquires signals transmitted and received between the NR base transceiver station and the LTE base transceiver station and the communication terminal 11a during the simulative communication operation, and performs control such that the measurement unit measures whether or not the communication terminal 11a operates normally.

The display control unit 30d performs display control for causing the display unit 33 to display measurement-related information (information for detecting a combination of base transceiver stations performing the simulative communication, the used carrier, and the like) relating to the measurement of the communication terminal 11a based on signals transmitted and received between the communication terminal 11a, the NR base transceiver station, and the LTE base transceiver station during the simulative communication operation, in association with the type of the radio access system (RAT).

The setting control unit 30a, the simulative communication control unit 30b, and the measurement control unit 30c of the control device 22 correspond to the pseudo base transceiver station control unit 4 in FIG. 1. The display control unit 30d of the control device 22 corresponds to the display control unit 5 and the NR measurement-related display unit 6e shown in FIG. 1. The virtual connection destination 30e of the control device 22 corresponds to the virtual connection destination 12 in FIG. 1.

In the connection configurations shown in FIGS. 4 and 5, the control device 22, the NR measurement device 20, and the LTE measurement device 21 respectively constitute as a pseudo base transceiver station control unit, a first measurement device, and a second measurement device of the present invention. In the block diagram shown in FIG. 5, the display control unit 30d constitutes a display control unit of the present invention.

Next, a display processing procedure for displaying the NR measurement-related information relating to the measurement of the communication terminal 11a of the communication terminal measurement apparatus 10 according to the present embodiment will be described with reference to the flowcharts shown in FIGS. 7 and 9. First, the display processing procedure of the communication terminal 11a before the start of measurement will be described with reference to the flowchart shown in FIG. 7.

In the communication terminal measurement apparatus 10 according to the present embodiment, it is necessary to set the number of RAT cells and the simulation parameters before the measurement of the communication terminal 11a. In the communication terminal measurement apparatus 10 having the connection configuration shown in FIG. 4, in the control device 22, in a case where the measurement request of the communication terminal 11a is input from the operation unit 32, the display control unit 30d causes the display unit 33 to display, for example, the main screen 33a relating to the NR measurement shown in FIG. 10 (step S31).

In a state where the main screen 33a is being displayed, the display control unit 30d determines whether or not a RAT cell number setting request is input (step S32). Here, if it is determined that the RAT cell number setting request is not input (NO in step S32), the processing proceeds to step S37.

Figure 11:
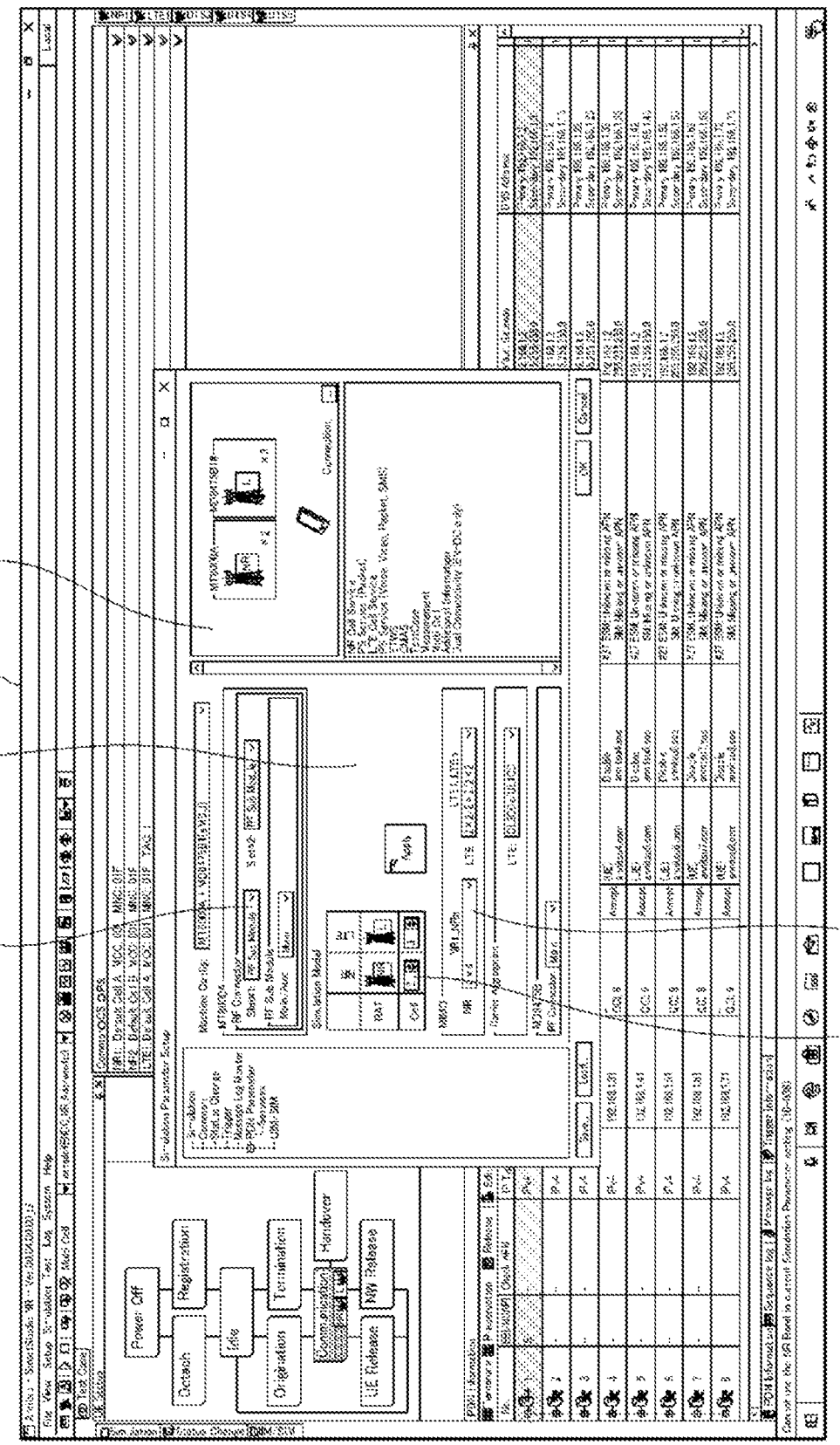
FIG. 11 is a diagram showing a display example of a simulation model setting screen used for measuring a terminal of the communication terminal measurement apparatus according to an embodiment of the present invention.

In contrast, if it is determined that the RAT cell number setting request is input (YES in step S32), then display control unit 30d causes the display unit 33 to display a simulation model setting screen 33b in the lower hierarchy of the main screen 33a (Step S33). The simulation model setting screen 33b has, for example, a simulation model setting area (RAT cell number setting screen) 33b1 (refer to FIG. 12) and a simulation model display area 33b2 (refer to FIG. 13), as shown in FIG. 11.

In a state where the simulation model setting screen 33b is being displayed, the setting control unit 30a executes a setting processing of the number of RAT cells and a simulation model setting confirmation processing on the basis of the input from the operation unit 32 (step S34).

Further, while executing the setting processing in step S34, the display control unit 30d determines whether or not a simulation parameter setting request is input (step S35). If it is determined that the simulation parameter setting request is not input (NO in step S35), the processing proceeds to step S37.

In contrast, if it is determined that the simulation parameter setting request is input (YES in step S35), the display control unit 30d, for example, displays the simulation parameter setting area 33a4 (simulation parameter setting screen 33c) on the main screen 33a (refer to FIG. 10), and the setting control unit 30a executes simulation parameter setting processing while receiving an operation input from the operation unit 32 on the simulation parameter setting screen 33c (step S36).

During the display processing of the simulation parameter setting screen 33c in step S36 or after the display processing is completed, for example, in a state where the display is returned to the display of the main screen 33a, the display control unit 30d determines whether or not a setting confirmation request for issuing an instruction to confirm the setting contents is input (step S37). Here, if it is determined that the setting confirmation request is not input (NO in step S37), the processing proceeds to step S39.

In contrast, if it is determined that the setting confirmation request is input (YES in step S37), the display control unit 30d causes the display unit 33 to display a setting confirmation screen corresponding to the request contents (step S38).

Figure 13:
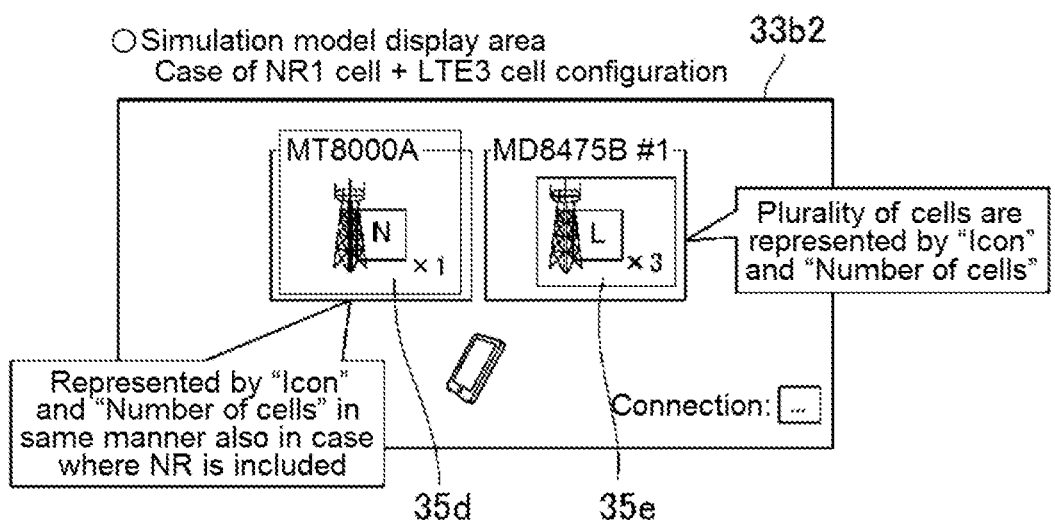
FIG. 13 is a diagram showing a display example of a simulation model display area of a simulation model setting screen used for communication terminal measurement of the communication terminal measurement apparatus according to an embodiment of the present invention.
Figure 14:
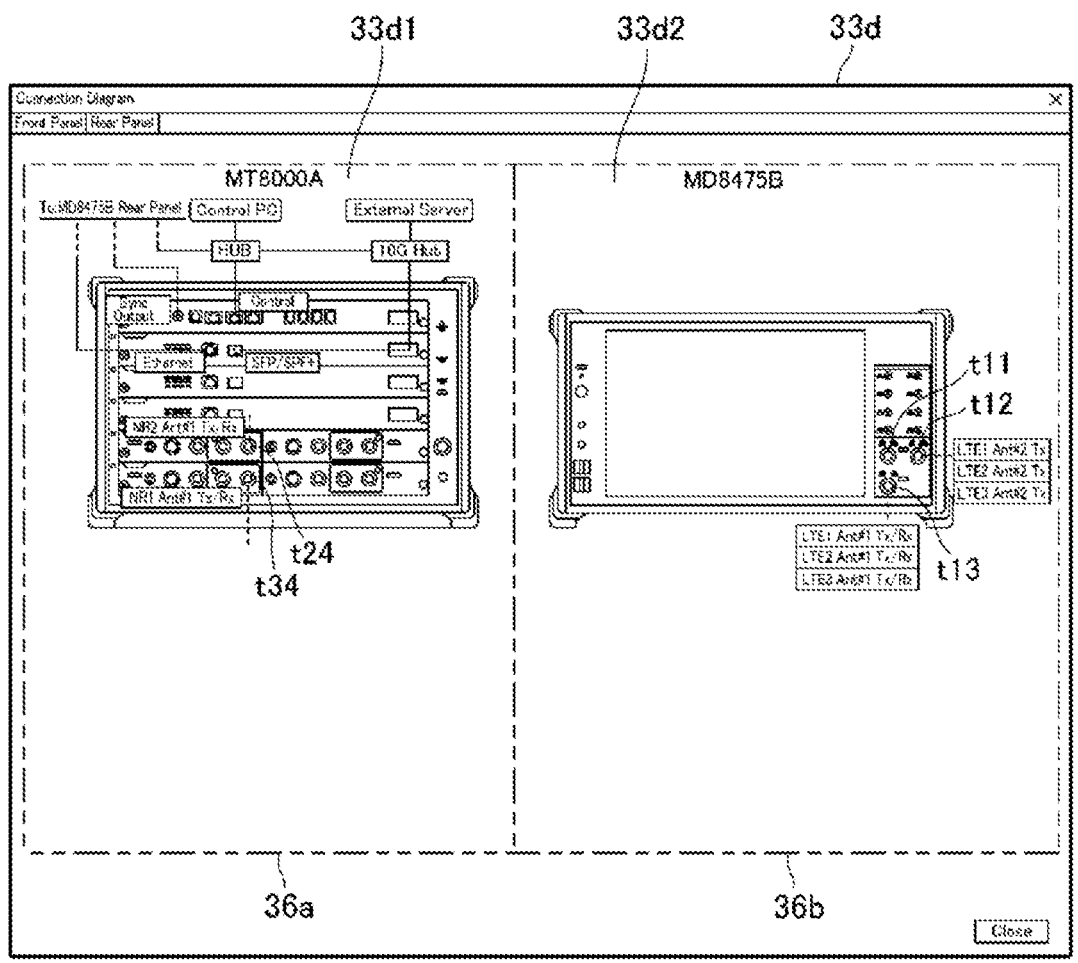
FIG. 14 is a diagram showing a display example of a connection confirmation/support screen used for communication terminal measurement of the communication terminal measurement apparatus according to an embodiment of the present invention.
Figure 15:
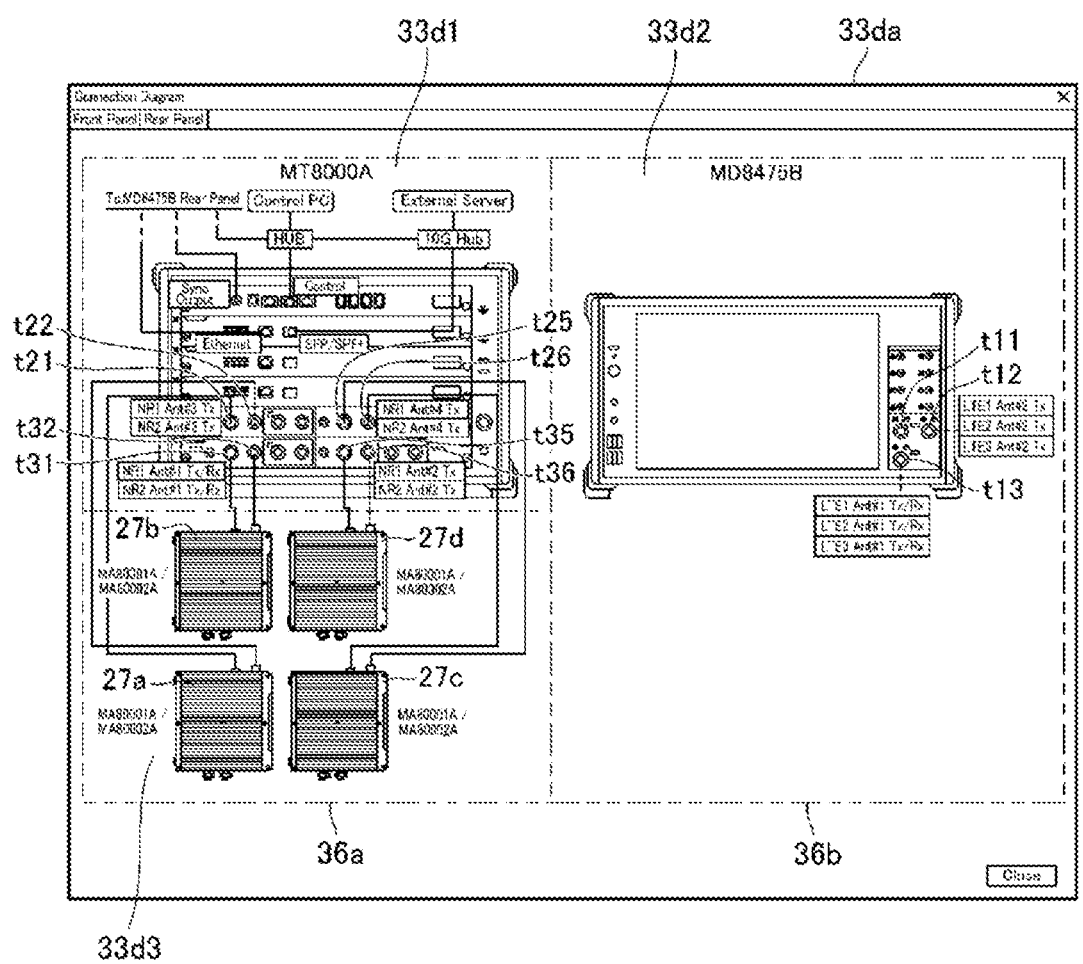
FIG. 15 is a diagram showing a display example of another connection confirmation/support screen used for communication terminal measurement of the communication terminal measurement apparatus according to an embodiment of the present invention.
Figure 16:
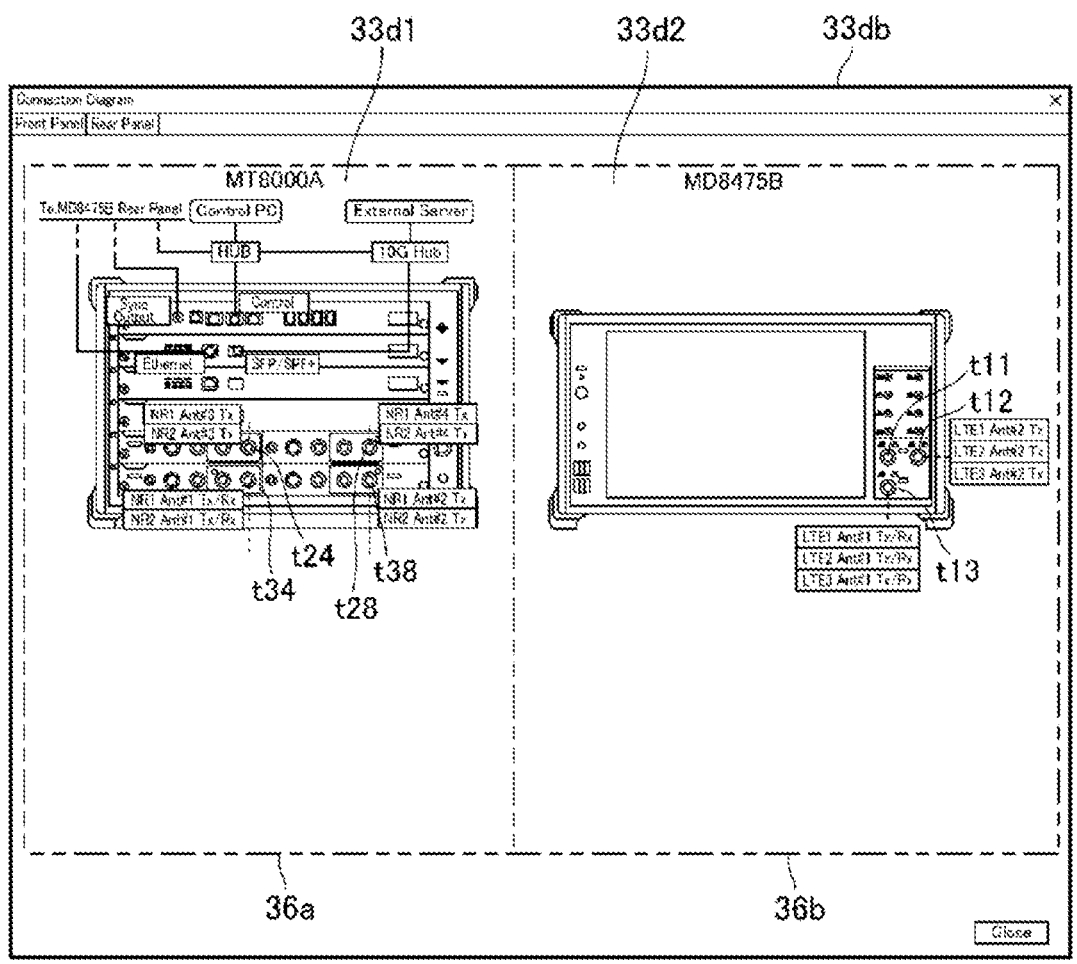
FIG. 16 is a diagram showing a display example of still another connection confirmation/support screen used for communication terminal measurement of the communication terminal measurement apparatus according to an embodiment of the present invention.

Regarding the processing in steps S37 and S38 described above, in a case where the simulation setting confirmation request is input in step S37, the display control unit 30d displays, for example, a simulation model setting screen 33b (refer to FIG. 11) having a simulation model display area 33b2 as shown in FIG. 13 in step S38. Further, in a case where a connection confirmation/support request is input in step S37, the display control unit 30d displays a connection confirmation/support screens 33d, 33da, and 33db as shown in FIGS. 14 to 16, for example, in step S38. Display control of the connection confirmation/support screens 33d, 33da, and 33db will be described in detail with reference to FIG. 8.

In a state where the various setting confirmation screens are being displayed in step S38, the display control unit 30d determines whether or not an end request for issuing an instruction to end the processing is input (step S39). If it is determined that the end request is not input (NO in step S39), the display control unit 30d returns to step S31 in accordance with the instruction to return the processing, and continues the processing after step S31 on the display of the main screen 33a.

In contrast, if it is determined that the end request is input (YES in step S39), the display control unit 30d ends the above-described series of display control in the setting stage.

Next, the display forms of the main screen 33a (refer to FIG. 10) displayed in each step relating to the series of display control shown in FIG. 7, the simulation model setting screen 33b (refer to FIGS. 11, 12, and 13), a simulation parameter setting screen 33c (refer to FIG. 10), and the connection confirmation/support screen 33d (refer to FIGS. 14 to 16) will be described in more detail.

Figure 7:
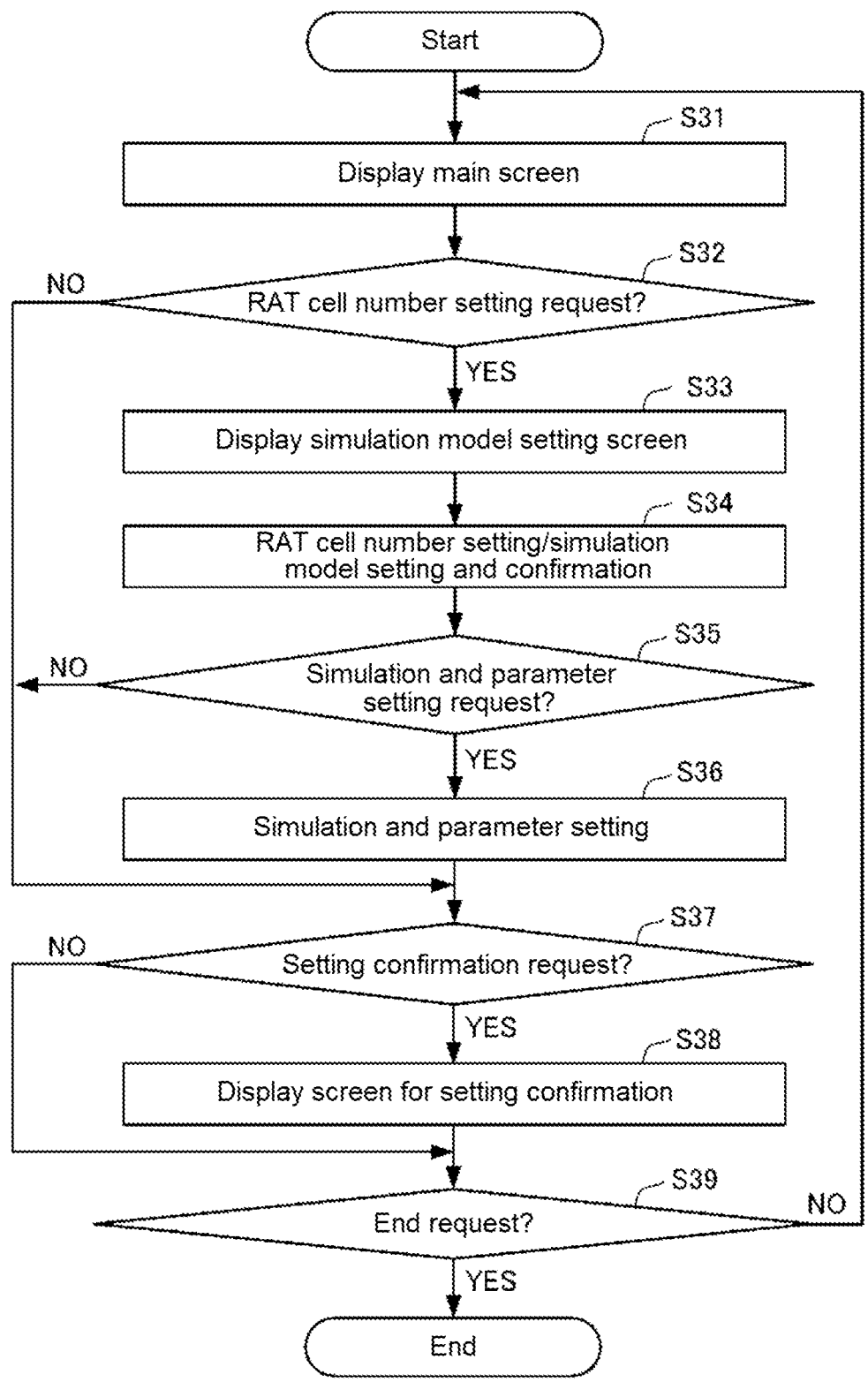
FIG. 7 is a flowchart showing an example of a display processing procedure in a terminal measurement parameter setting stage of the communication terminal measurement apparatus according to an embodiment of the present invention.
Figure 10:
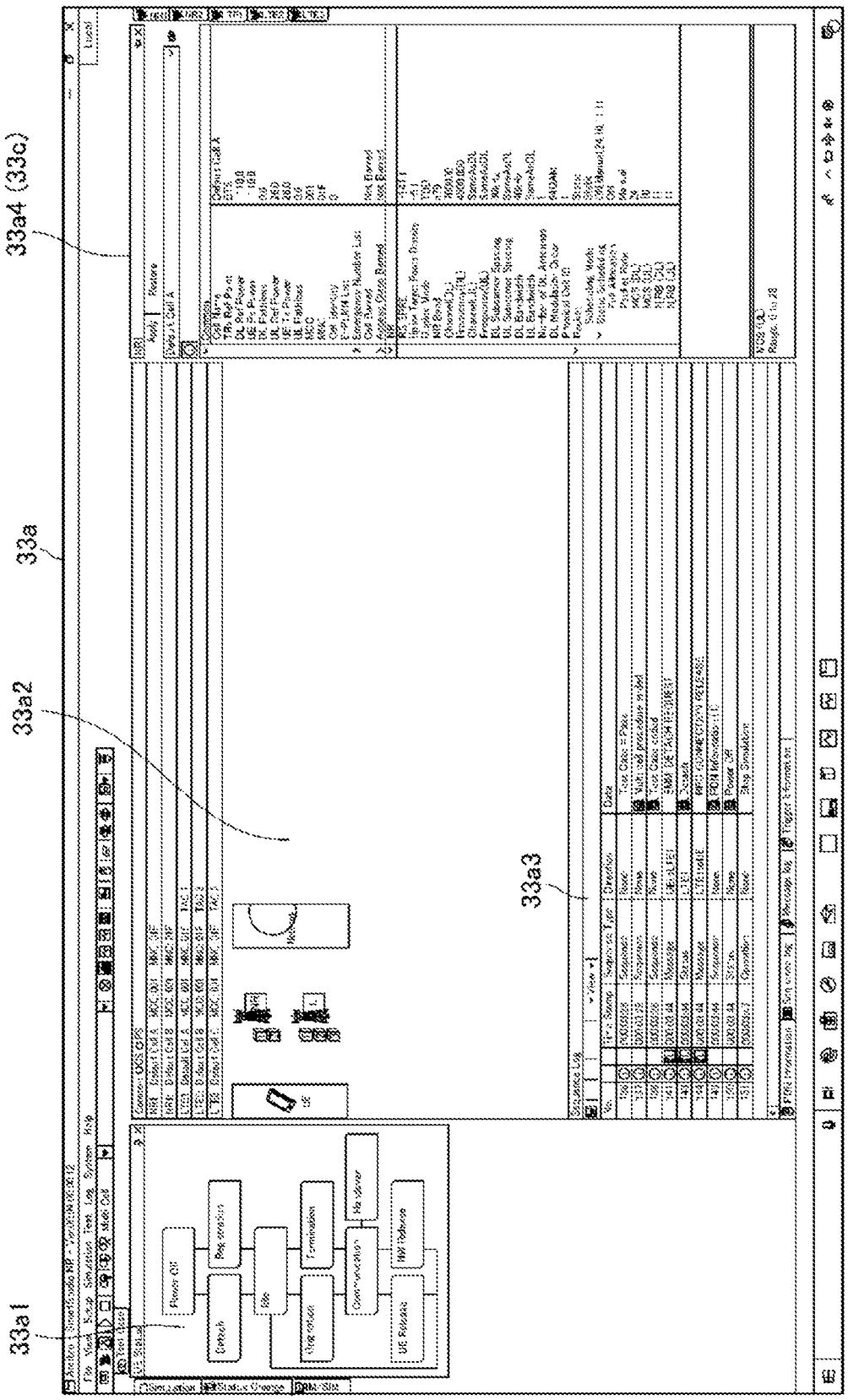
FIG. 10 is a diagram showing a display example of a main screen used for measurement of a terminal of the communication terminal measurement apparatus according to an embodiment of the present invention.

As shown in FIG. 10, the main screen 33a displayed in step S31 in FIG. 7 has a sequence display area 33a1, a connection status display area 33a2, a sequence log display area 33a3, and a simulation parameter setting area 33a4.

The sequence display area 33a1 has a function equivalent to that of the sequence display unit 6a in the configuration of the display unit 6 shown in FIG. 29. The sequence display area 33a1 is an area for displaying which sequence status the communication terminal 11a as a measurement target is in. The sequence status is any of "Power Off", "Detach (position Registration)", "Registration (position registration)", "Idle (standby status)", "Origination (outgoing)", "Termination (incoming)", "Communication (communication status)", "UE (user equipment) Release (communication terminal disconnection)", "NW (network) Release (connection destination disconnection)", "Handover", and the like.

The connection status display area 33a2 is an area in which the connection status between the communication terminal 11a and the virtual connection destination (non-standalone NR) through the communication terminal measurement apparatus 10 is displayed. The connection status display area 33a2 does not display the connection status in a case where the number of RAT cells is not set. On the other hand, after the setting of the number of RAT cells is performed, a connection status according to the setting contents is displayed. The connection status is displayed as an image which indicates the connection status of both cells by using an NR cell icon indicating an NR base transceiver station cell (hereinafter, NR cell) corresponding to a set cell in the NR area, and an LTE cell icon indicating an LTE base transceiver station cell (hereinafter, LTE cell) corresponding to a set cell in the LTE area.

The sequence log display area 33a3 is an area for displaying a log relating to the sequence of the communication terminal 11a as a measurement target in association with the time stamp, sequence type, direction (Direction), and remarks (Date).

The simulation parameter setting area 33a4 is a display area as the simulation parameter setting screen 33c for setting simulation parameters for the set NR cells and LTE cells after setting of the number of RAT cells. The simulation parameter setting screen 33c can be displayed on the main screen 33a, for example, by clicking the connection status display area 33a2.

The simulation parameter setting screen 33c is configured to be able to switch the cell as a setting target. With such a configuration, it is possible to set simulation parameters for all NR cells (for example, NR1 and NR2) and LTE cells (for example, LTE1, LTE2, and LTE3) corresponding to the NR cell icon and the LTE cell icon whose connection status is being displayed.

The simulation parameter setting screen 33c has, as setting items, common items common to NR and LTE, and unique items unique to each NR and LTE. The common items include Cell Name, TRx Ref point, DL Ref Power, UE Rx Power, DL Pathloss, UL Ref Power, UE Tx Power, UL Pathloss, MCC, MNC, Call Identity, and the like. The unique items (for example, in the case of NR cells) include RS EPRE, Uplink Target Power Density, Duplex Mode, NR Band, Channel (DL), Frequency (DL), Channel (UL), Frequency (UL), DL Subcamer Spacing, UL Subcamer Spacing, DL BandWidth, UL BandWidth, and the like.

The main screen 33a having the above configuration is displayed on the display unit 33 through the display control of the display control unit 30d (refer to step S31 in FIG. 7). At this time, if the number of RAT cells is set in advance, the display control unit 30d displays the connection status between the set cells in the connection status display area 33a2 of the main screen 33a in, for example, a form shown in FIG. 10.

Here, the display control unit 30d displays one NR cell icon (first cell icon) indicating that the base transceiver station (NR cell) is compliant with the NR communication standard and one LTE cell icon (second cell icon) indicating that the base transceiver station is compliant with the LTE communication standard. The display control unit 30d performs the display such that the same number of figures as the number of base transceiver stations compliant with the NR communication standard are arranged in a line in association with the NR cell icon, and performs the display such that the same number of figures as the number of base transceiver stations compliant with the LTE communication standard are arranged in a line in association with the LTE cell icon.

The display control unit 30d displays rectangular frames as the figures, and displays a number for identifying a number for identifying the base transceiver station compliant with the NR communication standard and the base transceiver station compliant with the LTE communication standard for each of the rectangular frames. The figure may show a box shape of which one surface is the rectangular frame, and the figure may be displayed in a vertically stacked form.

Specifically, in the example of FIG. 10, the display control unit 30d displays the connection status in the NR area, in the connection status in the NR area and the cell connection status in the LTE area displayed in the connection status display area 33a2, in a form in which the number of box shapes (the box shape of which one surface is the rectangular frame) corresponding to the NR cells in the NR area relating to the measurement of the terminal are vertically stacked to be adjacent to one NR cell icon indicating a base transceiver station (NR cell) in the NR area. In this example, since two NR cells are set, the image is displayed as an image in which two box shapes are vertically stacked. In each box-shaped rectangular frame, a numerical value indicating the base transceiver station number of the NR cell is noted. The NR cell icon is represented by the reference sign of "NR" indicating the area type.

In addition, the display control unit 30d displays the connection status in the LTE area in a form in which the number of box shapes corresponding to the LTE cells in the LTE area relating to the measurement of the communication terminal 11a are vertically stacked to be adjacent to one LTE cell icon indicating a base transceiver station (LTE cell) in the LTE area. In this example, since three LTE cells are set, three LTE cells are displayed as an image in which the cells are vertically stacked. In each box-shaped rectangular frame, a numerical value indicating the base transceiver station number of the LTE cell is noted. The LTE cell icon is represented by "L" as the reference sign of LTE indicating the area type.

According to the display form shown in FIG. 10 of the set connection status relating to the NR cell and the LTE cell, even in a case where the number of cells which are set in the NR area and the LTE area increases, the NR cell icon and the LTE cell icon does not increase. In addition, the area for displaying the rectangular frame in each area does not horizontally expand. Further, the area for displaying the rectangular frame in each area may be expanded vertically as the number of layers of the rectangular frame increases, but the expansion is suppressed as compared with the case where cell icons indicating the shapes of the base transceiver stations are stacked. Further, a form in which rectangular frames are arranged horizontally or vertically above or below a cell icon may be used.

FIG. 10 shows an example in which the number of rectangular frames corresponding to the number of base transceiver stations in the NR area and the number of rectangular frames corresponding to the number of base transceiver stations in the LTE area are respectively displayed in association with the NR cell icon and the LTE cell icon. However, instead of the rectangular frame, various graphic forms may be displayed in a form in which the graphic forms are vertically stacked or horizontally arranged.

As described above, in the communication terminal measurement apparatus 10 according to the present embodiment, the display control unit 30d performs control to display all cells (NR cells and LTE cells), which are in the NR area and FET area involved in the measurement of the communication terminal 11a, in a display area with a predetermined size. The number of cells varies in accordance with the scenario (setting of the combination of cells subjected to simulative communication operation) for simulating the communication of the NR communication standard.

Figure 12:
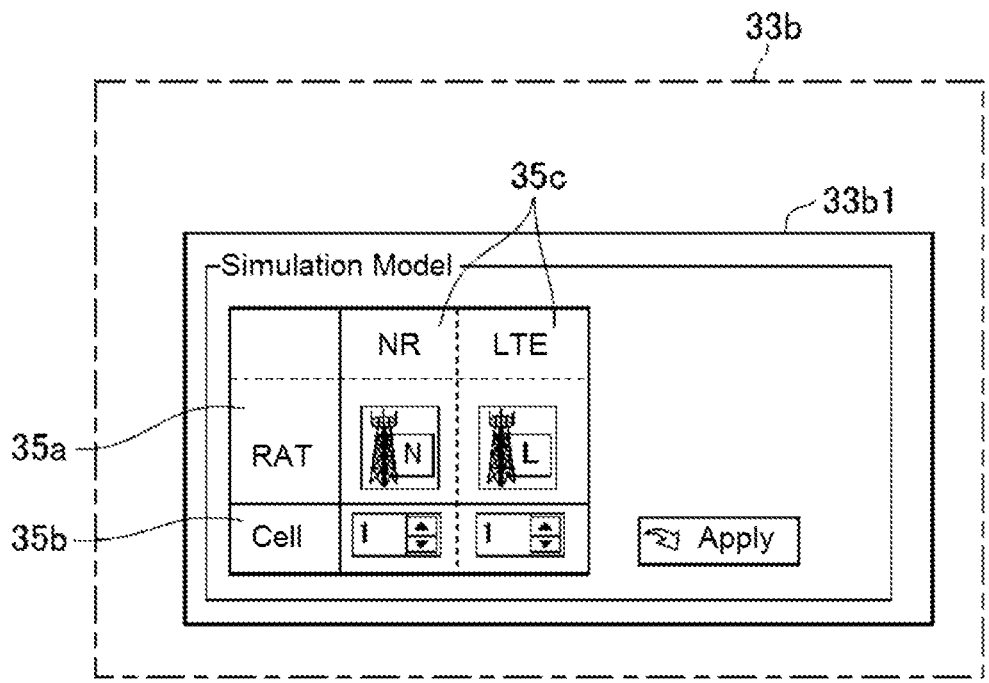
FIG. 12 is a diagram showing a display example of a simulation model setting (RAT cell number setting) screen used for terminal measurement in the communication terminal measurement apparatus according to an embodiment of the present invention.

The simulation model setting screen 33b (refer to FIG. 11) displayed in step S33 of FIG. 7 includes, for example, a RAT cell number setting screen (RAT cell number setting area) 33b1 as shown in FIG. 12. The display control unit 30d is able to display the simulation model setting screen 33b including the RAT cell number setting screen 33b1 on the basis of a simulation model setting request operation using a tab (GUI tool) on the main screen 33a.

In the communication terminal measurement apparatus 10 according to the present embodiment, the display control unit 30d displays the RAT cell number setting screen 33b1 on the simulation model setting screen 33b as an image in which a tool for selecting the number of cells for each RAT type NR or LTE is set as shown in FIGS. 11 and 12. Specifically, the display control unit 30d displays the RAT cell number setting screen 33b1 with a screen configuration including a RAT field 35a and a cell field 35b. In the RAT field 35a, a single NR cell icon indicating that the radio access technology (RAT; area type) is NR and a single LTE cell icon indicating that the RAT is LTE are arranged side by side. In the cell field 35b, a cell number selection tool for selecting the number of cells for each RAT in accordance with the scenario is provided at each of positions respectively corresponding to the NR cell icon and the LTE cell icon.

In the display forms shown in FIGS. 11 and 12, RAT name fields 35c are provided at positions vertically opposite to the respective cell number selection tools with the NR cell icon and the LTE cell icon interposed therebetween. In the RAT name fields 35c, RAT names "NR" and "LTE" corresponding to the NR cell icon and the LTE cell icon are noted in vertical writing, respectively.

In the present embodiment, the RAT cell number setting screen 33b1 of the simulation model setting screen 33b has the RAT field 35c, the cell field 35a, and the RAT name fields 35b as shown in FIG. 12, and is configured such that the number of cells of the corresponding RAT is selected by operating the cell number selection tool in the cell fields 35b. According to this configuration, it is not necessary to extend the display area even in a case where the number of cells increases. In addition, since the screen configuration is simple, it is easy to view the screen, and the number of cells can be easily set.

In the simulation model setting screen 33b (refer to FIG. 11), in addition to the above-described RAT cell number setting screen 33b1 (refer to FIG. 12), for example, a simulation model display area 33b2 showing the enlarged screen configuration in FIG. 11 is also provided.

In the communication terminal measurement apparatus 10 according to the present embodiment, as shown in FIG. 13, the display control unit 30d displays the simulation model display area 33b2 with a screen configuration in which display areas 35d and 35e respectively corresponding to NR and LTE are provided. Then, for the simulation model display area 33b2 having the above screen configuration, the display control unit 30d displays a simulation model as follows. In the display area 35d corresponding to the NR, one NR cell icon is displayed in a form in which a numerical value corresponding to the number of cells which are set in the NR area is attached thereto. In the display area 35e corresponding to LTE, one LTE cell icon is displayed in a form in which a numerical value corresponding to the number of cells which are set in the LTE is attached thereto.

FIG. 13 shows a display form in a case where one NR cell and three LTE cells are selected and set. In this case, for the display area 35d, the display control unit 30d performs the display in a form in which a symbol "×1" indicating that the number of NR cells is 1 is attached to the NR cell icon having an abbreviation symbol "N" corresponding to NR noted therein. In addition, for the display area 35e, the display control unit 30d performs the display in a form in which a symbol "×3" indicating that the number of LTE cells is 3 is attached to the LTE cell icon having an abbreviation symbol "L" corresponding to LTE noted therein.

As described above, the display control unit 30d displays one NR cell icon (first cell icon) and one LTE cell icon (second cell icon) respectively corresponding to NR and LTE, and further displays a simulation model display area 33b2 having display areas 35d and 35e respectively corresponding to the NR base transceiver station and the LTE base transceiver station. In the display area 35d, a form, in which a numerical value corresponding to the number of NR base transceiver stations is attached to one NR cell icon, is displayed. In the display area 35e, a form, in which a numerical value corresponding to the number of LTE base transceiver stations is attached to one LTE cell icon, is displayed.

In the present embodiment, as shown in FIG. 13, the simulation model is displayed in the simulation model display area 33b2 in a form in which one icon and the number of cells (numerical value) are combined for each of NR and LTE RAT. Therefore, even in a case where the number of NR cells and LTE cells increases, all cells can be detected.

In the present embodiment, the simulation model setting screen 33b has the RAT cell number setting screen 33b1 (RAT cell number setting area) and the simulation model display area 33b2. Therefore, a user is able to set the simulation model while confirming the simulation model on the simulation model setting screen 33b.

The simulation parameter setting screen 33c used in the simulation parameter setting in step S36 in FIG. 7 can be displayed as a simulation parameter display area 33a3 on the main screen 33a, for example, by clicking a connection status display area 33a2 on the main screen 33a as shown in FIG. 10. The user is able to set various parameters described above by using the simulation parameter setting screen 33c.

FIGS. 14 to 16 show examples of the connection confirmation/support screens 33d, 33da, and 33db displayed in step S38 in a case where the connection confirmation/support request is input in step S37 of FIG. 7. Prior to the description of the display form of the connection confirmation/support screens 33d, 33da, and 33db, first, control for displaying the connection confirmation/support screens 33d, 33da, and 33db as a connection diagram will be described with reference to a flowchart shown in FIG. 8.

Figure 8:
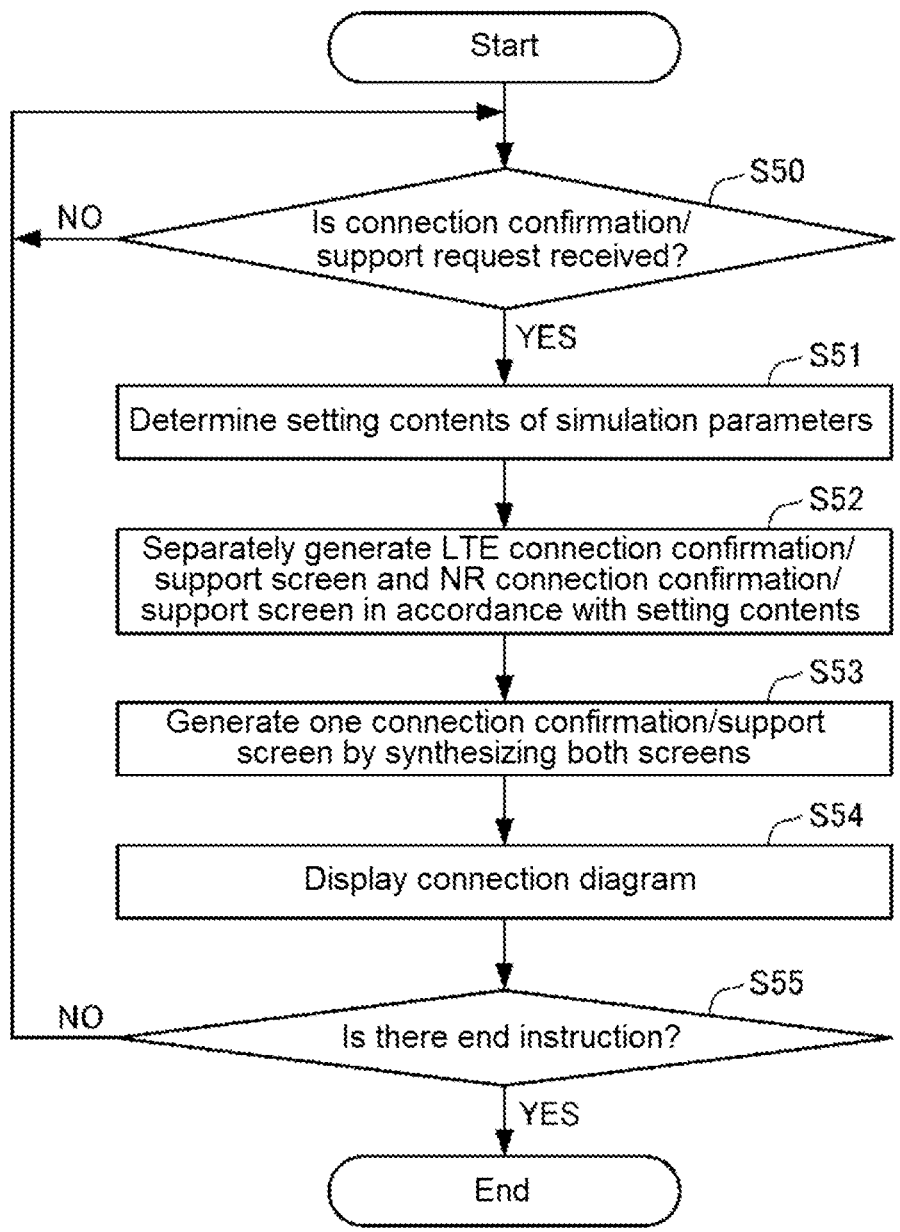
FIG. 8 is a flowchart showing display control of a connection diagram in the communication terminal measurement apparatus according to an embodiment of the present invention.

The display control of the connection diagram shown in FIG. 8 is performed by the display control unit 30d of the control device 22. The display control unit 30d first determines, as a condition for starting the display control of the connection diagram, whether or not a connection confirmation/support request is received from the user (step S50).

The connection confirmation/support request can be input by the user operating the operation unit 32 while viewing the simulation model setting screen 33b (refer to FIG. 11), for example. As an example, the user is able to input the simulation parameters using the tools 34a, 34b, 34c and the like in the RAT cell number setting screen 33b1 in the simulation model setting screen 33b. The tool 34a is a tool for selecting an RF converter or an RF sub-module. The tool 34b is a tool for setting the number of base transceiver stations (cells) corresponding to NR. The tool 34c is a tool for setting the number of antennas for multiple-input and multiple-output (MIMO). The tools 34a, 34b, and 34c constitute the setting means of the present invention.

A user is able to perform selection between the RF converter and the RF sub-module by using the tool 34a, and is able to specify the number (up to 2 in this example) of NR base transceiver stations by using the tool 34b. Further, the user is able to specify the number of antennas of the NR base transceiver stations for MIMO using the tool 34c. The number of antennas that can be specified is, for example, 1×1, 2×2, or 4×4. With the configuration of the tools 34a, 34b, and 34c described above, the connection confirmation/support request (simulation parameter) including the use of either the RF converter or the RF sub-module, the number of NR base transceiver stations, and the number of MIMO antennas as specified contents is input from the operation unit 32 to the control unit 31 of the control device 22.

In the control unit 31, if the connection confirmation/support request is not received in the above step S50 (NO in step S50), the display control unit 30d repeatedly executes the processing of step S50. In contrast, if the connection confirmation/support request is not received (YES in step S50), display control of the connection diagram is started.

When the display control of the connection diagram is started, the display control unit 30d first determines the setting contents of the simulation parameters in the connection confirmation/support request received in step S50 (step S51).

Next, the display control unit 30d separately (independently) creates the NR connection confirmation/support screen 36a (refer to FIGS. 14, 15, and 16) for the NR measurement device 20 and the LTE connection confirmation/support screen 36b (refer to FIGS. 14, 15, and 16) for the LTE measurement device 21, in accordance with the determination result of the simulation parameters in step S51 (step S52).

The NR connection confirmation/support screen 36a and the LTE connection confirmation/support screen 36b respectively include, for example, as shown in FIGS. 14, 15, and 16, an image showing the connection mode for connection between the NR measurement device 20 and the communication terminal 11a as a connection destination thereof and an image showing the connection mode for connection between the LTE measurement device 21 and the antenna of the communication terminal 11a as a connection destination thereof. The NR measurement device 20 transmits and receives a radio signal through an antenna which is disposed to face the communication terminal 11a and uses the NR frequency band, and transmits and receives a signal in the NR frequency band through the antenna of the communication terminal 11a. The connection destination of the LTE measurement device 21 is a connector included in the communication terminal 11a. The LTE measurement device 21 and the communication terminal 11a are connected by wire through a connector provided on the communication terminal 11a, and transmit and receive signals in the LTE frequency band. In this case, a switching box which is not shown may be used to reduce the trouble of changing the connection between the connector of the communication terminal 11a and the wiring from the LTE measurement device. It should be noted that transmission/reception is defined to include both a case where both transmission and reception are performed and a case where only one of transmission and reception is performed.

In the present embodiment, the NR connection confirmation/support screen 36a and the LTE connection confirmation/support screen 36b are configured to show the connection modes by attaching the connection destination names (for example, antenna name) of the ports to the respective connection ports (hereinafter, ports) in the images which indicate the NR measurement device 20 and the LTE measurement device 21. The NR connection confirmation/support screen 36a and the LTE connection confirmation/support screen 36b correspond to a first connection confirmation support image and a second connection confirmation support image of the present invention, respectively. A signal in the NR frequency band or a signal in the LTE frequency band is input and output from the port. It should be noted that the word "input/output" can be interpreted as "input or output" or both "input and output".

Subsequent to step S52, the display control unit 30d generates one connection confirmation/support screen (FIGS. 14, 15, and 16) by synthesizing the NR connection confirmation/support screen 36a and the LTE connection confirmation/support screen 36b generated in step S52 (step S53), and performs control such that the connection confirmation/support screen is displayed as a connection diagram on the display unit 33 (step S54).

Further, the display control unit 30d determines whether or not there is an instruction to end the connection diagram display processing (end instruction) (step S55). Here, if there is no termination instruction (NO in step S55), the display control unit 30d repeatedly performs the processing of steps S50 to S55. If there is a termination instruction in step S55 during this time (YES in step S55), the display control unit 30d performs control to end the series of connection diagram display processing.

Next, the display form of the connection diagram (connection confirmation/support screen 33d (refer to FIG. 14), 33da (refer to FIG. 15), and 33db (refer to FIG. 16)) in step S54 in FIG. 8 will be described in detail.

The connection confirmation/support screen 33d shown in FIG. 14 shows a display example of a connection diagram in the following cases: a case where the communication terminal 11a is measured by connecting the NR measurement device 20 and the LTE measurement device 21 in the connection mode shown in FIG. 4; and a case where the "RF module" is selected using the tool 34a in the simulation model setting area 33b1 in the simulation model setting screen 33b, the number of NR base transceiver stations is set to "2" by using the tool 34b, and the configuration of the NR antenna of MIMO is set to "1×1" by using the tool 34c.

As shown in FIG. 14, the connection confirmation/support screen 33d has a screen configuration in which a first connection diagram image 33d1 and a second connection diagram image 33d2 are displayed to be adjacent to each other. The first connection diagram image 33d1 is an image which indicates the exterior structure of the front panel and the back panel of the NR measurement device 20 and in which the front panel and back panel are switchable. The second connection diagram image 33d2 is an image which indicates the exterior structure of the front panel and the back panel of the LTE measurement device 21 and in which the front panel and back panel are switchable. The configuration is also the same as those of the connection confirmation/support screen 33da (refer to FIG. 15) and the connection confirmation/support screen 33db (refer to FIG. 16) to be described later in that the first connection diagram image 33d1 and the second connection diagram image 33d2 are provided. The connection diagram image 33d1 may be only an image which indicates the exterior structure of the front panel of the NR measurement device 20 and the LTE measurement device 21, or may be an image switchable to an image which indicates the exterior structure of the side surface of the NR measurement device 20 and the LTE measurement device 21.

Here, the dotted lines respectively surrounding the first connection diagram image 33d1 and the second connection diagram image 33d2 indicate areas of the NR connection confirmation/support screen 36a and the LTE connection confirmation/support screen 36b generated in step S52 of FIG. 7. The connection confirmation/support screen 33d is a screen obtained by combining the NR connection confirmation/support screen 36a and the LTE connection confirmation/support screen 36b into one (refer to steps S53 and S54 in FIG. 7). The method of generating a screen of one connection diagram by synthesizing the NR connection confirmation/support screen 36a and the LTE connection confirmation/support screen 36b is applied to the connection confirmation/support screen 33da and the connection confirmation/support screen 33db in a similar manner.

The connection confirmation/support screen 33d corresponds to the image of each port on the front panel and the back panel of the first connection diagram image 33d1 and the second connection diagram image 33d2, and the connection destination name of the port is represented by text. In the additional mode, the connection mode of the port to the connection destination is displayed.

The display control unit 30d of the control device 22 is configured to display an image that functions as a connection diagram by attaching connection destination names changed in accordance with the setting contents (scenario) of the parameters and the simulation which are input in step S50 in FIG. 8 to the images of the respective connection ports on the front panel and the back panel of the first connection diagram image 33d1 and the second connection diagram image 33d2.

In the example of FIG. 14, connection destination names such as NR1 Ant #1 Tx/Rx and NR2 Ant #1 Tx/Rx are attached to the images of the ports t24 and t25 on the back panel (also the front panel) of the NR measurement device 20 in the first connection diagram image 33d1. Connection destination names such as LTE1 Ant #1 Tx/Rx~LTE3 Ant #1 Tx/Rx and LTE1 Ant #2 Tx~LTE3 Ant #2 Tx are attached to the images of the ports t12 and t13 of the front panel (also the back panel) of the LTE measurement device 21 of the second connection diagram image 33d2. By viewing the connection confirmation/support screen 33d having such display contents, a user finds that the ports t24 and t34 of the NR measurement device 20 are desirably connected to the respective antennas (transmitting/receiving antenna) #1 of the two NR base transceiver stations (NR1 and NR2) simulated by the NR measurement device 20. Similarly, the user finds that the ports t12 and t13 of the LTE measurement device 21 are desirably connected to the respective antennas (transmitting antennas) #2 and the respective antennas (transmitting/receiving antennas) #1 of the three LTE base transceiver stations (LTE1, LTE2, and LTE3) simulated by the LTE measurement device 21.

The connection confirmation/support screen 33da shown in FIG. 15 shows a display example of a connection diagram in the following cases: a case where the communication terminal 11a is measured by connecting the NR measurement device 20 and the LTE measurement device 21 in the connection mode shown in FIG. 4; and a case where the "RF module" is selected using the tool 34a in the simulation model setting area 33b1 in the simulation model setting screen 33b, the number of NR base transceiver stations is set to "2" by using the tool 34b, and the configuration of the antenna of MIMO is set to "4×4" by using the tool 34c.

In this case, it is necessary to dispose, for example, four RF converters 27 covering different frequency bands between the NR measurement device 20 and the four antennas respectively facing the four antennas of the communication terminal 11a. The RF converter 27 can be selectively disposed between the NR transmitting/receiving unit 3a and the communication terminal 11a, for example, as shown in FIG. 1. In this case, the area between the transmitting/receiving unit 3a and the communication terminal 11a is a wireless section. Further, in this case, a display function for indicating a connection path between the NR measurement device 20 and the four RF converters 27 is necessary for the connection confirmation/support screen 33da.

In order to realize this, in the connection confirmation/support screen 33da shown in FIG. 15, the connection destination names such as NR1 Ant #3 Tx and NR2 Ant #3 Tx are respectively attached to the images of the ports t21 and t22 on the back panel of the NR measurement device 20 in the first connection diagram image 33d1, and the connection destination names such as NR1 Ant #1 Tx/Rx and NR2 Ant #1 Tx/Rx are respectively attached to the images of the ports t31 and t32. Similarly, in the first connection diagram image 33d1, the connection destination names such as NR1 Ant #4 Tx and NR2 Ant #4 Tx are respectively attached to the images of the ports t25 and t26 on the back panel of the NR measurement device 20, and the connection destination names such as NR1 Ant #2 Tx and NR2 Ant #2 Tx are respectively attached to the images of the ports t35 and t36.

In addition, a third connection diagram image 33d3 including RF converter images 27a, 27b, 27c, and 27d respectively indicating the four RF converters 27 in the area below the first connection diagram image 33d1 is displayed on the connection confirmation/support screen 33da. The first connection diagram image 33d1, the second connection diagram image 33d2, and the third connection diagram image 33d3 respectively corresponds to a first connection confirmation support image, a second connection confirmation support image, and a third connection confirmation support image of the present invention.

Further, the ports t21 and t22 on the back panel of the NR measurement device 20 in the first connection diagram image 33d1 and the RF converter image 27a in the third connection diagram image 33d3 are connected by lines on the connection confirmation/support screen 33da. Similarly, between the first connection diagram image 33d1 and the third connection diagram image 33d3, the ports t31 and t32 and the RF converter image 27b are connected by lines, the ports t25 and t26 and the RF converter image 27c are connected by lines, and the ports t35 and t36 and the RF converter images 27d are connected by lines.

By viewing the connection confirmation/support screen 33da having such display contents, a user finds the following points, regarding the NR measurement device 20. The ports t21 and t22 are desirably connected to the RF converter 27 corresponding to the RF converter image 27a. The ports t31 and t32 are desirably connected to the RF converter 27 corresponding to the RF converter image 27b. The ports t25 and t26 are desirably connected to the RF converter corresponding to the RF converter image 27c. The ports t35 and t36 are desirably connected to the RF converter 27 corresponding to the RF converter image 27a.

Similarly, in the connection confirmation/support screen 33da, connection destination names (such as LTE1 Ant #2 Tx and LTE2 Ant #2 Tx, and LTE3 Ant #2 Tx) and connection destination names (such as LTE1 Ant #1 Tx/Rx, LTE2 Ant #1 Tx/Rx, LTE3 Ant #1 Tx/Rx) are respectively attached to the images of the ports t12 and t13 on the back panel of the LTE measurement device 21 in the second connection diagram image 33d2. Therefore, similarly, the user finds that the ports t12 and t13 of the LTE measurement device 21 are desirably connected to the respective antennas (transmitting antennas) #2 and the respective antennas (transmitting/receiving antennas) #1 of the three LTE base transceiver stations (LTE1, LTE2, and LTE3) simulated by the LTE measurement device 21. Through the above connection work, the user is able to easily perform the connection relating to the test of the communication terminal 11a in the MIMO system with the number of antennas of 4×4.

It should be noted that the number of MIMO antennas can be set to, for example, "2×2" in addition to "4×4". In the connection confirmation/support screen 33da shown in FIG. 15, the number of RF converters 27 and the positions of the ports of the first connection diagram image 33d1, the second connection diagram image 33d2, and the third connection diagram image 33d3 connected to the RF converters 27 are changed and displayed in accordance with the set simulation parameters (particularly the number of MIMO antennas).

The connection confirmation/support screen 33db shown in FIG. 16 shows a display example of a connection diagram in the following cases: a case where the communication terminal 11a is measured in a connection mode (refer to FIG. 5) of connecting the NR measurement device 20 and the LTE measurement device 21 and connecting the switching box 28 to the NR measurement device 20; and a case where the "RF Sub-module" is selected using the tool 34a in the simulation model setting area 33b1 in the simulation model setting screen 33b, the number of NR base transceiver stations is set to "2" by using the tool 34b, and the configuration of the antenna of MIMO is set to "4×4" by using the tool 34c.

When the "RF sub-module" is selected, the connection destination of the NR measurement device 20 is the connector of the communication terminal 11a a through the switching box 28. A wired section is provided between the NR measurement device 20 and the connector of the communication terminal 11a. The communication terminal 11a transmits and receives signals in the NR frequency band through a connector provided on the communication terminal 11a. The connection confirmation/support screen 33db used in the connection mode employing the switching box 28 needs a display function for indicating a connection path between the NR measurement device 20 and the switching box 28.

In order to realize this, in a case where the simulation parameters of the setting contents for selecting the above-mentioned "RF sub-module" is input, the display control unit 30d generates a connection confirmation/support screen 33db including the first connection diagram image 33d1 in which information for identifying the RF sub-module is attached as a connection destination name to a connection port to be connected to the RF sub-module in the front panel image and the back panel image of the NR measurement device 20 without the third connection diagram image 33d3 displayed through the connection confirmation/support screen 33da shown in FIG. 15.

In the connection confirmation/support screen 33db shown in FIG. 16, connection destination names such as NR1 Ant #3 Tx and NR2 Ant #3 Tx are attached to the image of the port t24 on the back panel of the first connection diagram image 33d1. In addition, connection destination names such as NR1 Ant #1 Tx/Rx and NR2 Ant #1 Tx/Rx are attached to the image of the port t341. Similarly, connection destination names such as NR1 Ant #2 Tx and NR2 Ant #2 Tx are attached to the image of the port t28, and connection destination names such as NR1 Ant #2 Tx and NR2 Ant #2 Tx are attached to the image of the port t28.

By viewing the connection confirmation/support screen 33db having such display contents, the user finds the following points. The port t24 is desirably connected to the antenna #3 of the NR1 and the antenna #3 of the NR2 of the switching box for the NR measurement device 20. The port t34 is desirably connected to NR1 antenna #1 and NR2 antenna #1 of switching box 28. The port t28 is desirably connected to NR1 antenna #4 and NR2 antenna #4 of switching box 28. The port t38 is desirably connected to the antenna #2 of NR1 and the antenna #2 of NR2 of the switching box 28. Thereby, the user is able to easily perform connection for testing the communication terminal 11a in the MIMO system with the number of 4×4 antennas by connecting the NR measurement device 20 and the communication terminal 11a by wire using the switching box 28.

As can be seen from the configuration of the connection confirmation/support screens 33d, 33da, and 33db shown in FIGS. 14, 15, and 16, the communication terminal measurement apparatus 10 according to the present embodiment, the NR measurement device 20 and the LTE measurement device has a function of displaying a connection diagram including at least a connection mode for connection between the antenna 21 and each antenna arranged facing the communication terminal 11a as a measurement target.

In the examples shown in FIGS. 14, 15, and 16, the images of the respective ports (different from the ports described above) on the back panel of the first connection diagram image 33d1 are displayed as follows. The connection destination names such as Ethernet and Sync Output are attached thereto so as to indicate a connection mode for connection between the LTE measurement device 21 corresponding to the second connection diagram image. The connection destination name such as Control is attached thereto so as to indicate a connection mode for connection between the NR measurement device 20 and the LTE measurement device 21 and the control device 22. These display contents are fixed contents. Therefore, the display control unit 30d also has the function of displaying the connection diagram further including the connection mode for connection between the NR measurement device 20 and the LTE measurement device and the connection mode for connection between the NR measurement device 20 and the LTE measurement device 21 and the control device 22.

In the present embodiment, similarly to the connection confirmation/support screens 33d, 33da, and 33db, the connection form is set as a display form in which the connection destination is attached as a text to an appropriate port in an image which indicates the NR measurement device 20 and the LTE measurement device 21. Therefore, the user is able to easily detect the connection mode, and the connection operation can be performed easily and quickly.

In the present embodiment, in the display control of the connection confirmation/support screens 33d, 33da, and 33db having the above-described display forms, the NR connection confirmation support screen 36a and the LTE connection confirmation/support screen 36b are separately generated (refer to step S52 in FIG. 8), and then the NR connection confirmation/support screen 36a and the LTE connection confirmation/support screen 36b are synthesized to generate screen information of one connection diagram.

According to this generation method, unlike the related art, it is not necessary to generate an enormous number of connection confirmation/support screens corresponding to wiring diagrams corresponding to all connection modes between modules involved in the measurement of the communication terminal 11a. Thus, the connection confirmation/support screen can be saved, and the processing load can be reduced.

Next, a display processing procedure during execution of the measurement of the communication terminal 11a will be described with reference to a flowchart shown in FIG. 9.

In the communication terminal measurement apparatus 10 having the connection configuration shown in FIGS. 4 and 5, after the control device 22 completes the processing of setting the number of RAT cells, setting and confirming the simulation model, and setting the simulation parameters (refer to S34 to S36 in FIG. 7). For example, after returning to the display of the main screen 33a (step S41), the measurement control unit 30c of the control device 22 determines whether or not an instruction to start the measurement of the communication terminal 11a is input from the operation unit 32 (step S42). If it is determined that the instruction to start the measurement is not input (NO in step S42), the processing proceeds to step S47.

In contrast, if it is determined that the instruction to start the measurement is input (YES in step S42), the measurement control unit 30c collectively controls the NR measurement device 20 and the LTE measurement device 21, and starts the measurement of the communication terminal 11a (Step S43). When measuring the communication terminal 11a, the measurement control unit 30c captures a signal transmitted to and received from the communication terminal 11a as a measurement target while controlling the drive of the NR measurement device 20 and the LTE measurement device so as to simulate the operation of each base transceiver station in the non-standalone NR in accordance with a preset scenario (step S44), and measures the communication terminal 11a on the basis of the captured signal. On the other hand, the display control unit 30d displays change in the measurement-related information on the main screen 33a and the like by reflecting the signal captured in step S43 (step S45).

As an example of the display of change in step S45, the display control unit 30d displays the respective connection statuses of the NR area and the LTE area in the non-standalone NR network in the connection status display area of the main screen 33a. Specifically, for example, as shown in FIG. 10, the display control unit 30d performs display in a form in which rectangular frames corresponding to the number of base transceiver stations corresponding to each area set in the current measurement are vertically stacked to be adjacent to the BTS icons indicating the base transceiver stations in each of the NR area and the LTE area.

While displaying the main screen 33a on which display is changed in step S45, the display control unit 30d monitors whether or not the connection status area (sequence display area 33a1) of the main screen 33a is selected (clicked) (step S45). Here, if it is determined that the connection status area of the main screen 33a is not clicked (NO in Step S45), the processing proceeds to Step S47.

Figure 17:
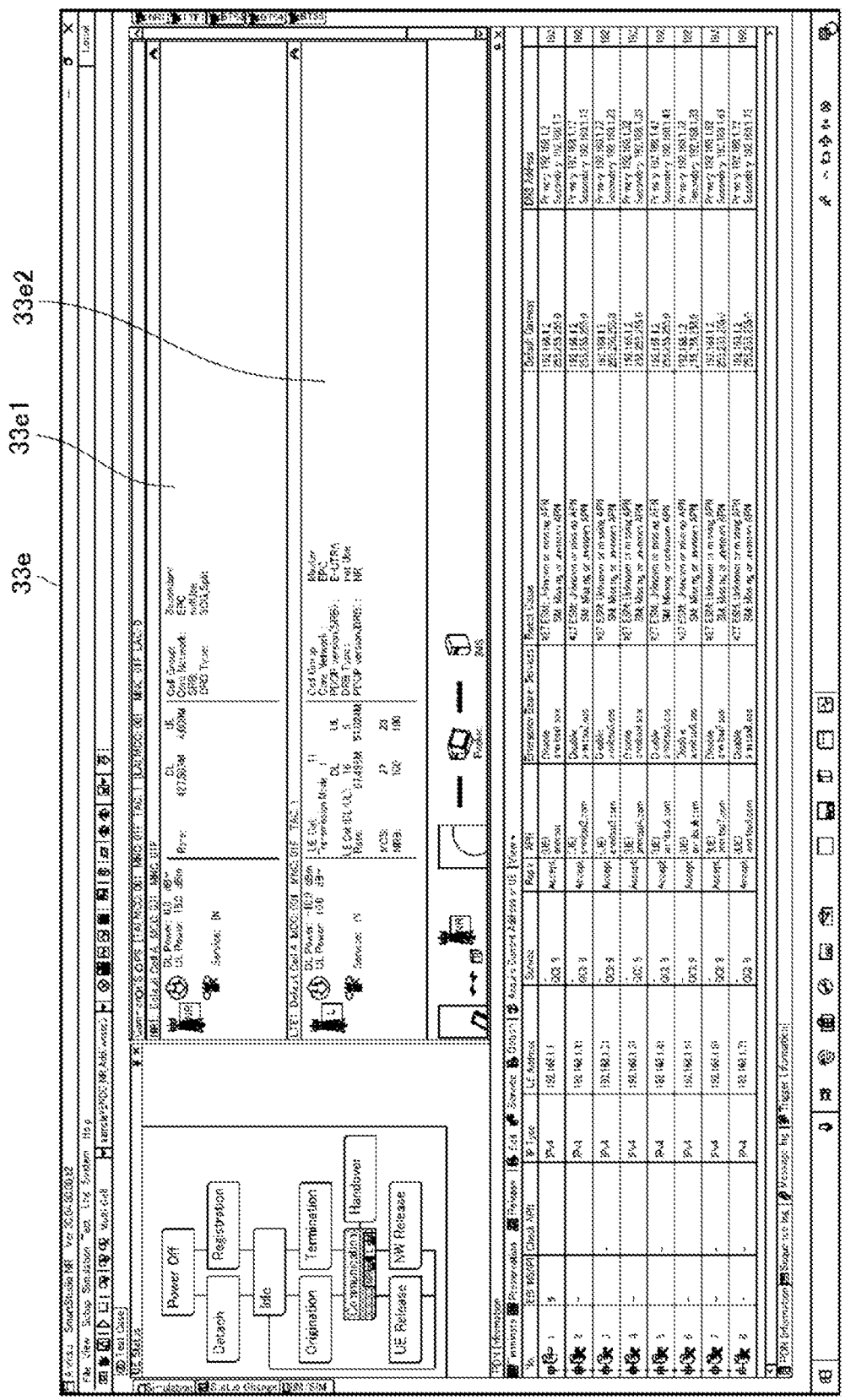
FIG. 17 is a diagram showing a display example of a DC operation confirmation screen used for communication terminal measurement of the communication terminal measurement apparatus according to an embodiment of the present invention.

In contrast, if it is determined that the connection status area of the main screen 33a is clicked (YES in step S45), for example, a DC operation confirmation screen 33e shown in FIG. 17 is displayed on the display unit 33 (step S46). The DC operation confirmation screen 33e has a DC operation status display area 33e2 for displaying an image of the DC operation status. In the example of FIG. 17, the display control unit 30d displays, as images, the operation mode based on the DC system in the NR area and the operation mode based on the CA system in the LTE area, in the DC operation status display area 33e2.

In the display processing of step S46, a DC operation confirmation screen 33f (refer to FIG. 18) having a screen structure different from that of the DC operation confirmation screen 33e can be displayed. Also in the DC operation confirmation screen 33f, the DC operation status display area 33e2 displays the DC mode in the NR area and the CA mode in the LTE area as images.

During the display processing of the DC operation confirmation screen 33e (or 33f) in step S46, or after the display processing is completed, for example, in a state where the display is returned to the main screen 33a, the display control unit 30d determines whether or not an operation confirmation request for issuing an instruction to confirm the operation status relating to the measurement of the communication terminal 11a is input (step S47). If it is determined that the operation confirmation request is not input (NO in step S47), the processing proceeds to step S49.

In contrast, if it is determined that the operation confirmation request is input (YES in step S47), the display control unit 30d causes the display unit 33 to display an operation confirmation screen corresponding to the request (step S48).

Figure 9:
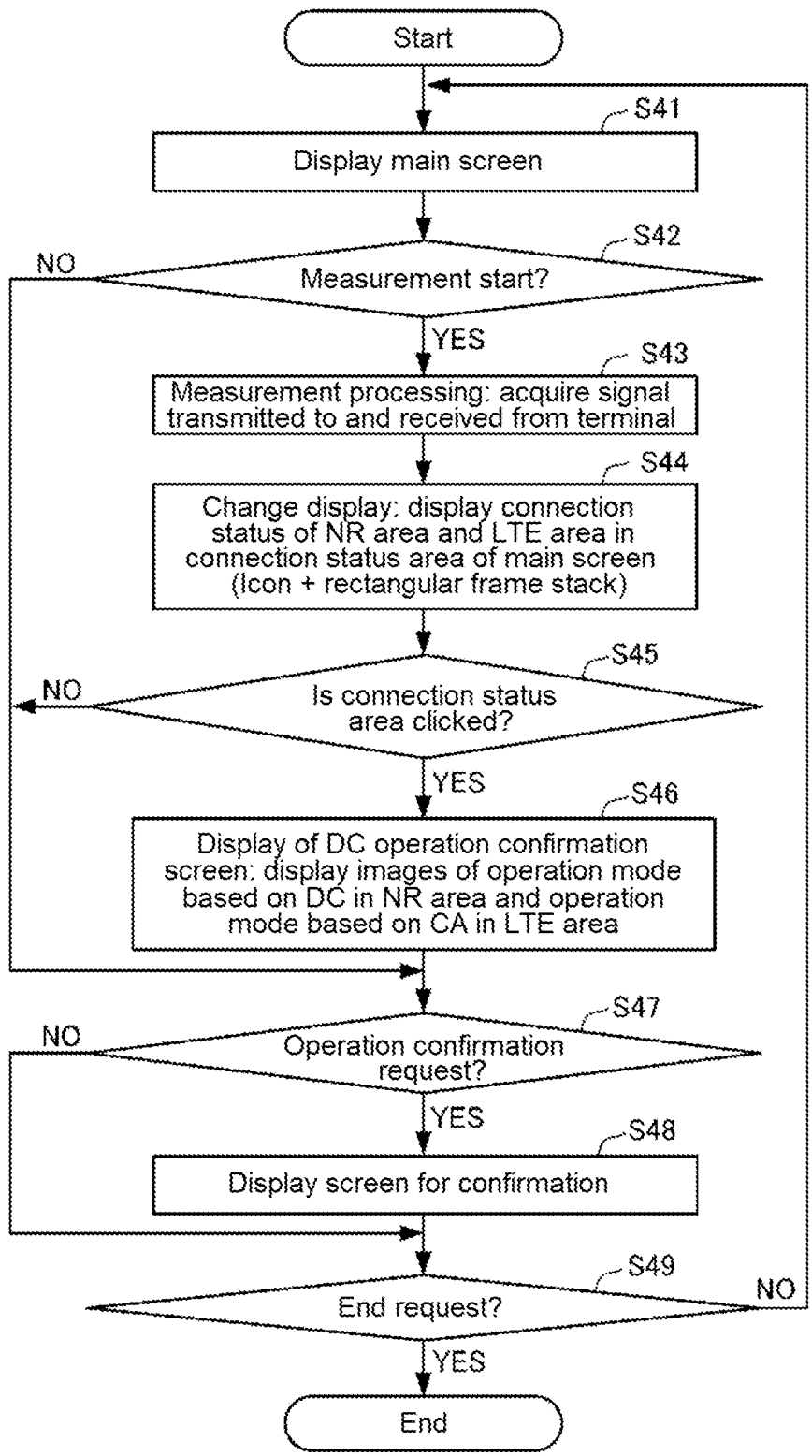
FIG. 9 is a flowchart showing an example of a display processing procedure in a terminal execution of the measurement stage of the communication terminal measurement apparatus according to an embodiment of the present invention.
Figure 19:
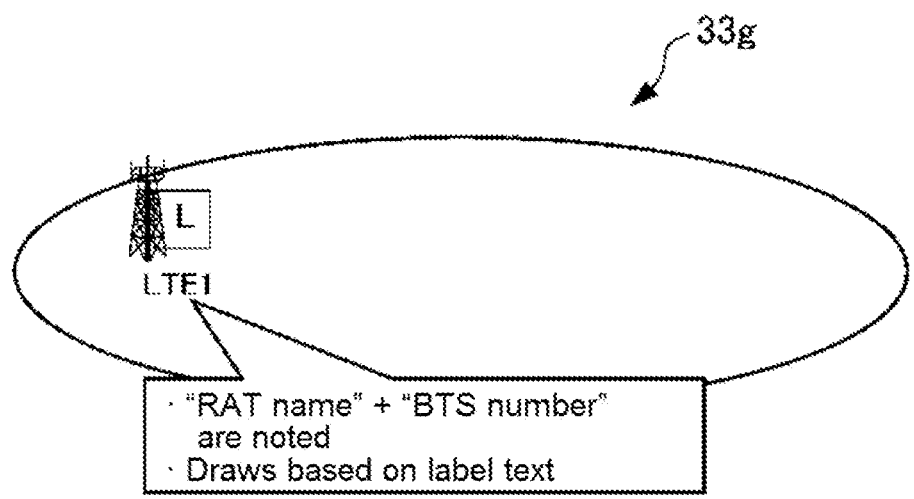
FIG. 19 is a diagram showing a display example of a test case confirmation screen used for communication terminal measurement of the communication terminal measurement apparatus according to an embodiment of the present invention.
Figure 20:
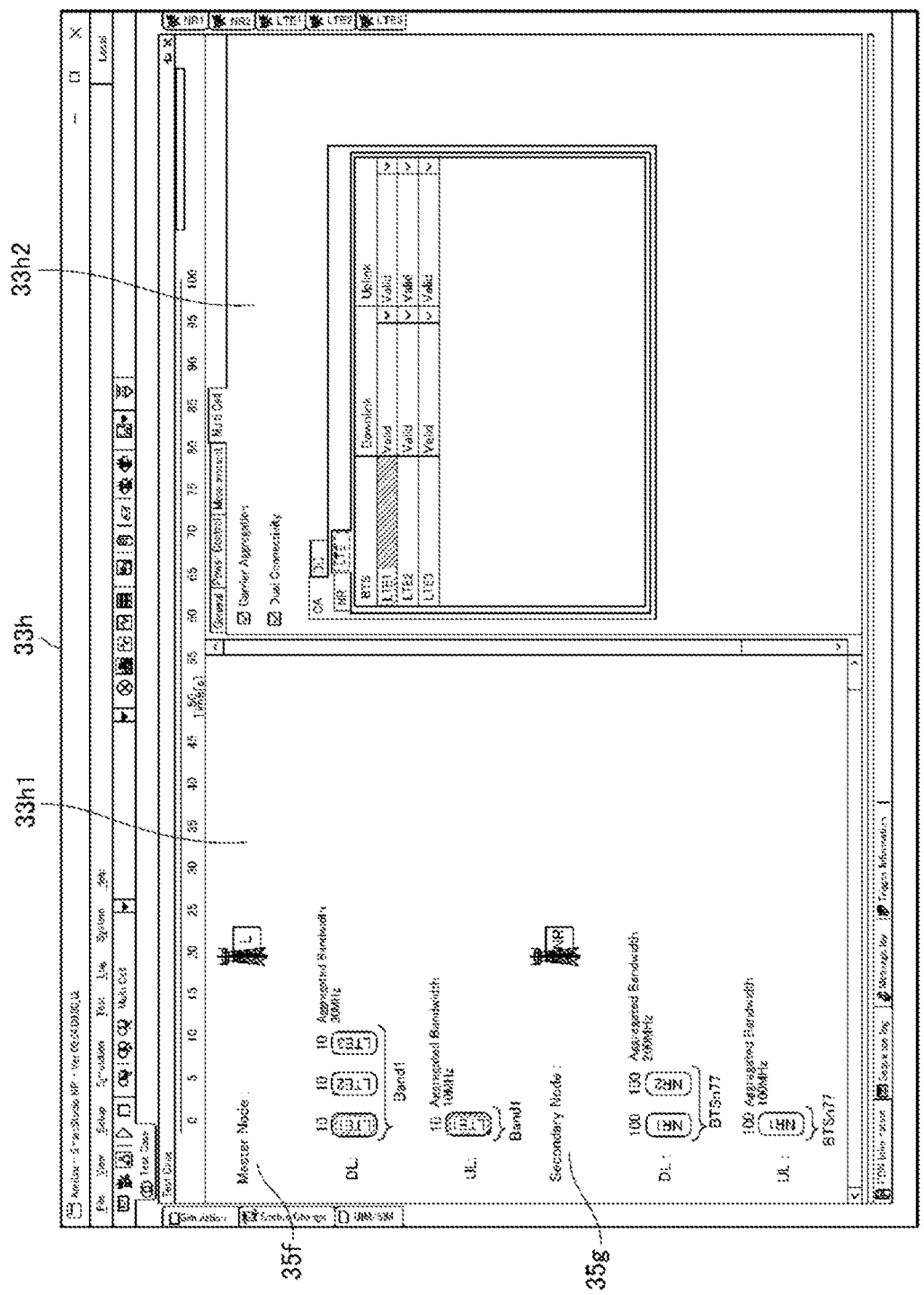
FIG. 20 is a diagram showing a display example of a component confirmation screen used for measuring a communication terminal of the communication terminal measurement apparatus according to an embodiment of the present invention.
Figure 21:
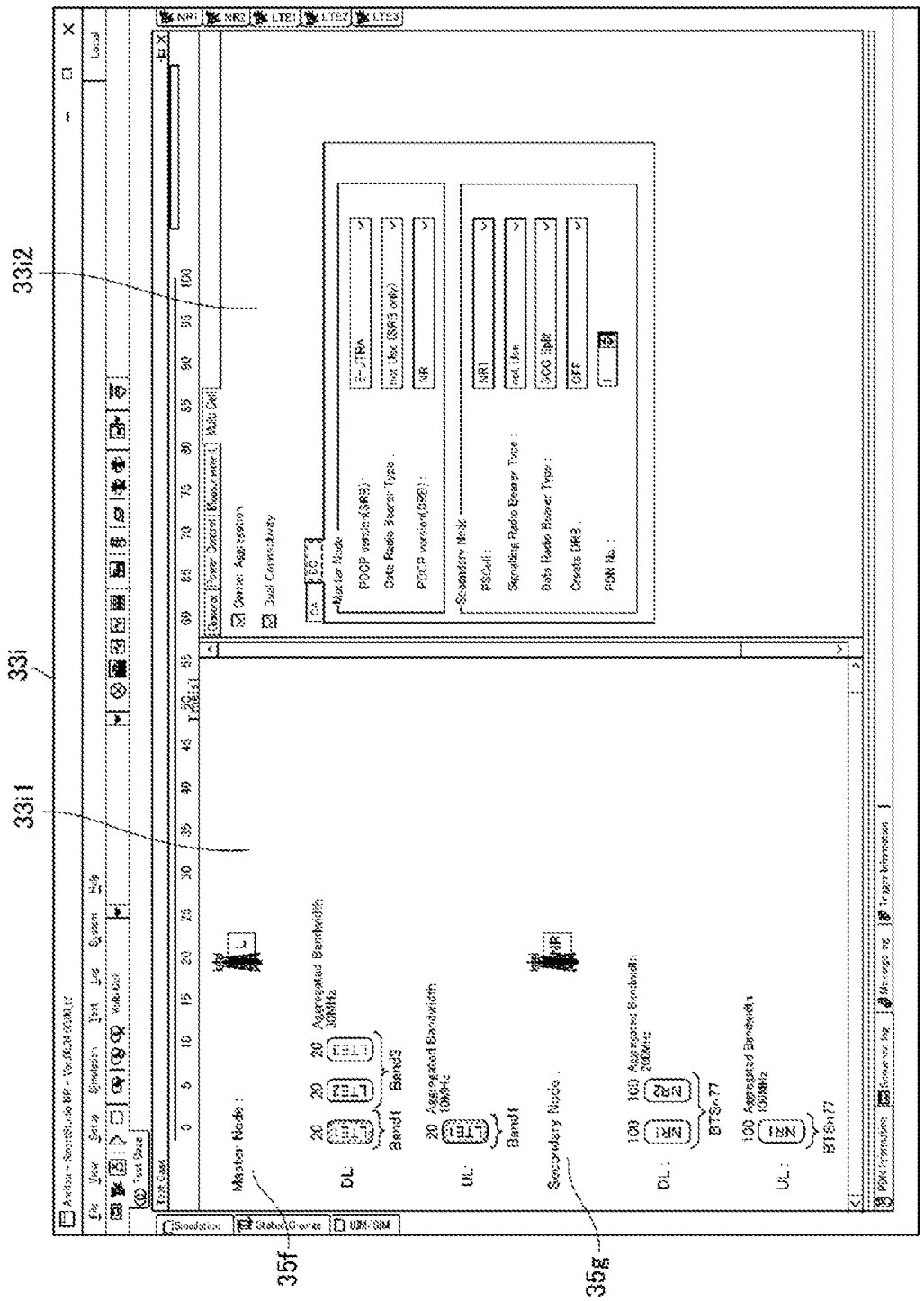
FIG. 21 is a diagram showing a display example of another example of a component confirmation screen used for measuring a communication terminal of the communication terminal measurement apparatus according to the embodiment of the present invention.

Regarding the processing of steps S47 and S48 in FIG. 9, in a case where a test case confirmation request is input in step S47, for example, the display control unit 30d displays, in step S48, a test case confirmation screen 33g as shown in FIG. 19. In addition, for example, in a case where a component confirmation request is input in step S47, the display control unit 30d displays, for example, a component confirmation screen 33h as shown in FIG. 20 in step S48. In addition, in response to the component confirmation request, for example, a component confirmation screen 33i as shown in FIG. 21 may be displayed.

Figure 22:
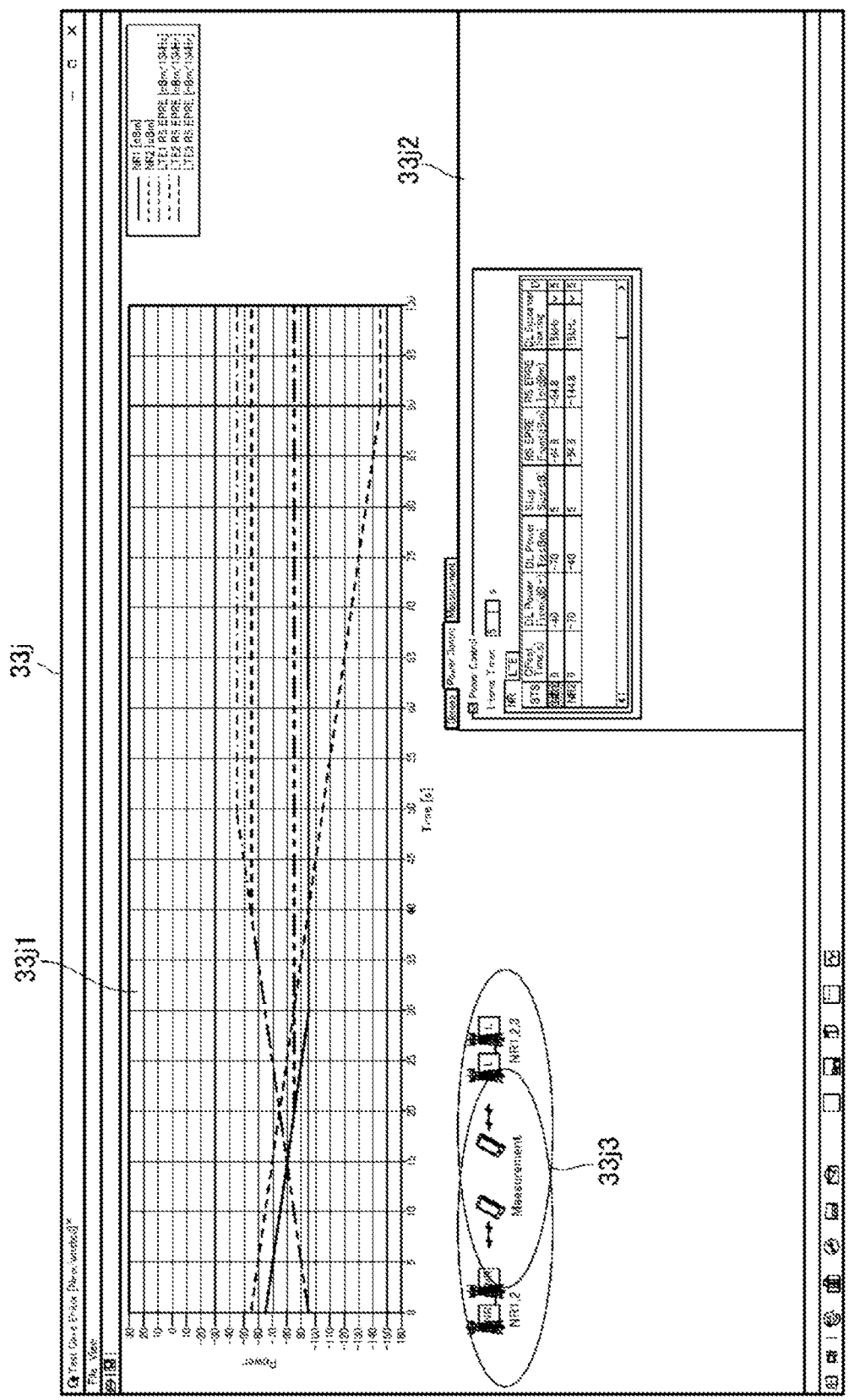
FIG. 22 is a diagram showing a display example of a power characteristic confirmation screen used for measuring a communication terminal of the communication terminal measurement apparatus according to an embodiment of the present invention.
Figure 23:
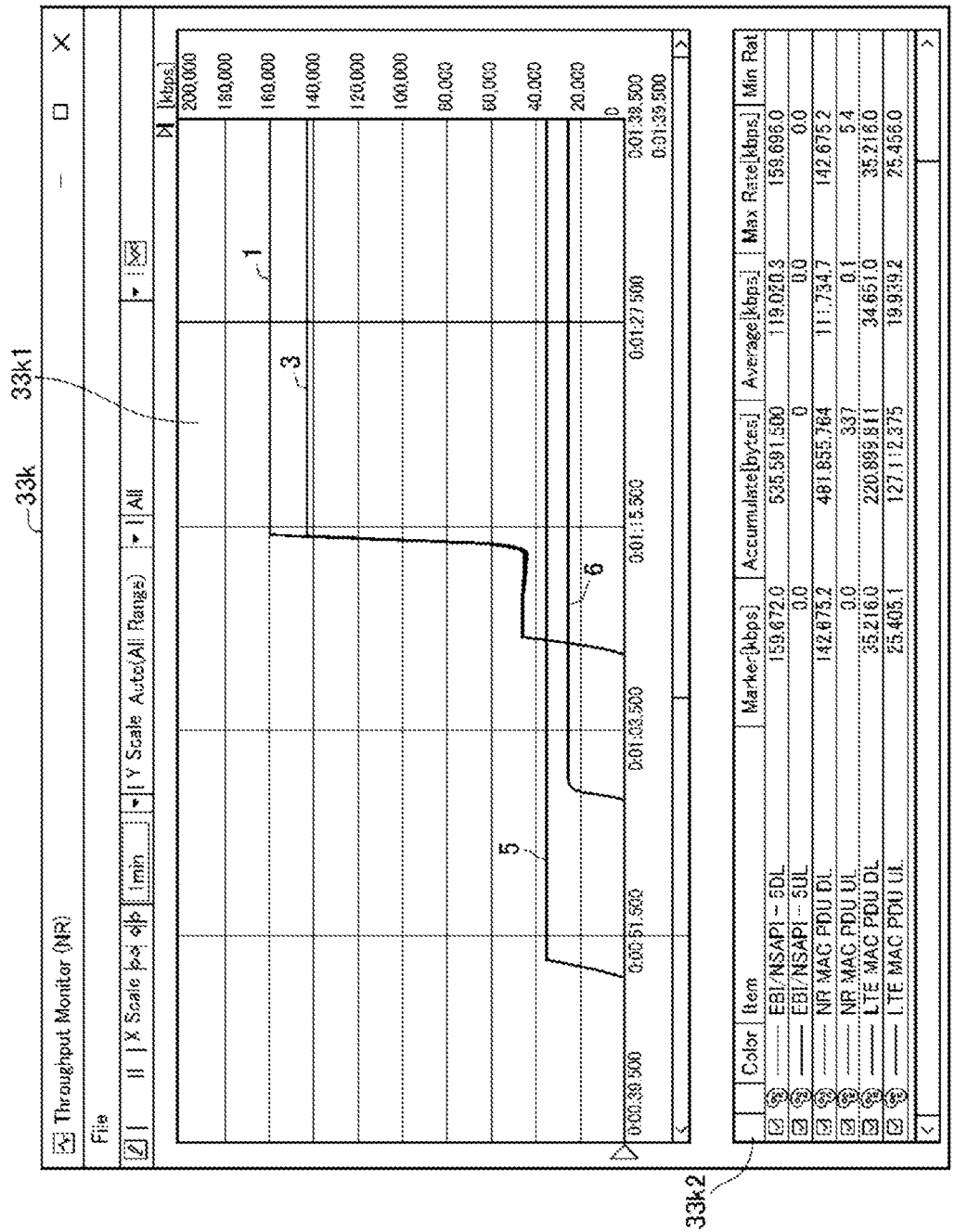
FIG. 23 is a diagram showing a display example of a throughput confirmation screen used for measuring a communication terminal in the communication terminal measurement apparatus according to an embodiment of the present invention.
Figure 24:
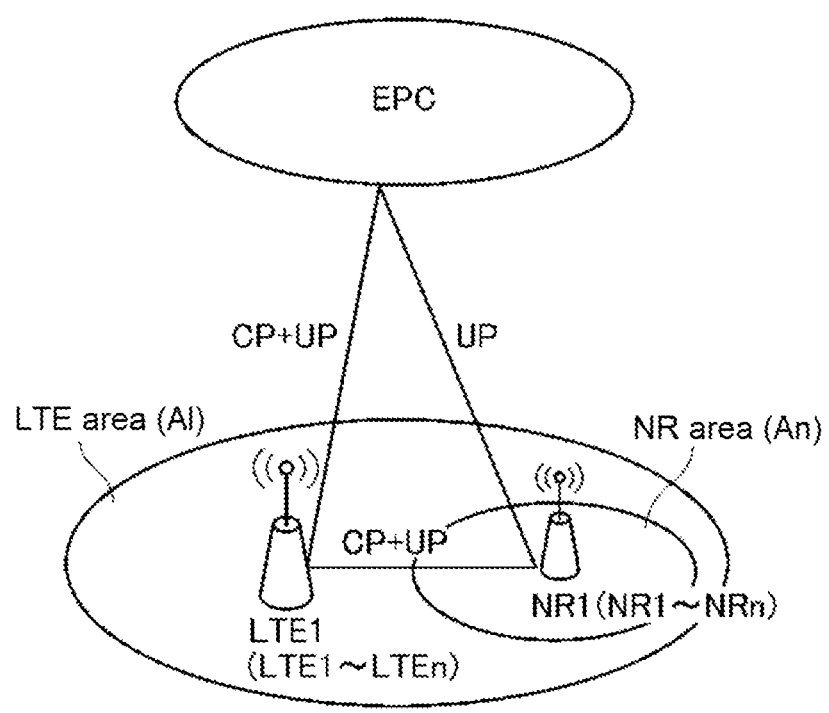
FIG. 24 is a schematic diagram of a conventional technique showing an operation image of a non-standalone 5G wireless in which a communication terminal as a measurement target by the communication terminal measurement apparatus according to an embodiment of the present invention is disposed.
Figure 25:
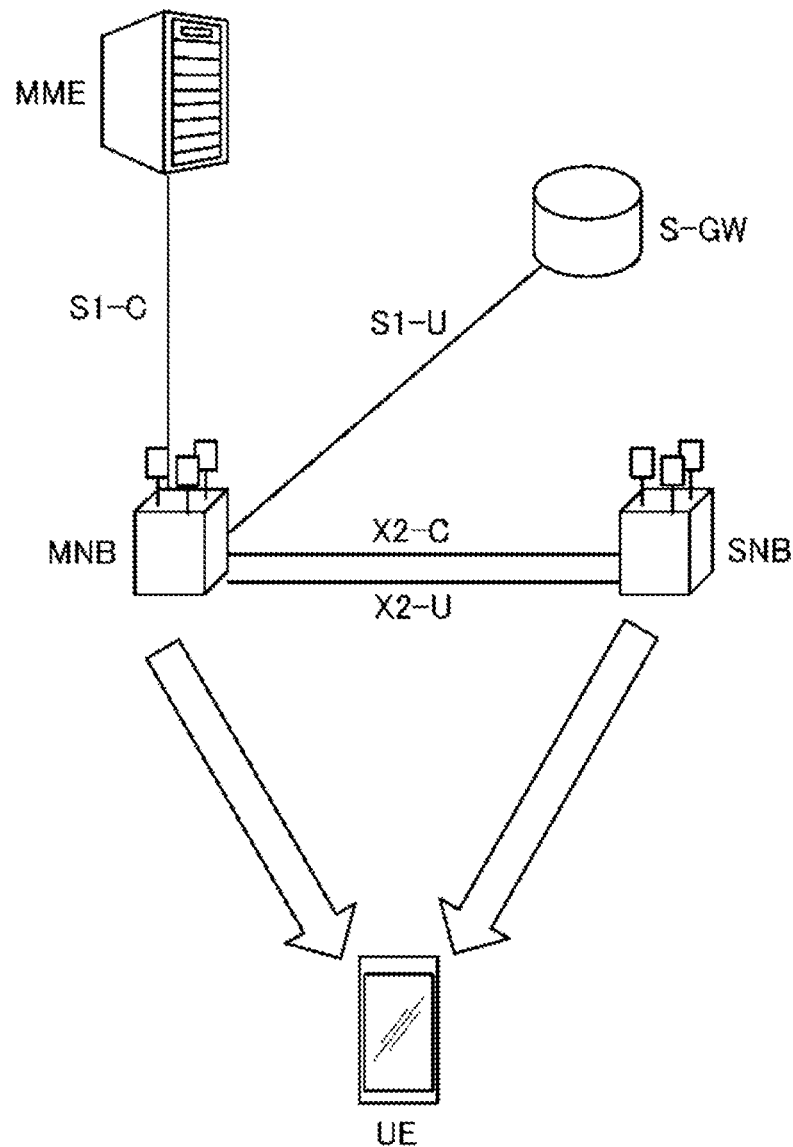
FIG. 25 is a schematic diagram of a related art showing a network configuration relating to DC of non-standalone 5G wireless.
Figure 26:
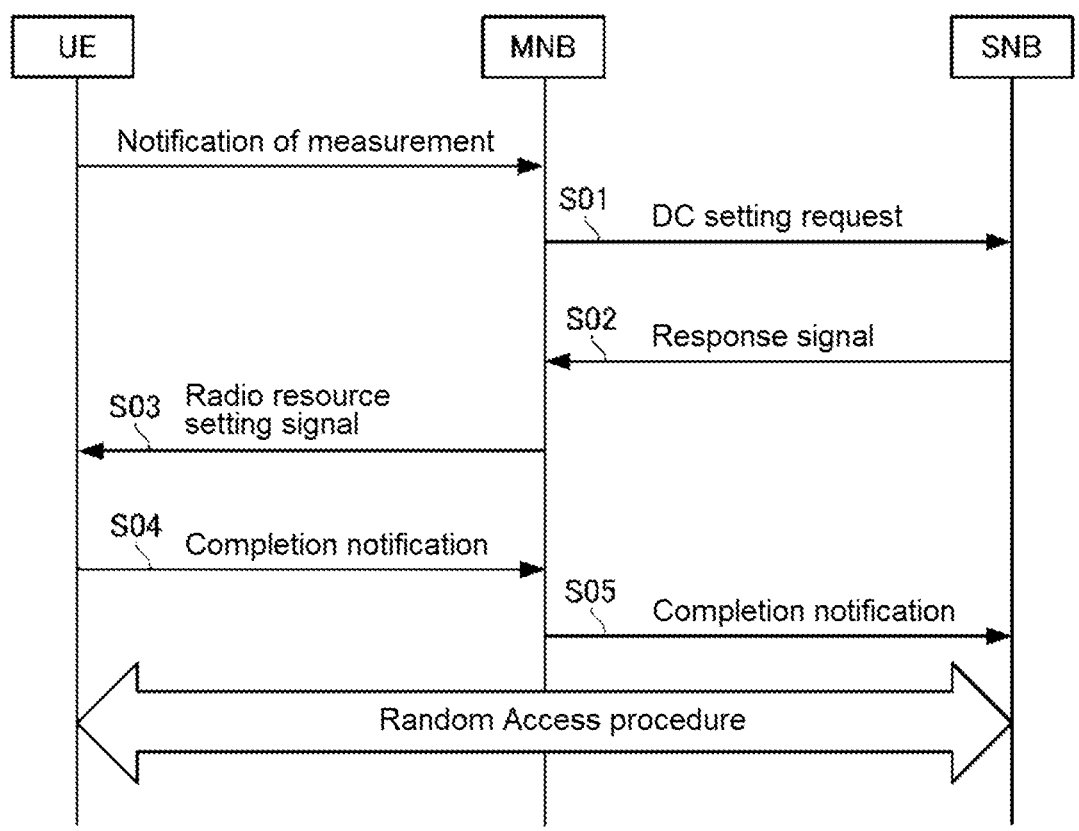
FIG. 26 is a sequence diagram of a related art showing a base transceiver station addition procedure in DC of non-standalone 5G wireless.
Figure 27:
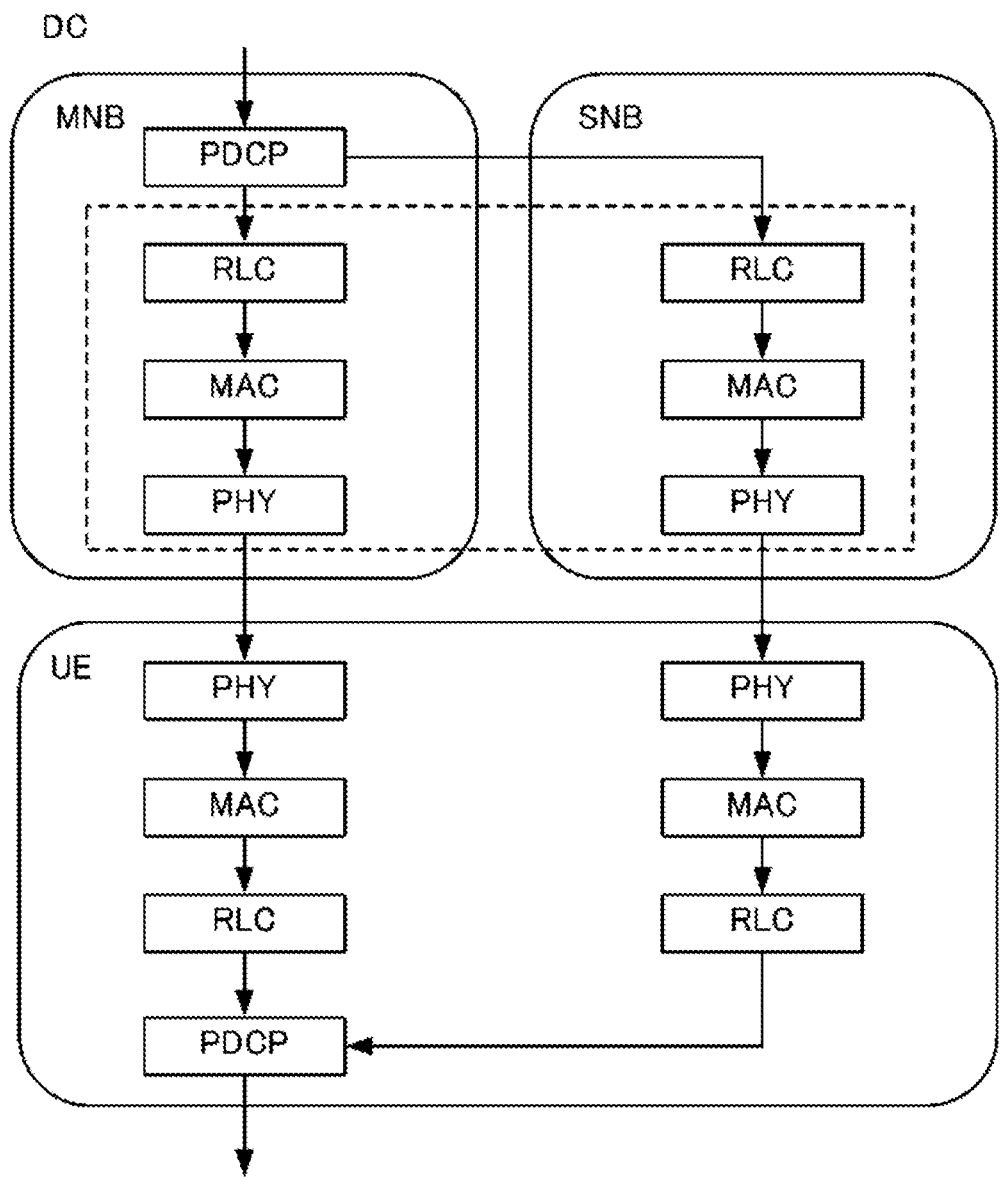
FIG. 27 is a diagram showing a conventional protocol stack in DC of non-standalone 5G wireless.
Figure 28:
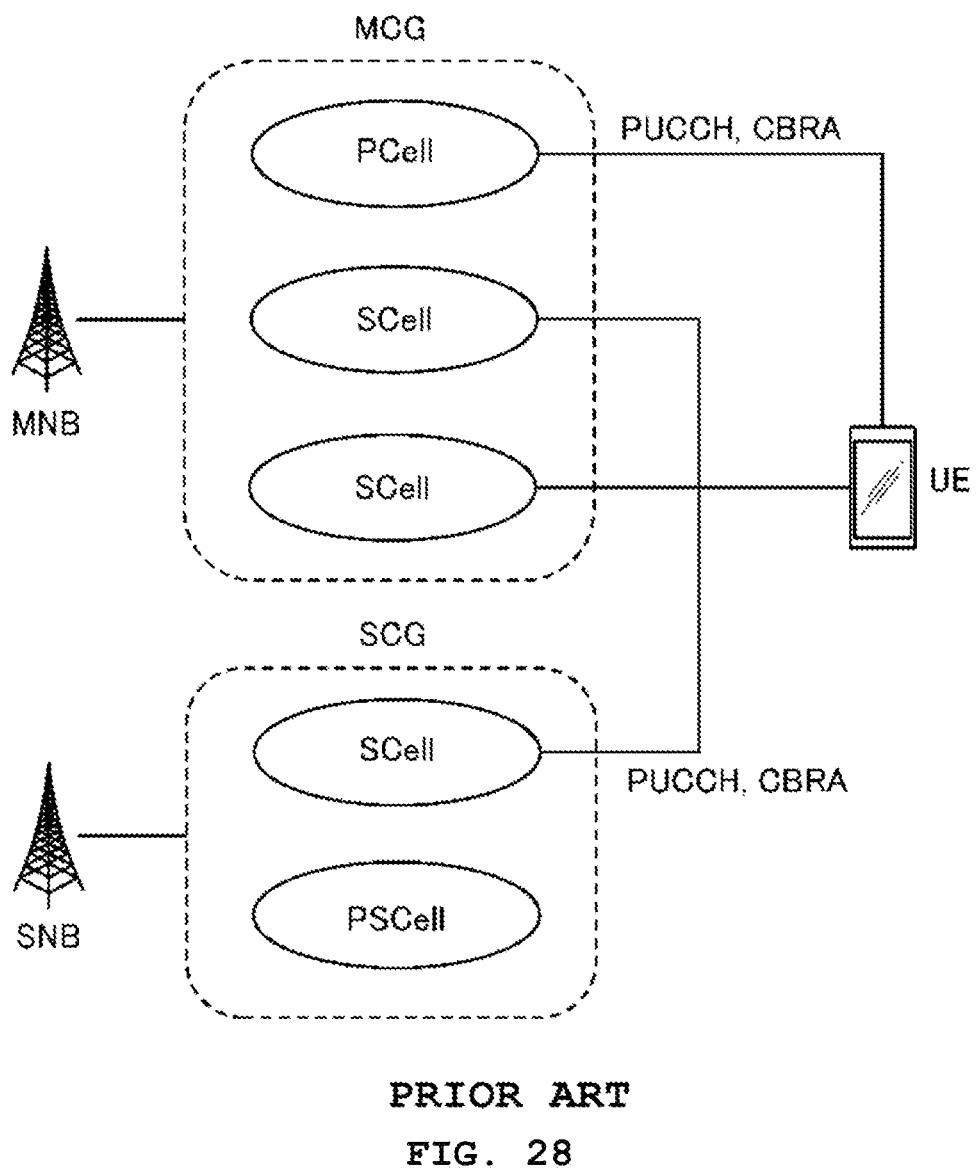
FIG. 28 is a schematic diagram showing a configuration of a conventional cell group in a non-standalone 5G wireless DC.

In addition, for example, in a case where a power characteristic confirmation request is input in step S47, the display control unit 30d displays, for example, in step S48, the power characteristic confirmation screen 33j as shown in FIG. 22 is displayed, and in a case where a throughput confirmation request is input in step S47, for example, a throughput confirmation screen 33k as shown in FIG. 23 is displayed in step S48.

With the various operation confirmation screens displayed in step S48, the display control unit 30d determines whether or not an end request for issuing an instruction to end the processing is input (step S49). Here, if it is determined that the end request is not input (NO in step S49), the display control unit 30d returns to step S41 in accordance with the instruction to return the processing, displays the main screen 33a, and then continues the processing in and after step S41.

In contrast, if it is determined that the end request is input (YES in step S49), the display control unit 30d ends the above-described series of display control after the measurement of the communication terminal 11a is started.

Next, the display forms of the main screen 33a (refer to FIG. 10) relating to a series of display control shown in FIG. 9, the DC operation confirmation screens 33e and 33f (refer to FIG. 17 and FIG. 18), the test case confirmation screen 33g (refer to FIG. 19), the component confirmation screens 33h and 33i (refer to FIGS. 20 and 21), the power characteristic confirmation screen 33j (refer to FIG. 22), and the throughput confirmation screen 33k (refer to FIG. 23) will be described in more detail.

Both the DC operation confirmation screens 33e (refer to FIG. 17) and 33f (refer to FIG. 18) displayed in step S46 can be displayed, for example, by performing a click operation near the display area of the NR cell icon and the LTE cell icon in the connection status display area 33a2 of the main screen 33a (refer to FIG. 10) after the measurement of the communication terminal 11a is started. The DC operation confirmation screens 33e and 33f respectively have an operation data display area 33e1 and an operation image display area 33e2. The DC operation confirmation screen 33e and the DC operation confirmation screen 33f are display examples in a case where settings for the DC operation are different, and there is no difference in the screen configuration. The DC operation confirmation screen 33e shows a scroll status in which the operation data display area 33e1 is easily viewed, and the DC operation confirmation screen 33f shows a scroll status in which the operation image display area 33e2 is easily viewed.

Figure 18:
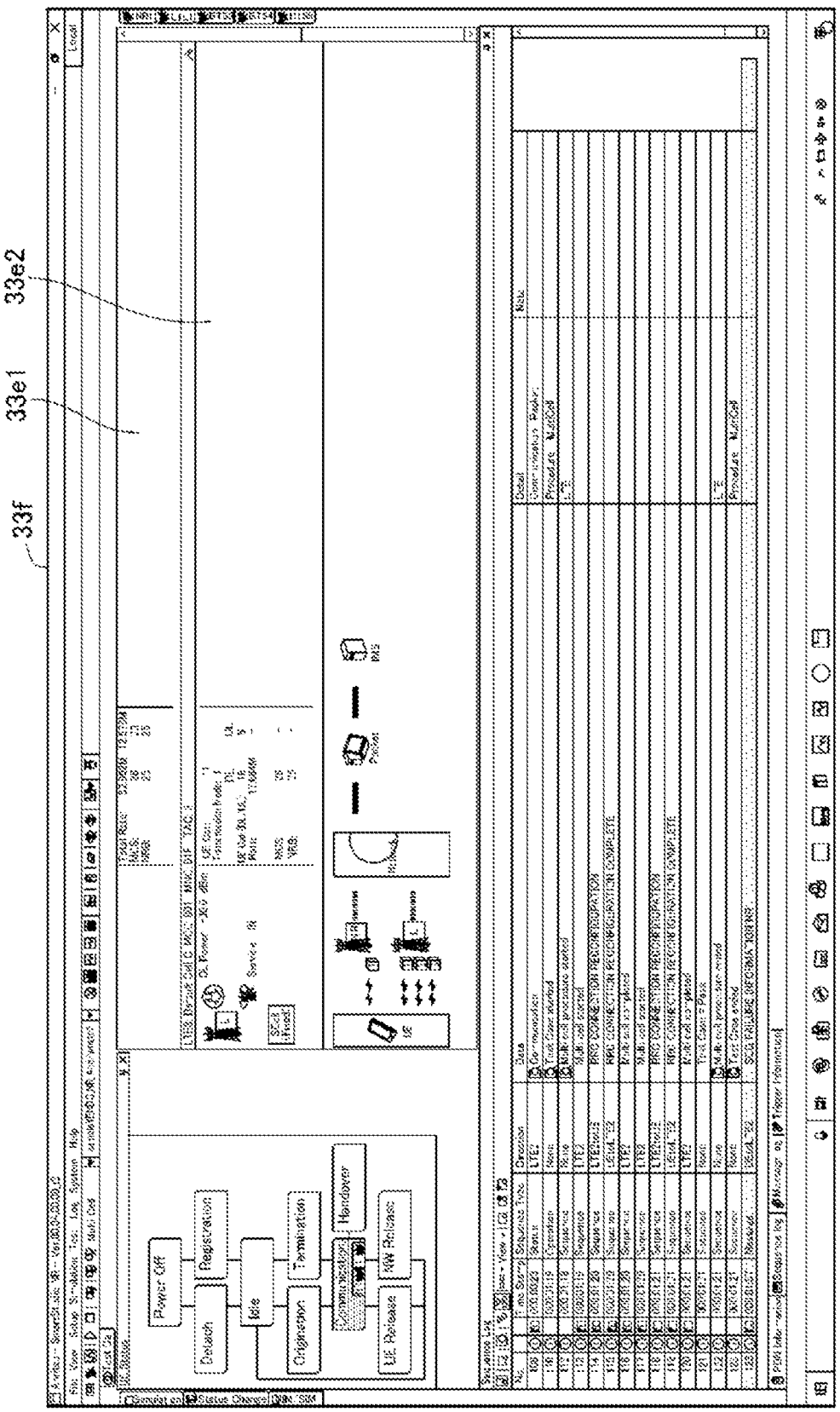
FIG. 18 is a diagram showing a display example of another example of a DC operation confirmation screen used for measuring a communication terminal of the communication terminal measurement apparatus according to an embodiment of the present invention.

As shown in FIGS. 17 and 18, in the DC operation confirmation screens 33e and 33f, the operation data display area 33e1 has an NR operation data display area and an LTE operation data display area. In the NR operation data display area, detailed data according to a DC operation mode in which CCs of different base transceiver stations in the NR area are bundled is displayed. In the LTE operation data display area, detailed data relating to an operation mode based on the CA system that bundles CCs of the same base transceiver station in the LTE area is displayed.

Further, in the operation image display area 33e2 in the DC operation confirmation screens 33e and 33f, the operation mode based on the DC system in the NR area and the operation mode based on the CA system in the LTE area are displayed using images indicating the respective operation modes. For example, in the operation image display area 33e2 of the DC operation confirmation screen 33f shown in FIG. 18, an image, in which one rectangular frame is attached to the NR cell icon while three rectangular frames are attached to the LTE cell icon, is displayed, and an image, in which a base transceiver station corresponding to the rectangular frame displayed and attached to the NR cell icon and three base transceiver stations respectively corresponding to the three rectangular frames attached to the LTE cell icon communicate with the user equipment UE indicating the communication terminal 11a, is displayed. In the operation image display area 33e2 of the DC operation confirmation screen 33e shown in FIG. 17, the same kind of images are displayed although it is difficult to view the images at the scroll position.

As described above, the display control unit 30d has a display function of displaying images indicating an operation mode based on the DC system in the NR area and an operation mode based on the CA system in the LTE area.

In the present embodiment, by adopting the display form shown in the operation image display area 33e2 of FIGS. 17 and 18, the operation status of the DC system and the CD system in the non-standalone NR can be easily detected.

The screens, which can be displayed in step S48 of FIG. 9, include the test case confirmation screen 33g (refer to FIG. 19), component confirmation screens 33h and 33i (refer to FIG. 20 and FIG. 21), the power characteristic confirmation screen 33j (refer to FIG. 22), and the throughput confirmation screen 33k (refer to FIG. 23).

The test case confirmation screen 33g is a screen for setting an arbitrary cell from the NR cell or the LTE cell, performing a test of the communication terminal 11a on a trial basis, and confirming the radio condition of the set cell. The test case confirmation screen 33g can be displayed in a predetermined area on the main screen 33a in a manner shown in FIG. 19 in accordance with a tab selection operation on the main screen 33a, for example, during execution of the above-described test measurement.

In the communication terminal measurement apparatus 10 according to the present embodiment, in a case where the tab selection operation is performed, the display control unit 30d displays an image, which shows the radio condition of the NR cell or LTE cell being set as a test case, in the form shown in FIG. 19, on the basis of the setting contents of the number of RAT cells and the signal which is input from the NR measurement-related information determination unit 13k of the pseudo base transceiver station control unit 4.

The test case confirmation screen 33g shown in FIG. 19 particularly relates to an LTE cell. At this time, the display control unit 30d draws an image, to which a label text (identification information) including the RAT name "LTE" and the base transceiver station number (BTS number) of the LTE cell is attached, on the LTE cell icon represented by the LTE abbreviation "L". In the example of FIG. 19, an image in which a label text "LTE1" is attached to the LTE cell icon is displayed. The image includes a line segment indicating, for example, an elliptical wireless range of a cell being set as a test case.

Similarly, in the test case screen 33g in a case where an NR cell is set as a test case, the display control unit 30d draws an image in which a label text including the RAT name "NR" and the BTS numbers "1, 2, 3, . . . " of the NR cells is attached to the NR cell icon represented by the abbreviation symbol "N" for NR.

As described above, in the present embodiment, the display control unit 30d has a display function of displaying the test case confirmation screen for confirming the radio condition of the cell which is set as the test case among the NR cells or the LTE cells and drawing an image in which identification information including the RAT name and the base transceiver station number of the cell is attached to the NR cell icon or LTE cell icon corresponding to the RAT type for each cell set as a test case on the test case confirmation screen 33g. In the present embodiment, the test case confirmation screen 33g is displayed in a form in which a label text in the format of "RAT name" and "BTS number" is attached to the NR cell icon or LTE cell icon. Therefore, even in a case where the number of BTSs is set as described above, the display space is sufficient, and the visibility can be ensured.

The component confirmation screens 33h and 33i are screens for confirming the carrier operation status during measurement of the communication terminal 11a between cells which are set as a combination for executing a scenario, and respectively have, for example, screen configurations as shown in FIGS. 20 and 21. The component confirmation screens 33h and 33i are common in that the CC is indicated by a carry icon having a rectangular shape with rounded corners, for example, but differ in a method of bundling carriers for LTE. The component confirmation screen 33h shows an example in which carriers are bundled into one frequency band (band) in LTE, and the component confirmation screen 33i shows an example in which the carriers are bundled into a plurality of bands (two bands).

As shown in FIG. 20, the component confirmation screen 33h has a carrier operation display area 33h1 and a CA/DC setting condition display area 33h2. In the carrier operation display area 33h1, the carrier use status between the RAT cells being set is displayed using a carry icon. As shown in FIG. 20, the component confirmation screen 33h has a screen configuration that represents the bands bundled by arranging the component icons corresponding to several CCs that are the components of the bundled frequency bands.

Specifically, in the component confirmation screen 33h, display areas 35f and 35g corresponding to the master node and the secondary node are ensured in the carrier operation display area 33h1. In the upper master node display area 35f, an LTE cell icon is displayed next to the notation "Master Node", and below the LTE cell icon, component icons corresponding to the CC bundled as Band 1 are arranged in the horizontal direction, and those are displayed to be divided into DL (downlink) and UL (uplink). In the example of FIG. 20, for the DL, three component icons respectively corresponding to three CCs that are radio resources of LTE1, LTE2, and LTE3 are displayed. For UL, a component icon corresponding to one CC that is a radio resource of LTE1 is displayed.

All component icons have, for example, rectangular shapes with rounded corners and the same size. However, the component icon corresponding to the CC that is the radio resource of the master node and the component icon corresponding to the CC that is the radio resource of the secondary node are displayed in different colors. In FIG. 20, for example, the component icons displayed in blue are hatched. The component icons not hatched are displayed in red, for example.

Further, in each component icon, identification information for identifying a cell as a resource source is described inside the icon. As the identification information, for example, a label text including a RAT name and a base transceiver station number is used. A numerical value (for example, "10", in units of MHz) indicating the band of each corresponding CC is noted above each component icon, and a total value thereof (for example, "30 MHz") is noted next to the numerical value. A symbol indicating that the corresponding CCs are bundled together and a band name (for example, Band1) are noted below the component icons.

In the display area 35g of the secondary node below the display area 35f of the master node in the carrier operation display area 33h1, an NR cell icon is displayed beside the notation of "Secondary Node", and below the notation, for example, the component icons corresponding to the CCs bundled as BTsn77 are displayed. The component icons in the display area of the secondary node are basically displayed in the above-described display form of the component icons in the display area of the master node.

Similarly to the component confirmation screen 33h, the component confirmation screen 33i shown in FIG. 21 has a screen configuration including a carrier operation display area 33i1 and a CA/DC setting condition display area 33i2. However, the configuration of the CA/DC setting condition display area 33i2 is different from the CA/DC setting condition display area 33h2 in the component confirmation screen 33h.

In the carrier operation display area 33i1 of the component confirmation screen 33i, the component icons are displayed in a manner different from that of the carrier operation display area 33h1 (refer to FIG. 20) so as to correspond to the CA/DC setting condition display area 33i2. In the example of FIG. 21, the display form of the component icons relating to DL in the display area 35f of the master node of the carrier operation display area 33i1 is different from that of the carrier operation display area 33h1. The DL in the display area 35f of the master node of the carrier operation display area 33i1 is displayed in such a manner that it is possible to know a situation where Band1 corresponding to the radio resource of LTE1 and Band3 that bundles the radio resources of LTE2 and LTE3 are used. The display form of the other part of the carrier operation display area 33i1 is the same as that of the carrier operation display area 33h1.

As described above, in the communication terminal measurement apparatus 10 according to the present embodiment, the display control unit 30d has a display function of displaying the component confirmation screen and the component icons classified into a master node, a secondary node, an uplink and a downlink. In the component confirmation screen, the component icons having the same shape indicating the CCs to be bundled on the basis of the CA system and the DC system are arranged, the identification information including the RAT name and the base transceiver station number serving as a resource of the CC is noted in each component icon, and a bandwidth of the CC is noted above the component icon.

Conventionally, as a method of confirming the CC, there is a method in which the width of the component icon is changed and displayed in accordance with the value of the bandwidth set for each BTS. Further, conventionally, as image drawing for multi-cells, there is image drawing for only LTE.

On the other hand, in the present embodiment, as shown in FIGS. 20 and 21, the component icons are unified into the same shape and are all displayed with the same width, and are displayed in a form in which the identification information including the RAT name and the base transceiver station number is noted in the component icon and the bandwidth is noted above the component icon. For this reason, in the present embodiment, even in a case where the number of BTSs increases, the display area can be spread horizontally, and the RAT type can be easily detected.

The power characteristic confirmation screen 33j has, for example, a power characteristic display area 33j1, a power adjustment display area 33j2, and an operation status display area 33j3, as shown in FIG. 22. The power characteristic display area 33j1 is an area for displaying the power of the component carrier of the set cell using a graph in which the horizontal axis represents time and the vertical axis represents power. The power adjustment display area 33j2 is an area for displaying setting items for power adjustment of component carriers of each cell. The operation status display area 33j3 is an area where an image of the operation status of each cell is drawn using each cell and each image which indicates the communication terminal 11a as a measurement target.

The power characteristic confirmation screen 33j can be displayed by, for example, a tab operation on the main screen 33a as necessary. In order to display the power characteristic confirmation screen 33j, the control unit 31 (refer to FIG. 6) of the control device 22 includes a power detection function unit, which is not shown, for detecting the power of a component carrier as a resource of each NR cell and LTE cell, for which a combination is set in accordance with a scenario, on the basis of the signal (the signal transmitted from the communication terminal 11a during the simulative communication) which is output by the NR measurement-related information determination unit 13k of the pseudo base transceiver station control unit 4. The power detection function unit may be provided in another position, for example, in the display control unit 30d.

The display control unit 30d draws, as a graph, the power characteristics (characteristics of change in power value with respect to time) of the component carriers of the NR cells and LTE cells detected by the power detection function unit in the power characteristic display area 33j1 corresponding to the NR cells and the LTE cells.

Conventionally, this type of display of the power characteristic corresponds only to LTE, and the power of each cell is not displayed corresponding to LTE and NR as in the present embodiment. According to the configuration of the present embodiment in which the power characteristics of the NR cell and the LTE cell are displayed on the same graph, the power characteristics of the NR cell and the LTE cell relating to DC in the non-standalone NR can be easily and reliably detected.

The display control unit 30d draws an operation status image of the NR cells and the LTE cells in the operation status display area 33j3 in accordance with the display of the graph showing the power characteristics of the NR cell and the LTE cell in the power characteristic display area 33j1 of the power characteristic confirmation screen 33j.

Here, for example, as shown in FIG. 22, there are a plurality of base transceiver stations which are set as cells to be subjected to the simulative communication operation in the NR area and the LTE area. In this case, the display control unit 30d performs display such that two NR cell icons and two LTE cell icons respectively corresponding to the first and last base transceiver stations are displayed side by side for each of the NR area and the LTE area, and performs display in a form in which the identification information pieces in which the RAT names, the first base transceiver station numbers, and the last base numbers are separately listed are noted in association with the two NR cell icons and the two LTE cell icons.

Specifically, in the example of FIG. 22, in the NR area, the display control unit 30d performs display in a form in which the two NR cell icons with the symbol "NR" are arranged side by side and the first base transceiver station number "1"

subsequent to "NR" and the next base transceiver station number "2" are noted to be separated by, for example, a comma below both NR cell icons. Similarly, in the LTE area, the display is performed in a form in which two LTE cell icons with the LTE abbreviation [L] are arranged side by side and the first base transceiver station number "2" subsequent to "LTE" and the next base transceiver station number "3" are noted to be separated by commas below both LTE cell icons.

As a modification example in this case, in a case where three or more cells are set, the display control unit 30*d* may change the display form relating to "NR1, 2" and "LTE2, 3" in FIG. 22 to a display form of "NR1-3" and "LTE1-5" or the like by connecting the first base transceiver station number and the last base transceiver station number through, for example, a line segment.

As described above, in the communication terminal measurement apparatus 10 according to the present embodiment, there are a plurality of base transceiver stations which are set as cells in the NR area and the LTE area. In this case, the display control unit 30*d* performs display such that two BTS icons respectively corresponding to the first and last base transceiver stations are displayed side by side for each of the NR area and the LTE area, and performs display in a form in which one identification information piece in which the RAT name, the first base transceiver station number, and the last base number are separately arranged is attached to the two NR cell icons (first cell icons) and the two LTE cell icons (second cell icons). By providing this function, it is possible to deal with the non-standalone NR, and it is possible to easily detect the operation status of the NR cell and the LTE cell.

The throughput confirmation screen 33*k* has, for example, a throughput display area 33*k*1 and a carrier operation status display area 33*k*2 as shown in FIG. 23. The throughput display area 33*k*1 is an area for displaying the throughputs of the component carriers listed in the carrier operation status display area 33*k*2 by using a graph in which the horizontal axis represents time and the vertical axis represents the processing amount (unit is, for example, kbps).

The throughput confirmation screen 33*k* can be displayed by, for example, a predetermined tab operation on the main screen 33*a*. In order to display the throughput confirmation screen 33*k*, the control unit 31 (refer to FIG. 6) of the control device 22 includes a throughput measurement function unit for detecting the throughput of a component carrier as a radio resource of each NR cell and LTE cell, for which a combination is set in accordance with a scenario, on the basis of the signal (the signal transmitted from the communication terminal 11*a* during the simulative communication) which is output by the NR measurement-related information determination unit 13*k* of the pseudo base transceiver station control unit 4. The throughput measurement function unit may be provided in another position such as the display control unit 30*d*.

The display control unit 30*d* draws, as a graph in the form shown in FIG. 23, the characteristic of the throughput of the component carrier used by each NR cell and LTE cell detected by the throughput detection function unit, in the throughput display area 33*k*1.

Conventionally, the display of the throughput characteristic of the component carrier generally corresponds to only the LTE. The display is not performed such that the throughput characteristics of the NR cell and the LTE cell corresponding to the LTE and the NR are collectively displayed at one place as in the present embodiment. According to the configuration of the present embodiment in which the throughput characteristics of the carriers that are the radio resources of the NR cell and the LTE cell are collectively displayed at one place as a graph, the throughput characteristics relating to the carriers of the DC NR cell and the LTE cell in the non-standalone NR can be detected easily and reliably.

As described above, a communication terminal measurement apparatus 10 according to an embodiment tests a communication terminal 11*a* by simulating a plurality of base transceiver stations including a base transceiver station compliant with a first communication standard and a base transceiver station compliant with a second communication standard. The communication terminal measurement apparatus comprises: a first transmitting/receiving unit 3*a*, 20 that simulates an operation of the base transceiver station compliant with the first communication standard and transmits and receives a signal of the first communication standard to and from the communication terminal; a second transmitting/receiving unit 3*b*, 21 that simulates an operation of the base transceiver station compliant with the second communication standard and transmits and receives a signal of the second communication standard to and from the communication terminal; a control unit 4, 22 that controls the first transmitting/receiving unit and the second transmitting/receiving unit so as to execute a simulative communication operation for simulating communication between the plurality of base transceiver stations and the communication terminal; a display unit 33; and display control means 30*d* for causing the display unit 33 to display a connection confirmation support screen 33*d*, 33*da*, 33*db* as a connection diagram. The connection confirmation support screen 33*d*, 33*da*, 33*db* includes a first connection confirmation support image 33*d*1, 36*a* indicating a connection mode for connection between the first transmitting/receiving unit and the communication terminal and a second connection confirmation support image 33*d*2, 36*b* indicating a connection mode for connection between the second transmitting/receiving unit and the communication terminal. The first connection confirmation support image includes an image of a port through which the signal of the first communication standard is input and output. The second connection confirmation support image includes an image of a port through which the signal of the second communication standard is input and output. In addition, the display control means further causes information on the signal of the first communication standard to be attached to the image of the port through which the signal of the first communication standard is input and output, and information on the signal of the second communication standard to be attached to the image of the port through which the signal of the second communication standard is input and output.

With this configuration, in the communication terminal measurement apparatus 10 according to the embodiment, information pieces of the signals, which are input to and output from the ports, are attached as a text to the first connection diagram image 33*d*1 and the second connection diagram image 33*d*2. Thereby, it is not necessary to generate a huge number of screens corresponding to all wiring diagrams that fluctuate greatly every time simulation parameters are changed. Thus, it is possible to save screens and reduce processing load compared with conventional systems.

In the communication terminal measurement apparatus 10 according to the present embodiment, the first connection confirmation assistance image further includes a panel image of the first transmitting/receiving unit having a port through which the signal of the first communication standard is input and output, and the second connection confirmation assistance image further includes a panel image of the second transmitting/receiving unit having a port through which the signal of the second communication standard is input and output.

With this configuration, the communication terminal measurement apparatus 10 according to the present embodiment is able to correctly and easily connect the NR measurement device 20 and the LTE measurement device 21 to the connection destination by viewing the connection destination name attached to the port in the image indicating the front panel and the back panel. Thus, the test efficiency can be improved.

Further, the communication terminal measurement apparatus 10 according to the present embodiment further comprises simulation model setting screen 33b for setting simulation parameters, and may be configured such that the display control unit 30d displays the first connection confirmation support image and the second connection confirmation support image in accordance with the simulation parameters which are set by the simulation model setting screen 33b.

With this configuration, in the communication terminal measurement apparatus 10 according to the present embodiment, even in a case where the setting contents of the simulation parameters changes, the port, to which the connection destination name is attached, can be easily connected to a correct connection destination on the basis of the connection destination name changed in accordance with the setting contents.

The communication terminal measurement apparatus 10 according to the present embodiment may be configured such that the simulation model setting screen 33b includes a tool 34a for selecting an RF converter or an RF sub-module, a tool 34b for setting the number of base transceiver stations compliant with the first communication standard, and a tool 34c for setting the number of antennas relating to MIMO. In addition, when the RF converter is selected and the number of antennas greater than a predetermined value relating to MIMO is set, the display control unit 30d displays the first connection confirmation support image 33d1 further including RF converter images 27a, 27b, 27c, 27d, each of which indicates the RF converter and of which the number corresponds to the number of antennas and a third connection confirmation support image 33d3 which indicates a connection path between each of the RF converter images 27a, 27b, 27c, 27d and the port of the first transmitting/receiving unit through which the signal of the first communication standard is input and output.

With this configuration, the communication terminal measurement apparatus 10 according to the present embodiment is able to accurately and quickly perform connection between that the NR measurement device 20 and the RF converters 27 respectively corresponding to the plurality of antennas in a busy connection state while also referring to the third connection confirmation support image 33d3. As a result, the test efficiency of the communication terminal 11a based on the MIMO system can be improved.

Further, the communication terminal measurement apparatus 10 according to the present embodiment is configured such that, when the RF sub-module is selected, the display control unit 30d cause a port, which is different from the port to which the information on the signal of the first communication standard is attached when the RF converter is selected and which is to be connected to the RF sub-module in a panel image of the first transmitting/receiving unit, to display the first connection confirmation support image to which the information on the signal of the first communication standard is attached without the third connection diagram image 33d3.

With this configuration, the communication terminal measurement apparatus 10 according to the present embodiment is able to connect the NR measurement device 20 and the communication terminal 11a through a wired path including an RF sub-module, and is able to accurately and quickly perform a connection operation in a case of performing a test.

Further, the communication terminal measurement apparatus 10 according to the present embodiment is configured such that the first communication standard is NR and the second communication standard is LTE. With this configuration, the communication terminal measurement apparatus 10 according to the present invention is able to show the connection modes between the NR measurement device and the LTE measurement device 21 and the respective connection destinations thereof to a user by using a single connection confirmation support image when testing a communication terminal 11a in non-standalone NR operation in which LTE and NR are combined. Thus, compared with the conventional system that requires a huge number of screens corresponding to all wiring diagrams indicating the connection modes between the NR measurement device 20 and the LTE measurement device 21 and the respective connection destinations thereof, the screen can be greatly saved.

The measurement-related information display method according to the present invention is a measurement-related information display method of causing a display unit 33 to display a connection diagram indicating connection modes of a first transmitting/receiving unit and a second transmitting/receiving unit capable of performing simulative communication operations of the first transmitting/receiving unit 3a, 20 that simulates an operation of a base transceiver station compliant with a first communication standard and transmits and receives a signal of the first communication standard to and from the communication terminal, and the second transmitting/receiving unit 3b, 21 that simulates an operation of a base transceiver station compliant with a second communication standard and transmits and receives a signal of the second communication standard to and from the communication terminal, when testing a communication terminal 11a by simulating a plurality of base transceiver stations including the base transceiver station compliant with the first communication standard and the base transceiver station compliant with the second communication standard. The method comprises: a step (S52) of separately generating a first connection confirmation support image 33d1, 36a indicating a connection mode for connection between the first transmitting/receiving unit and the communication terminal and a second connection confirmation support image 33d2, 36b indicating a connection mode for connection between the second transmitting/receiving unit and the communication terminal; a step (S53) of generating a connection confirmation support screen 33d, 33da, 33db by synthesizing the first connection confirmation support image and the second connection confirmation support image; and a step (S53) of causing the display unit 33 to display the connection confirmation support screen as the connection diagram.

With this configuration, the measurement-related information display method according to the present invention separately generates the first connection diagram image 33d1 and the second connection diagram image 33d2, synthesizes the images, and displays the images as a connection diagram. As a result, it is not necessary to generate an enormous number of screens corresponding to all wiring diagrams, which fluctuate greatly each time a simulation parameters is changed. Thereby, it is possible to save screens and reducing the processing load as compared with the conventional system.

INDUSTRIAL APPLICABILITY

As described above, in the communication terminal measurement apparatus and the measurement-related information display method according to the present invention, when communication is performed in an operation mode in which new and old communication standards are mixed, the information on the signal, which input to and output from the ports, about the connection mode for connection between a base transceiver station compliant with the old communication standard and each simulation device compliant with a new communication standard and the connection destination thereof is noted as a text. Therefore, the following advantages are obtained. The number of screens for displaying the connection mode for connection between each simulation device and the connection destination can be reduced. In addition, it is possible to reduce processing load relating to screen generation. As a result, this configuration is applicable to a communication terminal measurement apparatus and a measurement-related information display method of measuring a mobile communication terminal in non-standalone NR operation.

DESCRIPTION OF REFERENCE NUMERALS AND SIGNS 1 control PC (control unit)
2 operation unit (setting means)
3a transmitting/receiving unit (first transmitting/receiving unit)
3b transmitting/receiving unit (second transmitting/receiving unit)
4 pseudo base transceiver station control unit (control unit)
10 communication terminal measurement apparatus
11a terminal (communication terminal)
20 NR measurement device (first transmitting/receiving unit)
21 LTE measurement device (second transmitting/receiving unit)
22 control device (control unit)
27a, 27b, 27c, 27d RF converter image
30d display control unit (display control means)
32 operation (setting means)
33 display unit
33d, 33da, 33db connection confirmation/support screen (connection diagram)
33d1 first connection diagram image (first connection confirmation support image)
33d2 second connection diagram image (second connection confirmation support image)
33d3 third connection diagram image (third connection confirmation support image)
34a tool (first tool)
34b tool (second tool)
34c tool (third tool)
36a NR connection confirmation/support screen (first connection confirmation support image)
36b LTE connection confirmation/support screen (second connection confirmation support image)

What is claimed is:

1. A communication terminal measurement apparatus that tests a communication terminal by simulating a plurality of base transceiver stations including a base transceiver station compliant with a first communication standard and a base transceiver station compliant with a second communication standard, the communication terminal measurement apparatus comprising:
a first transmitting/receiving unit that simulates an operation of the base transceiver station compliant with the first communication standard and transmits and receives a signal of the first communication standard to and from the communication terminal;
a second transmitting/receiving unit that simulates an operation of the base transceiver station compliant with the second communication standard and transmits and receives a signal of the second communication standard to and from the communication terminal;
a control unit that controls the first transmitting/receiving unit and the second transmitting/receiving unit so as to execute a simulative communication operation for simulating communication between the plurality of base transceiver stations and the communication terminal;
a display unit; and
display control means for causing the display unit to display a connection confirmation support screen as a connection diagram,
wherein the connection confirmation support screen includes a first connection confirmation support image indicating a connection mode for connection between the first transmitting/receiving unit and the communication terminal and a second connection confirmation support image indicating a connection mode for connection between the second transmitting/receiving unit and the communication terminal,
wherein the first connection confirmation support image includes an image of a port through which the signal of the first communication standard is input and output,
wherein the second connection confirmation support image includes an image of a port through which the signal of the second communication standard is input and output, and
wherein the display control means further causes
information on the signal of the first communication standard to be attached to the image of the port through which the signal of the first communication standard is input and output, and
information on the signal of the second communication standard to be attached to the image of the port through which the signal of the second communication standard is input and output.

2. The communication terminal measurement apparatus according to claim 1, wherein the first connection confirmation support image further includes a panel image of the first transmitting/receiving unit having a port through which the signal of the first communication standard is input and output, and the second connection confirmation support image further includes a panel image of the second transmitting/receiving unit having a port through which the signal of the second communication standard is input and output.

3. The communication terminal measurement apparatus according to claim 2, further comprising setting means for setting simulation parameters,
wherein the display control means displays the first connection confirmation support image and the second connection confirmation support image in accordance with the simulation parameters which are set by the setting means.

4. The communication terminal measurement apparatus according to claim 3,
  wherein the setting means includes a first tool for selecting an RF converter or an RF sub-module, a second tool for setting the number of base transceiver stations compliant with the first communication standard, and a third tool for setting the number of antennas relating to MIMO, and
  wherein when the RF converter is selected and the number of antennas relating to MIMO greater than a predetermined value is set, the display control means displays the first connection confirmation support image further including RF converter images, each of which indicates the RF converter and of which the number corresponds to the number of antennas and a third connection confirmation support image which indicates a connection path between each of the RF converter images and the port of the first transmitting/receiving unit through which the signal of the first communication standard is input and output.

5. The communication terminal measurement apparatus according to claim 4, wherein when the RF sub-module is selected, the display control means cause a port, which is different from the port to which the information on the signal of the first communication standard is attached when the RF converter is selected and which is to be connected to the RF sub-module in a panel image of the first transmitting/receiving unit, to display the first connection confirmation support image to which the information on the signal of the first communication standard is attached without the third connection confirmation support image.

6. The communication terminal measurement apparatus according to claim 1, wherein the first communication standard is NR, and the second communication standard is LTE.

7. The communication terminal measurement apparatus according to claim 2, wherein the first communication standard is NR, and the second communication standard is LTE.

8. The communication terminal measurement apparatus according to claim 3, wherein the first communication standard is NR, and the second communication standard is LTE.

9. The communication terminal measurement apparatus according to claim 4, wherein the first communication standard is NR, and the second communication standard is LTE.

10. A measurement-related information display method of causing a display unit to display a connection diagram indicating connection modes of a first transmitting/receiving unit and a second transmitting/receiving unit capable of performing simulative communication operations of the first transmitting/receiving unit that simulates an operation of a base transceiver station compliant with a first communication standard and transmits and receives a signal of the first communication standard to and from the communication terminal, and the second transmitting/receiving unit that simulates an operation of a base transceiver station compliant with a second communication standard and transmits and receives a signal of the second communication standard to and from the communication terminal, when testing a communication terminal by simulating a plurality of base transceiver stations including the base transceiver station compliant with the first communication standard and the base transceiver station compliant with the second communication standard, the method comprising:
  a step of separately generating a first connection confirmation support image indicating a connection mode for connection between the first transmitting/receiving unit and the communication terminal and including an image of a port through which the signal of the first communication standard is input and output, and a second connection confirmation support image indicating a connection mode for connection between the second transmitting/receiving unit and the communication terminal and including an image of a port through which the signal of the second communication standard is input and output;
  a step of generating a connection confirmation support screen by synthesizing the first connection confirmation support image and the second connection confirmation support image, and causing information on the signal of the first communication standard to be attached to the image of the port through which the signal of the first communication standard is input and output and causing information on the signal of the second communication standard to be attached to the image of the port through which the signal of the second communication standard is input and output; and
  a step of causing the display unit to display the connection confirmation support screen as the connection diagram.

* * * * *